US010503136B2

(12) United States Patent
Lewin et al.

(10) Patent No.: US 10,503,136 B2
(45) Date of Patent: *Dec. 10, 2019

(54) SYSTEM, A METHOD AND A COMPUTER PROGRAM PRODUCT FOR CONTROLLING A SET OF ACTUATOR ELEMENTS

(71) Applicant: AUDIO PIXELS LTD., Rehovot (IL)

(72) Inventors: Daniel Lewin, Ramat Hasharon (IL); Yuval Cohen, Rehovot (IL); Eric Andreas Haber, Kibbutz Kfar Menahem (IL); Shay Kaplan, Givat Ela (IL); Meir Ben Simon, Givat Ela (IL); Raanan Zacher, Netanya (IL)

(73) Assignee: AUDIO PIXELS LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,749

(22) Filed: Mar. 28, 2018

(65) Prior Publication Data
US 2018/0217572 A1   Aug. 2, 2018

Related U.S. Application Data

(63) Continuation of application No. 14/402,599, filed as application No. PCT/IL2013/050444 on May 23, 2013, now Pat. No. 10,007,244.
(Continued)

(51) Int. Cl.
*G06F 3/16* (2006.01)
*G05B 19/042* (2006.01)
(Continued)

(52) U.S. Cl.
CPC ......... *G05B 19/0426* (2013.01); *H04R 1/005* (2013.01); *G05B 2219/23265* (2013.01);
(Continued)

(58) Field of Classification Search
CPC ............ H03M 1/06; H03M 1/08; H03M 1/66; H04Q 2213/042; G06F 3/16; G06F 5/00
(Continued)

(56) References Cited

U.S. PATENT DOCUMENTS 4,131,363 A   12/1978 Shea et al.
4,194,095 A   3/1980 Doi et al.
(Continued)

FOREIGN PATENT DOCUMENTS

CN   1575037 A   2/2005
CN   1709587 A   12/2005
(Continued)

OTHER PUBLICATIONS

S. Braun et al., Smart Individual Switch Addressing of 5×5 and 20×20 MEMS Double-Switch Arrays, Transducers & Eurosensors '07 153 (IEEE, 2007).*
(Continued)

*Primary Examiner* — Walter F Briney, III
(74) *Attorney, Agent, or Firm* — Oliff PLC

(57) ABSTRACT

A system includes an apparatus and a processor. The apparatus includes a set of actuator elements that move between two positions. Each actuator element is comprised in: exactly one first subset out of a plurality of non-empty first subsets and exactly one second subset out of a plurality of non-empty second subsets. The processor is configured to generate one or more control commands for a group of subsets out of the first and the second pluralities of subsets in response to a number of moving elements which, if released from the first extreme position during a second sampling cycle, enables production by the apparatus during the second sampling cycle of a sound.

20 Claims, 25 Drawing Sheets

Related U.S. Application Data

(60) Provisional application No. 61/651,821, filed on May 25, 2012.

(51) Int. Cl.
    *H04R 1/00*     (2006.01)
    *H04R 3/12*     (2006.01)

(52) U.S. Cl.
    CPC ...... *G05B 2219/23292* (2013.01); *H04R 3/12* (2013.01); *H04R 2201/401* (2013.01)

(58) Field of Classification Search
    USPC ............ 341/50, 126, 144; 381/74, 111, 123; 700/94
    See application file for complete search history.

(56) References Cited

U.S. PATENT DOCUMENTS

| | | |
|---|---|---|
| 4,337,379 A | 6/1982 | Nakaya |
| 4,515,997 A | 5/1985 | Stinger, Jr. |
| 5,046,101 A | 9/1991 | Lovejoy |
| 5,138,317 A | 8/1992 | Story |
| 5,517,570 A | 5/1996 | Taylor |
| 5,574,792 A | 11/1996 | Konno |
| 5,580,639 A | 12/1996 | Togawa et al. |
| 5,953,200 A | 9/1999 | Haley et al. |
| 6,094,116 A | 7/2000 | Tai et al. |
| 6,125,189 A | 9/2000 | Yasuno et al. |
| 6,266,002 B1 | 7/2001 | Gong et al. |
| 6,289,106 B1 | 9/2001 | Wong |
| 6,373,955 B1 | 4/2002 | Hooley |
| 6,403,995 B2 | 6/2002 | Thomas |
| 6,795,561 B1 | 9/2004 | Bank |
| 6,959,096 B2 | 10/2005 | Boone et al. |
| 6,963,654 B2 | 11/2005 | Sotme et al. |
| 6,975,740 B2 | 12/2005 | Rautio et al. |
| 7,016,186 B2 | 3/2006 | Ueda et al. |
| 7,286,681 B2 | 10/2007 | Gerkinsmeyer |
| 7,307,567 B2 | 12/2007 | Kuttner |
| 7,561,088 B1 | 7/2009 | Ferguson |
| 7,663,523 B1 | 2/2010 | Keppler et al. |
| 8,085,964 B2 | 12/2011 | Cohen et al. |
| 8,126,163 B2 | 2/2012 | Cohen et al. |
| 8,374,056 B2 | 2/2013 | Cohen et al. |
| 8,410,965 B2 | 4/2013 | Chang et al. |
| 8,457,338 B2 | 6/2013 | Cohen et al. |
| 8,643,525 B1 | 2/2014 | Wen et al. |
| 9,391,541 B2 | 7/2016 | Cohen et al. |
| 2001/0048123 A1 | 12/2001 | Thomas |
| 2002/0073856 A1 | 6/2002 | Davis et al. |
| 2002/0106093 A1 | 8/2002 | Azima et al. |
| 2002/0151171 A1 | 10/2002 | Furusawa |
| 2003/0068054 A1 | 4/2003 | Sotme et al. |
| 2003/0129814 A1 | 7/2003 | Mizukoshi |
| 2004/0021594 A1 | 2/2004 | Melanson |
| 2004/0122543 A1 | 6/2004 | Lee et al. |
| 2005/0008171 A1 | 1/2005 | Hosoi et al. |
| 2005/0180577 A1 | 8/2005 | Horbach |
| 2005/0207588 A1 | 9/2005 | Biegelsen |
| 2005/0281419 A1 | 12/2005 | Miyazaki et al. |
| 2006/0062698 A1 | 3/2006 | Foster et al. |
| 2006/0072765 A1 | 4/2006 | Shibutani |
| 2006/0145059 A1 | 7/2006 | Lee et al. |
| 2006/0255993 A1 | 11/2006 | Miki et al. |
| 2009/0021728 A1 | 1/2009 | Heinz et al. |
| 2010/0002900 A1 | 1/2010 | Cohen et al. |
| 2010/0008521 A1 | 1/2010 | Cohen et al. |
| 2010/0166242 A1 | 7/2010 | Cohen et al. |
| 2010/0254550 A1 | 10/2010 | Martin et al. |
| 2010/0316242 A1 | 12/2010 | Cohen et al. |
| 2012/0076330 A1 | 3/2012 | Cohen et al. |

FOREIGN PATENT DOCUMENTS

| | | |
|---|---|---|
| CN | 101130575 A | 2/2008 |
| DE | 10041325 A1 | 3/2002 |
| EP | 0 437 999 A2 | 7/1991 |
| EP | 1 063 866 A1 | 12/2000 |
| EP | 1 065 725 A2 | 1/2001 |
| EP | 1 206 160 A1 | 5/2002 |
| EP | 1 465 211 A2 | 10/2004 |
| EP | 1 653 614 A1 | 5/2006 |
| GB | 1 106 750 A | 3/1968 |
| GB | 2 393 601 A | 3/2004 |
| JP | 51-120710 A | 10/1976 |
| JP | 57-023387 A | 2/1982 |
| JP | 57-185790 A | 11/1982 |
| JP | H05-14992 A | 1/1993 |
| JP | H09-98092 A | 4/1997 |
| JP | H09-266599 A | 10/1997 |
| JP | 2001-016675 A | 1/2001 |
| JP | 2005-087929 A | 4/2005 |
| JP | 2006-319535 A | 11/2006 |
| NL | 6613713 A | 4/1968 |
| WO | 84/00460 A1 | 2/1984 |
| WO | 96/31086 A1 | 10/1996 |
| WO | 98/24544 A1 | 6/1998 |
| WO | 01/23104 A2 | 4/2001 |
| WO | 01/87458 A1 | 11/2001 |
| WO | 02/17127 A2 | 2/2002 |
| WO | 03/017717 A2 | 2/2003 |
| WO | 03/059005 A2 | 7/2003 |
| WO | 2007/135678 A2 | 11/2007 |
| WO | 2007/135679 A2 | 11/2007 |
| WO | 2007/135680 A1 | 11/2007 |
| WO | 2009/066290 A2 | 5/2009 |
| WO | 2010/038229 A2 | 4/2010 |
| WO | 2011/111042 A1 | 9/2011 |
| WO | 2012/070042 A1 | 5/2012 |

OTHER PUBLICATIONS

Braun, Stefan et al. "Row/Column Addressing Scheme for Large Electrostatic Actuator MEMS Switch Arrays and Optimization of the Operational Reliability by Statistical Analysis". Journal of Microelectromechanical Systems, vol. 17, No. 5, pp. 1104-1113, 2008.

Schreier et al. "Understanding Delta-Sigma Data Converters". vol. 74, Piscataway, NJ: IEEE press, pp. 1-446.

Hawksford, Malcolm. "Spatial Distribution of Distortion and Spectrally Shaped Quantization Noise on Digital Micro-Array Loudspeakers". Journal of Audio Engineering Society, vol. 55, No. 1/2, pp. 3-26, 2007.

Lagorce et al. "Magnetic and Mechanical Properties of Micromachined Strontium Ferrite/Polyimide Composites". IEEE Journal of Microelectromechanical Systems, vol. 6, No. 4, 1997.

Lagorce, Laure et al. "Magnetic Microactuators Based on Polymer Magnets". IEEE Journal of Microelectromechanical Systems, vol. 8, No. 1, 1999.

BBE Sound, Inc., "DS48 Digital Speaker Processor". BBE Professional Products, pp. 1-39.

Diamond, Brett et al. "Digital Sound Reconstruction Using Arrays of CMOS-MEMS Microspeakers". Transducers, Solid-State Sensors, Actuators and Microsystems, 12th International Conference, IEEE, vol. 9 pp. 238-241, 2003.

Hawksford, M.O.J. "Smart Digital Loudspeaker Arrays". Journal of the Audio Engineering Society, vol. 51, No. 12, pp. 1133-1162, 2003.

Huang, Yaxiong et al. "Distortion and Directivity in a Digital Transducer Array Loudspeaker". Journal of the Audio Engineering Society, vol. 49, No. 5, pp. 337-352, 2001.

Meyer, David. "Digital Control of Loudspeaker Array Directivity". Journal of the Audio Engineering Society, vol. 32, No. 10, pp. 747-754, 1984.

Crocker, Malcolm J. (Editor). "Encyclopedia of Acoustics". Wiley-Interscience, vol. 1, 1997.

(56) References Cited

OTHER PUBLICATIONS

Kinsler, Lawrence et al. "Fundamentals of Acoustics". 4th Edition.
Raichel, Daniel. "The Science of Applications of Acoustics". 2nd Edition.
Bossing et al. "Principles of Vibration and Sound".
Fahy, Frank. "Foundations of Engineering Acoustics".
Neumann, John J. Jr. "MEMS (Microelectromechanical Systems) Audio Devices-Dreams and Realities". Audio Engineering Society, Convention paper, pp. 1-5, 2003.
Yamaha. "Multi-Channel Surround Sound From a Single Component". Digital Sound Projections.
May 10, 2007 International Search Reports issued in International Patent Application No. PCT/IL2007/000622.
May 11, 2007 International Search Report issued in International Patent Application No. PCT/IL2007/000618.
Mar. 3, 2008 International Search Report issued in International Patent Application No. PCT/IL2007/000621.
Jun. 18, 2009 International Search Report issued in International Patent Application No. PCT/IL2008/001524.
Mar. 30, 2010 International Preliminary Report on Patentability issued in International Patent Application No. PCT/IL2008/001524.
U.S. Appl. No. 60/802,126.
U.S. Appl. No. 60/907,450.
U.S. Appl. No. 60/872,488.
U.S. Appl. No. 60/996,513.
U.S. Appl. No. 60/924,203.
U.S. Appl. No. 61/136,778.
U.S. Appl. No. 61/171,946.
U.S. Appl. No. 61/476,352.
U.S. Appl. No. 61/468,916.
U.S. Appl. No. 61/417,298.
Duewer, Bruce, "A Multi-Bit Delta-Sigma DAC with Mismatch Shaping in the Feedback Loop," Audio Eng'g Soc. Conv. Paper 5919 (Oct. 2003).

\* cited by examiner

| Drive scheme | 1 | 2 | 3 | 4 | 5 |
|---|---|---|---|---|---|
| $V_{RS}$ | $\geq V_H$ | $\geq V_H$ | 0 | $\leq -V_H$ | 0 |
| $V_{RU}$ | 0 | 0 | $\leq -V_H$ | 0 | $\geq V_H$ |
| $V_{CR}$ | $\geq V_H$ | $\geq V_H$ | 0 | $\leq -V_H$ | 0 |
| $V_{CL}$ | $\geq V_L + V_{RS}$ | $\geq V_L + V_{RS}$ | $\geq V_L$ | $\leq -(V_L + V_{RS})$ | $\leq -V_L$ |
| $V_{CU}$ | $\geq 2 \times V_{RS}$ | $\geq V_L + V_{RS}$ | $\geq V_L$ | $\leq -(V_L + V_{RS})$ | $\leq -V_L$ |

*Fig. 8*

1530 generating, in response to Nltr and Ntbr (and optionally a release-order indication) one or more control commands for a group of subsets out of the first and the second pluralities of subsets, the group of subsets including at least the first C-subset 1531 generating a control command to the first C-subset 1532 generating a control command to a second C-subset (which is not the first C-subset 1533 generating a control command to each out of a group of one or more R-subsets

*Fig. 15B*

| Drive scheme | | 6 | 7 | 8 | 9 | 10 |
|---|---|---|---|---|---|---|
| $V_{RS}$ | Phase 1 | $\geq V_H$ | 0 | 0 | $+V_D$ | 0 |
| | Phase 2 | 0 | $\leq -V_H$ | $-V_D$ | 0 | $-V_D$ |
| $V_{RU}$ | Phase 1 | 0 | $\leq -V_H$ | $-V_D$ | 0 | $-V_D$ |
| | Phase 2 | 0 | $\leq -V_H$ | $-V_D$ | 0 | $-V_D$ |
| $V_{CR}$ | Phase 1 | $\geq V_H$ | 0 | 0 | $+V_D$ | 0 |
| | Phase 2 | $\geq V_H$ | 0 | 0 | $+V_D$ | $+V_D$ |
| $V_{CL}$ | Phase 1 | $\geq \max(V_L, 2 \times V_H)$ | $\geq \max(V_L - V_H, V_H)$ | $+V_D$ | $2 \times V_D$ | $+V_D$ |
| | Phase 2 | $\geq \max(V_L, 2 \times V_H)$ | $\geq \max(V_L - V_H, V_H)$ | $+V_D$ | $2 \times V_D$ | $+V_D$ |
| $V_{CU}$ | Phase 1 | $\geq \max(V_L, 2 \times V_H)$ | $\geq \max(V_L - V_H, V_H)$ | $+V_D$ | $2 \times V_D$ | $+V_D$ |
| | Phase 2 | $\geq \max(V_L, 2 \times V_H)$ | $\geq \max(V_L - V_H, V_H)$ | $+V_D$ | $2 \times V_D$ | $+V_D$ |

*Fig. 11*

| Drive scheme | | 11 | 12 | 13 | 14 | 15 | 16 | 17 |
|---|---|---|---|---|---|---|---|---|
| $V_{RS}$ | Phase 1 | 0 | 0 | 0 | 0 | 0 | 0 | 0 |
| | Phase 2 | $-V_D$ | $-V_D$ | $-V_D$ | $-V_D$ | $-V_D$ | $-V_D$ | $-V_D$ |
| $V_{RU}$ | Phase 1 | $-V_D$ | $-V_D$ | $-V_D$ | $-V_D$ | $-V_D$ | $-V_D$ | $-V_D$ |
| | Phase 2 | $-V_D$ | $-V_D$ | $-V_D$ | $-V_D$ | $-V_D$ | $-V_D$ | $-V_D$ |
| $V_{CR}$ | Phase 1 | 0 | 0 | 0 | 0 | 0 | 0 | 0 |
| | Phase 2 | 0 or $+V_D$ | 0 | $+V_D$ | 0 or $+V_D$ | 0 | $+V_D$ | 0 or $+V_D$ |
| $V_{CL}$ | Phase 1 | $+V_D$ | 0 | 0 | $+V_D$ | 0 or $+V_D$ | 0 or $+V_D$ | 0 or $+V_D$ |
| | Phase 2 | $+V_D$ | $+V_D$ | $+V_D$ | $+V_D$ | $+V_D$ | $+V_D$ | $+V_D$ |
| $V_{CU}$ | Phase 1 | $+V_D$ | $+V_D$ | $+V_D$ | $+V_D$ | $+V_D$ | $+V_D$ | $+V_D$ |
| | Phase 2 | $+V_D$ | $+V_D$ | $+V_D$ | $+V_D$ | $+V_D$ | $+V_D$ | $+V_D$ |

| | C0 | C1 | C2 | C3 | C4 | C5 | C6 | C7 | |
|---|---|---|---|---|---|---|---|---|---|
| | 00 | 08 | 10 | 18 | 20 | 28 | 30 | 38 | R0 |
| | 01 | 09 | 11 | 19 | 21 | 29 | 31 | 39 | R1 |
| | 02 | 0A | 12 | 1A | 22 | 2A | 32 | 3A | R2 |
| | 03 | 0B | 13 | 1B | 23 | 2B | 33 | 3B | R3 |
| | 04 | 0C | 14 | 1C | 24 | 2C | 34 | 3C | R4 |
| | 05 | 0D | 15 | 1D | 25 | 2D | 35 | 3D | R5 |
| | 06 | 0E | 16 | 1E | 26 | 2E | 36 | 3E | R6 |
| | 07 | 0F | 17 | 1F | 27 | 2F | 37 | 3F | R7 |

| Current C-subset: | C4 |
|---|---|
| Release order direction: | 1 |
| Last element released in C-subset (relative to release order) | 5 |
| Nltr (current C-subset): | 3 |

Fig. 17

| | C0 | C1 | C2 | C3 | C4 | C5 | C6 | C7 | |
|---|---|---|---|---|---|---|---|---|---|
| | 00 | 08 | 10 | 18 | 20 | 28 | 30 | 38 | R0 |
| | 01 | 09 | 11 | 19 | 21 | 29 | 31 | 39 | R1 |
| | 02 | 0A | 12 | 1A | 22 | 2A | 32 | 3A | R2 |
| | 03 | 0B | 13 | 1B | 23 | 2B | 33 | 3B | R3 |
| | 04 | 0C | 14 | 1C | 24 | 2C | 34 | 3C | R4 |
| | 05 | 0D | 15 | 1D | 25 | 2D | 35 | 3D | R5 |
| | 06 | 0E | 16 | 1E | 26 | 2E | 36 | 3E | R6 |
| | 07 | 0F | 17 | 1F | 27 | 2F | 37 | 3F | R7 |

| Current C-subset: | C4 |
|---|---|
| Release order direction: | 1 |
| Last element released in C-subset (relative to release order) | 5 |
| Nltr (current C-subset): | 3 |
| Ntbr (current clock) | 2 |

Fig. 19

| | C0 | C1 | C2 | C3 | C4 | C5 | C6 | C7 | |
|---|---|---|---|---|---|---|---|---|---|
| | 00 | 08 | 10 | 18 | 20 | 28 | 30 | 38 | R0 |
| | 01 | 09 | 11 | 19 | 21 | 29 | 31 | 39 | R1 |
| | 02 | 0A | 12 | 1A | 22 | 2A | 32 | 3A | R2 |
| | 03 | 0B | 13 | 1B | 23 | 2B | 33 | 3B | R3 |
| | 04 | 0C | 14 | 1C | 24 | 2C | 34 | 3C | R4 |
| | 05 | 0D | 15 | 1D | 25 | 2D | 35 | 3D | R5 |
| | 06 | 0E | 16 | 1E | 26 | 2E | 36 | 3E | R6 |
| | 07 | 0F | 17 | 1F | 27 | 2F | 37 | 3F | R7 |

1st C-subset → ; 2nd C-subset →

| | C4 |
|---|---|
| Current C-subset: | 1 |
| Release order direction: | |
| Last element released in C-subset (relative to release order) | 5 |
| Nltr (current C-subset): | 3 |
| Ntbr (current clock) | 5 |

Fig. 18

| | C0 | C1 | C2 | C3 | C4 | C5 | C6 | C7 | |
|---|---|---|---|---|---|---|---|---|---|
| | 00 | 08 | 10 | 18 | 20 | 28 | 30 | 38 | R0 |
| | 01 | 09 | 11 | 19 | 21 | 29 | 31 | 39 | R1 |
| | 02 | 0A | 12 | 1A | 22 | 2A | 32 | 3A | R2 |
| | 03 | 0B | 13 | 1B | 23 | 2B | 33 | 3B | R3 |
| | 04 | 0C | 14 | 1C | 24 | 2C | 34 | 3C | R4 |
| | 05 | 0D | 15 | 1D | 25 | 2D | 35 | 3D | R5 |
| | 06 | 0E | 16 | 1E | 26 | 2E | 36 | 3E | R6 |
| | 07 | 0F | 17 | 1F | 27 | 2F | 37 | 3F | R7 |

1st C-subset → ; 2nd C-subset →

| | C4 |
|---|---|
| Current C-subset: | 1 |
| Release order direction: | |
| Last element released in C-subset (relative to release order) | 5 |
| Nltr (current C-subset): | 3 |
| Ntbr (current clock) | 4 |

SYSTEM, A METHOD AND A COMPUTER PROGRAM PRODUCT FOR CONTROLLING A SET OF ACTUATOR ELEMENTS

CROSS-REFERENCE TO RELATED APPLICATIONS

This is a Continuation of application Ser. No. 14/402,599 filed Nov. 20, 2014, which in turn is a National Phase of PCT/IL2013/050444 filed May 23, 2013, which claims the benefit of U.S. Provisional Application No. 61/651,821 filed May 25, 2012. The disclosure of the prior applications is hereby incorporated by reference herein in its entirety.

FIELD

This invention relates to systems, methods and computer program products for controlling a set of actuator elements.

BACKGROUND

Conventional technology pertaining to certain embodiments of the present invention is described in the following publications inter alia:

Apparatus and methods for generating pressure waves are known e.g. from published PCT application WO 2007/135680; digital speaker devices are known e.g. from published PCT application WO 2009/066290.

Conventional noise shaping also termed sigma-delta modulation and delta-sigma modulation is described in "Understanding Delta-Sigma Data Converters" by Richard Schreier and Gabor C. Temes.

The disclosures of all publications and patent documents mentioned in the specification, and of the publications and patent documents cited therein directly or indirectly, are hereby incorporated by reference.

| Country | Ser. No. | Title |
|---|---|---|
| USA | 60/802,126 | AN APPARATUS FOR GENERATING PRESSURE |
| USA | 60/907,450 | APPARATUS FOR GENERATING PRESSURE AND METHODS OF MANUFACTURE THEREOF |
| USA | 60/872,488 | VOLUME CONTROL |
| PCT | PCT/IL2007/000622 | APPARATUS AND METHODS FOR GENERATING PRESSURE WAVES |
| USA | 60/924,203 | APPARATUS AND METHODS FOR GENERATING PRESSURE WAVES |
| USA |  | IMPROVED MANUFACTURING |
| PCT | PCT/IL2007/000618 | DIRECT DIGITAL SPEAKER APPARATUS HAVING A DESIRED DIRECTIVITY PATTERN |
| PCT | PCT/IL2007/000621 | VOLUME AND TONE CONTROL IN DIRECT DIGITAL SPEAKERS |
| USA | 60/996,513 | IMPROVED SPEAKER APPARATUS AND METHODS USEFUL IN CONJUNCTION THEREWITH |
| USA | 61/136,778 | ACTUATOR APPARATUS WITH COMB-DRIVE COMPONENT AND METHODS USEFUL FOR MANUFACTURING AND OPERATING SAME |
| PCT | PCT/IL2009/000943 | ACTUATOR APPARATUS WITH COMB-DRIVE COMPONENT AND METHODS USEFUL FOR MANUFACTURING AND OPERATING SAME |
| USA | 61/171,946 | DUST PROTECTION APPARATUS FOR FLAT DIGITAL LOUDSPEAKERS |
| USA | 61/476,352 | CORONA DISCHARGE |
| USA | 12/301,954 | VOLUME AND TONE CONTROL IN DIRECT DIGITAL SPEAKERS |
| PCT | PCT/IL2008/001524 | DIGITAL SPEAKER APPARATUS |
| USA | 12/301,951 | APPARATUS AND METHODS FOR GENERATING PRESSURE WAVES |
| USA | 12/601,427 | DIRECT DIGITAL SPEAKER APPARATUS HAVING A DESIRED DIRECTIVITY PATTERN |
| PCT | PCT/IL2011/050018 | APPARATUS AND METHODS FOR INDIVIDUAL ADDRESSING AND NOISE REDUCTION IN ACTUATOR ARRAYS |
| USA | 61/468,916 | APPARATUS AND METHODS FOR INDIVIDUAL ADDRESSING AND NOISE REDUCTION IN ACTUATOR ARRAYS |
| USA | 61/417,298 | METHODS FOR INDIVIDUAL ADDRESSING AND NOISE REDUCTION IN ACTUATOR ARRAYS |

GENERAL DESCRIPTION

According to an aspect of the invention, a system is disclosed, which controls an apparatus which includes a set of actuator elements, each including a moving element which moves between first and second extreme positions, wherein each actuator element of the set is included in: (a) exactly one first subset out of a plurality of non-empty first subsets (R-subsets) of the set of actuator elements; and (b) exactly one second subset out of a plurality of non-empty second subsets (C-subsets) of the set of actuator elements; the system including: (A) a processor, configured to: (i) determine a maximal number (Nltr) of moving elements which may be released from the first extreme position at a second sampling cycle in a first C-subset which includes moving elements released from the first extreme position in a first sampling cycle, based on: a number of the moving elements of the first C-subset which were released from the first extreme position in the first sampling cycle; (ii) obtain a number (Ntbr) of moving elements which, if released from the first extreme position during the second sampling cycle, enables production by the apparatus during the second sampling cycle of a physical effect, at least one attribute of which corresponds to at least one characteristic of a digital input signal; and (iii) generate one or more control commands for a group of subsets out of the first and the second pluralities of subsets, in response to: (a) Nltr, (b) Ntbr, and (c) a first release-order indication, indicative of an order in which moving elements of the first C-subset are released from the first extreme position; wherein the group of subsets including the first C-subset; and (B) an interface for transferring the control commands to the apparatus, thereby resulting in movement of at least one moving element which is included in the first C-subset from the first extreme position.

Optionally, the first sampling cycle is the last sampling cycle before the second sampling cycle in which any moving element of the apparatus was released from the first extreme position.

Optionally, the physical effect is sound.

Optionally, the system further includes the apparatus.

Optionally, each of the set of actuator elements is an electrostatic actuator elements including the moving element which is operative to move between the first extreme position and the second extreme position, which is farther from a first electrode of said actuator element than the first extreme position, responsive to potentials applied to the first electrode and to the moving element based on control commands issued by the processor for the R-subset and the C-subset in which said moving element is included.

Optionally, the apparatus includes a first plurality of electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset; and a second plurality of electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset; wherein electric potentials applied to each of the R-wires and to each of the A-wires in response to control commands issued by the processor result in movements of the moving elements which together produce an outcome physical effect, at least one attribute of which corresponds to at least one characteristic of a digital input signal.

Optionally, if a first criterion which is based on relationships between Nltr and Ntbr is met, the subgroup of subsets to which the processor generates control commands includes a second C-subset other than the first C-subset, wherein the interface is configured to transfer the control commands to the apparatus, thereby resulting in movement from the first extreme position of Nltr movable elements which are included in the first C-subset and of a number N(C2) of movable elements which are included in the second C-subset; and the processor is further configured to determine a second release-order indication, indicative of an order in which moving elements of the second C-subset are released from the first extreme position, wherein the second release-order indication is indicative of a different order than the order in which the moving elements of the first C-subset are released from the first extreme position.

Optionally, each of the first and the second release-order indications includes a binary value indicative of an order in which moving elements of a respective C-subset are released from the first extreme position.

Optionally, the system further includes a memory module configured to store permutational information indicative of an order in which moving elements of at least one of the plurality of C-subset are released from the first extreme position, wherein a control command issued by the processor for one of the at least one R-subsets is transferred to a corresponding R-subset which is selected based on the permutational information.

Optionally, the system further includes an order manager, which is configured to periodically generate swapping information indicative of at least one subgroup of swappable R-subsets such that for every individual C-subset of the plurality of C-subsets, all of the moving elements in each of that subgroup of R-subsets which are also included in the individual C-subset are in the same position, and if in movement moving in the same direction, and to periodically amend the permutational information based on the swapping information.

Optionally, N(C2) is equal or greater than Nltr, wherein the processor is configured to generate the control commands including N(C2) movement-inducing control commands which are issued to N(C2) different R-subsets, thereby causing the number of movable elements moving from the first extreme position to be N(C2); and the processor is configured so that when issuing movement-inducing control commands at any sampling cycle to more than one C-subset, to issue movement-inducing control commands to a number of different R-subsets which is equal to or larger than a corresponding maximal number of moving elements which may be released from the first extreme position at the corresponding sampling cycle in a corresponding C-subset.

Optionally, the processor is configured to refrain from generating movement-inducing commands to any C-subset other than the first C-subset if Ntbr is larger than Nltr, if a second criterion which is based on relationships between Nltr and Ntbr is met.

Optionally, the processor is further configured so that, if generating control commands whose transfer to the apparatus results in movement from the first extreme position of Nltr moving elements which are included in the first C-subset, it further determines an additional release-order indication which includes a corresponding binary value indicative of an order in which moving elements of a corresponding C-subset are released from the first extreme position, and to set the binary value to a corresponding binary value included in the first release-order indication.

Optionally, the processor is configured to generate the control commands in response to historical information indicative of movement of elements from at least one of the extreme positions in one or more sampling cycles preceding the second sampling cycle.

Optionally, a movement from the first extreme position to the second extreme position of each moving element of the set is completed within k sampling cycles, where k is a positive integer; and the processor is configured to apply a first set of decision criteria for generating the control commands if no moving element of the set moved from the first extreme position in the preceding k−1 sampling cycle, and to otherwise apply at least one other set of decision criteria.

Optionally, the processor is configured to generate control commands whose transfer to the apparatus results in movement from the first extreme position of moving elements in which are included in the first C-subset in a number Nc1 which is smaller than a number of moving elements in the first C-subset which are positioned in the first extreme position if Ntbr is larger than Nc1, if a third criterion which is based on the historical information is fulfilled.

Optionally, the processor is configured to execute, in each of a series of sampling cycles: (A) obtain a number (Ntbr (m)) of moving elements which, if released from the first extreme position during an m'th sampling cycle, enables production by the apparatus during the m'th sampling cycle of a physical effect, at least one attribute of which corresponds to at least one characteristic of a digital input signal; and (B) generate control commands for at least one subset of the set of movable elements, in response to Ntbr(m), to a number of the moving elements of a p'th C-subset which were released from the first extreme position in a respective preceding sampling cycle, and to a p'th release-order indication, indicative of an order in which moving elements of the p'th C-subset are released from the first extreme position at the m'th cycle.

Optionally, where intersections of any individual one of said first subsets of actuator elements and any individual one of said second subsets of actuator elements all include a uniform number of actuator elements Optionally, the processor further include a defective actuator element counting module which is configured to process the one or more control commands and to determine a defective actuator elements error based on the control commands, wherein the apparatus suffers from defective elements noise resulting from malfunctioning actuator elements during one or more actuation clock cycles, the defective elements noise having a frequency spectrum, wherein the processor includes a noise shaping loop operative to shape the frequency spectrum of the defective elements noise based on the defective actuator elements error such that defective elements noise energy is reduced within a frequency band of interest and increased outside said band of interest.

Optionally, the system includes an override module which is configured to obtain information pertaining to a functionality level of actuator elements of the apparatus and to selectively modify at least one of the control commands, thereby preventing a releasing of a latched defective moving element.

According to an aspect of the invention, there is disclosed a method for controlling an apparatus which includes a set of actuator elements, each including a moving element which moves between first and second extreme positions, wherein each actuator element of the set is included in: (a) exactly one first subset out of a plurality of non-empty first subsets (R-subsets) of the set of actuator elements; and (b) exactly one second subset out of a plurality of non-empty second subsets (C-subsets) of the set of actuator elements; the method including: (A) determining a maximal number (Nltr) of moving elements which may be released from the first extreme position at a second sampling cycle in a first C-subset which includes moving elements released from the first extreme position in a first sampling cycle, the determining based on a number of the moving elements of the first C-subset which were released from the first extreme position in the first sampling cycle; (B), obtaining a number (Ntbr) of moving elements which, if released from the first extreme position during the second sampling cycle, enables production by the apparatus during the second sampling cycle of a physical effect, at least one attribute of which corresponds to at least one characteristic of a digital input signal; (C) generating one or more control commands for a group of subsets out of the first and the second pluralities of subsets in response to Nltr, Ntbr, and a first release-order indication, indicative of an order in which moving elements of the first C-subset are released from the first extreme position; wherein the group of subsets including the first C-subset; and (D) transferring the control commands to the apparatus, thereby resulting in movement of at least one moving element which is included in the first C-subset from the first extreme position.

Optionally, the method further includes generating the physical effect at the second sampling cycle, resulting from movement of a group of moving elements which includes the at least one moving element.

Optionally, the first sampling cycle is the last sampling cycle before the second sampling cycle in which any moving element of the apparatus was released from the first extreme position.

Optionally, the physical effect is sound.

Optionally, each of the set of actuator elements is an electrostatic actuator elements including the moving element which is operative to move between the first extreme position and the second extreme position, which is farther from a first electrode of said actuator element than the first extreme position, responsive to potentials applied to the first electrode and to the moving element based on the control commands generated for the group of subsets which includes the R-subset and the C-subset in which said moving element is included.

Optionally, the generating includes generating, if a first criterion which is based on relationships between Nltr and Ntbr is met, a control command for a second C-subset other than the first C-subset, wherein transferring of generated control commands results in movement from the first extreme position of Nltr movable elements which are included in the first C-subset and of a number N(C2) of movable elements which are included in the second C-subset.

Optionally, the method further includes determining a second release-order indication, indicative of an order in which moving elements of the second C-subset are released from the first extreme position, wherein the second release-order indication is indicative of a different order than the order in which the moving elements of the first C-subset are released from the first extreme position.

Optionally, each of the first and the second release-order indications includes a binary value indicative of an order in which moving elements of a respective C-subset are released from the first extreme position.

Optionally, the method further includes storing in a memory module permutational information indicative of an order in which moving elements of at least one of the plurality of C-subset are released from the first extreme position, wherein the transferring includes transferring at least one of the generated control command to at least one corresponding R-subset which is selected based on the permutational information.

Optionally, the method includes periodically generating swapping information indicative of at least one subgroup of swappable R-subsets such that for every individual C-subset of the plurality of C-subsets, all of the moving elements in each of that subgroup of R-subsets which are also included in the individual C-subset are in the same position and if in movement moving in the same direction, and to periodically amending the permutational information based on the swapping information.

Optionally, N(C2) is equal or greater than Nltr, wherein the generating includes generating control commands to the group of subsets which includes N(C2) different R-subsets, thereby causing the number of movable elements moving from the first extreme position to be N(C2); and the generating is executed according to rules which require that if a group of induced-subsets to which movement-inducing control commands are generated at any sampling cycle includes more than one C-subset, than it also includes a number of different R-subsets which is equal to or larger than a corresponding maximal number of moving elements which may be released from the first extreme position at the corresponding sampling cycle in a corresponding C-subset.

Optionally, the generating is executed according to rules which prevent generating movement-inducing commands to any C-subset other than the first C-subset if Ntbr is larger than Nltr, if a second criterion which is based on relationships between Nltr and Ntbr is met.

Optionally, the method further includes determining an additional release-order indication which includes a corresponding binary value indicative of an order in which moving elements of a corresponding C-subset are released from the first extreme position if the generating of the control commands includes generating control commands whose transfer to the apparatus results in movement from the first extreme position of Nltr moving elements which are included in the first C-subset; wherein the determining of the additional release-order indication includes setting the binary value to a corresponding binary value included in the first release-order indication.

Optionally, the generating is responsive to historical information indicative of movement of elements from at least one of the extreme positions in one or more sampling cycles preceding the second sampling cycle.

Optionally, a movement from the first extreme position to the second extreme position of each moving element of the set is completed within k sampling cycles, where k is a positive integer; and the generating includes applying a first set of decision criteria for generating the control commands if no moving element of the set moved from the first extreme position in the preceding k−1 sampling cycle, and to otherwise applying at least one other set of decision criteria.

Optionally, the generating includes generating control commands whose transfer to the apparatus results in movement from the first extreme position of moving elements in which are included in the first C-subset in a number Nc1 which is smaller than a number of moving elements in the first C-subset which are positioned in the first extreme position if Ntbr is larger than Nc1, if a third criterion which is based on the historical information is fulfilled.

Optionally, the method includes executing in each of a series of sampling cycles: (A) obtaining a number (Ntbr(m)) of moving elements which, if released from the first extreme position during an m'th sampling cycle, enables production by the apparatus during the m'th sampling cycle of a physical effect, at least one attribute of which corresponds to at least one characteristic of a digital input signal; and (B) generating control commands for at least one subset of the set of movable elements, in response to Ntbr(m), to a number of the moving elements of a p'th C-subset which were released from the first extreme position in a respective preceding sampling cycle, and to a p'th release-order indication, indicative of an order in which moving elements of the p'th C-subset are released from the first extreme position at the m'th cycle.

Optionally, intersections of any individual one of said first subsets of actuator elements and any individual one of said second subsets of actuator elements all include a uniform number of actuator elements According to an aspect of the invention, there is disclosed a program storage device readable by machine, tangibly embodying a program of instructions executable by the machine to perform method for controlling an apparatus which includes a set of actuator elements, each including a moving element which moves between first and second extreme positions, wherein each actuator element of the set is included in: (a) exactly one first subset out of a plurality of non-empty first subsets (R-subsets) of the set of actuator elements; and (b) exactly one second subset out of a plurality of non-empty second subsets (C-subsets) of the set of actuator elements; the method including: (A) determining a maximal number (Nltr) of moving elements which may be released from the first extreme position at a second sampling cycle in a first C-subset which includes moving elements released from the first extreme position in a first sampling cycle, the determining based on a number of the moving elements of the first C-subset which were released from the first extreme position in the first sampling cycle; (B) obtaining a number (Ntbr) of moving elements which, if released from the first extreme position during the second sampling cycle, enables production by the apparatus during the second sampling cycle of a physical effect, at least one attribute of which corresponds to at least one characteristic of a digital input signal; (C) generating one or more control commands for a group of subsets out of the first and the second pluralities of subsets in response to Nltr, Ntbr, and a first release-order indication, indicative of an order in which moving elements of the first C-subset are released from the first extreme position; wherein the group of subsets including the first C-subset; and (D) transferring the control commands to the apparatus, thereby resulting in movement of at least one moving element which is included in the first C-subset from the first extreme position.

Optionally, and of the above variations of the disclosed method may be implemented for the computer readable code. In case additional stages or variations are disclosed, the computer readable code may include instructions for the execution of the respective stages.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 8, 11 and 12 are tables useful in understanding certain embodiments of the invention.

FIG. 15B includes various possible implementations of one of the stages of the method of FIG. 15A;

FIGS. 16 through 21 illustrate different states of an apparatus which result from various sets of control commands;

FIGS. 24-26 are simplified representations of an actuator array in various positions, e.g. after a swapping procedure, all in accordance with certain embodiments of the invention;

FIGS. 27-29 are simplified block diagrams of a controller and actuator array controlled thereby, all constructed and operative in accordance with certain embodiments of the invention.

Figure 1A:
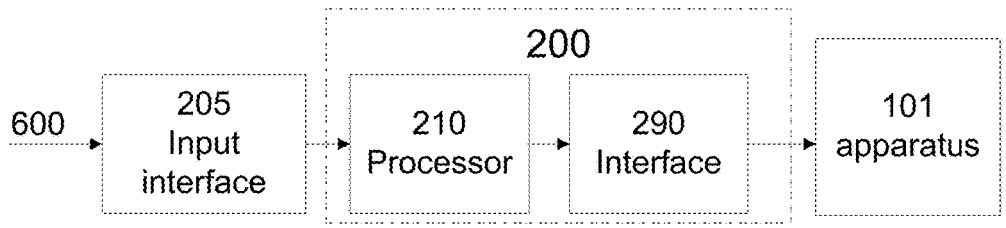
FIGS. 1A through 1D are a block diagrams of systems which controls an apparatus which includes a set of actuator elements, according to an embodiment of the invention.
Figure 1B:
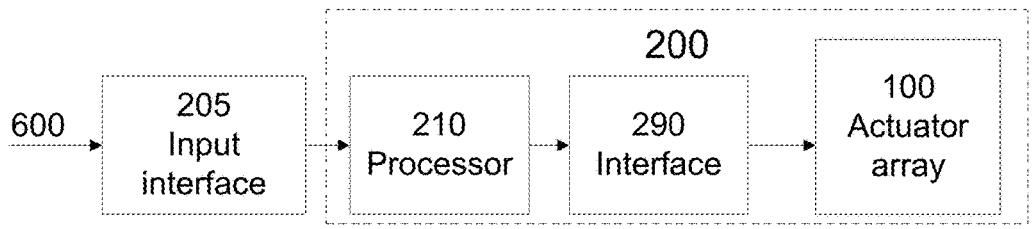
Figure 1C:
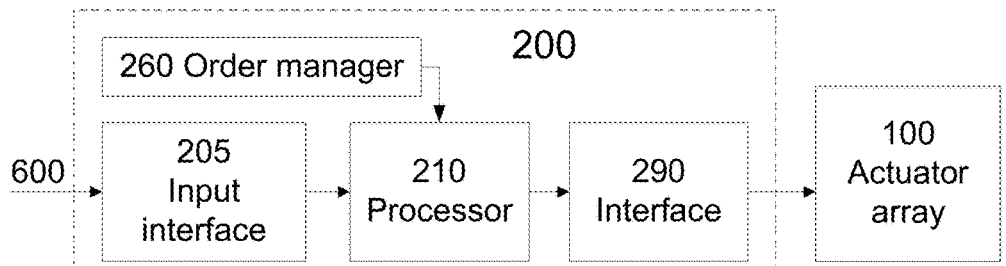
Figure 1D:
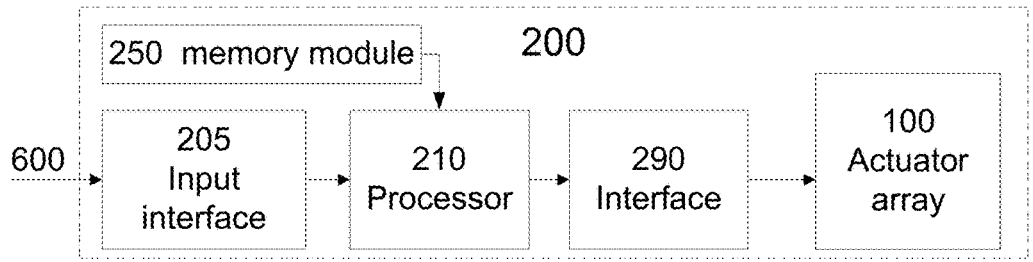

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "issuing", or the like, include action and/or processes of a computer that manipulate and/or transform data into other data, said data represented as physical quantities, e.g. such as electronic quantities, and/or said data representing the physical objects. The terms "computer", "processor" and "controller" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

Computational components described and illustrated herein can be implemented in various forms, for example, as hardware circuits such as but not limited to custom VLSI circuits or gate arrays or programmable hardware devices such as but not limited to FPGAs, microcontrollers or digital signal processors (DSPs), or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

FIGS. 1A through 1D illustrate system 200 which may be used for controlling an apparatus (such as apparatus 100) which includes a set of actuator elements 110, according to various embodiments of the invention. Each of the actuator elements 110 includes a moving element 120 which moves between first and second extreme positions (represented for example by electrodes 130 and 140 in FIG. 30A). It is noted that the term "the apparatus" as used in this document refers to the apparatus which includes the set of actuator elements. While such apparatus may be a part of system 200, it may also be external to it. For example, the apparatus may be an apparatus such as apparatus 100.

While system 200 includes processor 210 and interface 290, apparatus 100 itself and/or input interface 205 may and may be not a part of system 200. It is noted that in the following discussion the term "controller" is already used for a component which issues control command to the apparatus, thereby resulting in movement of moving elements 120 of the apparatus. It is noted that all the variations discussed with respect to such a controller may be implemented by processor 210, by an intermediary controller connected between processor 210 and apparatus 100 (intermediary controller which may be part of system 200, but not necessarily), and by a combination of them.

Before system 200 (illustrated in FIGS. 1A through 1D) and its ways of operations are discussed, examples for such apparatuses 100 will be provided. It is noted that system 200 is not limited to control of apparatuses including actuator elements which are discussed below, and that the apparatuses discussed below are offered by way of a non limiting examples. Additional examples for apparatuses which include multiple actuator elements which may be controlled according to the teachings of the present invention are provided in Patent Cooperation Treaty (PCT) applications: PCT/IL2007/000622 (published as WO 2007/135680); PCT/IL2007/000621 (published as WO 2007/135679), PCT/IL2008/001524 (published as WO 2009/066290), PCT/IL2011/000226 (published as WO 2011/111042), and PCT/IL2011/050018, all of which are incorporated herein by way of example.

After examples of apparatuses are provided, method 1500, which may be implemented by system 200 for control of apparatus 100, will be discussed in detail, a discussion which renders the operation of system 200 clearer. It should be noted that all the mentioned variations of method 1500 may be implemented by corresponding variations of system 200, even if not explicitly elaborated, and vice versa.

Figure 2:
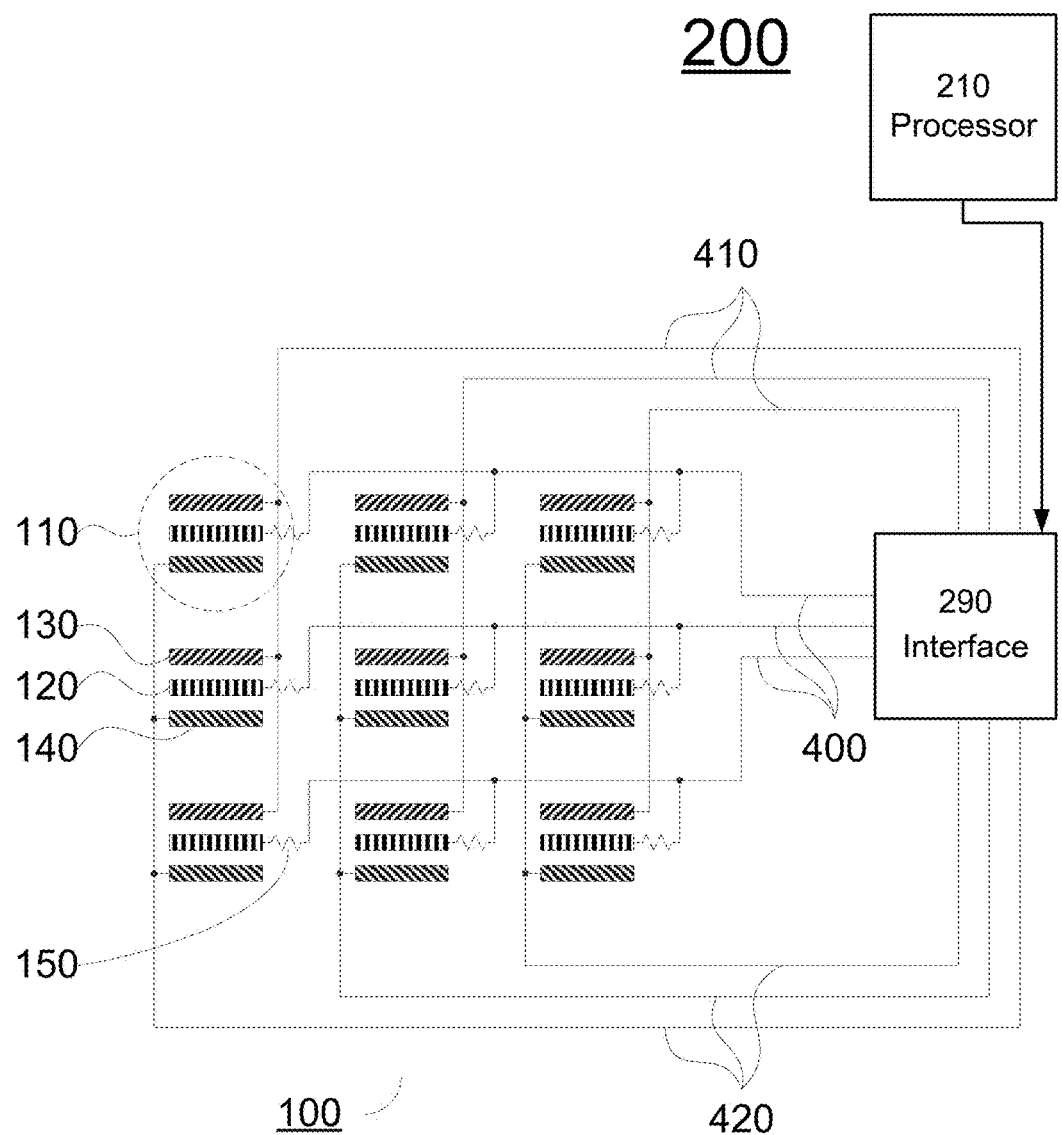
FIGS. 2-4 are simplified schematic diagrams of actuator arrays in accordance with certain embodiments of the invention.

FIG. 2 illustrates apparatus 100 which includes multiple actuator elements 110, according to an embodiment of the invention. Apparatus 100 may be used for generating a physical effect, at least one attribute of which corresponds to at least one characteristic of a digital input signal sampled periodically. Apparatus 100 includes a multiplicity of actuator elements 110, each including a moving element moving between first and second extreme positions. In the illustrated example, the extreme positions are defined by electrodes 130 and 140 which are used for controlling the movement of the actuator elements, but this is not necessarily so. For example, the extreme positions may be defined by mechanical stoppers which stop the movement of the respective movable elements 110.

In the illustrated example, the movable elements 120 of the respective actuator elements 110 are controlled by controlling voltages in the respective electrodes 130 and 140 as well as in the movable elements themselves. The various voltages applied to different components of each actuator element 110 result in electrostatic attraction or repelling of the respective movable element 120 of that actuator element 110 to or from one of the electrodes 130 and/or 140. Therefore, actuator elements 110 are also referred to as electrostatic actuator elements. However, as will be clear to a person having ordinary skill in the art, the controlling by system 200 is not limited to actuator elements 110 which are controlled electrostatically or which implement electrostatic principles, and therefore each actuator element referred to as electrostatic actuator element may be implemented using other types of actuator elements (e.g. magnetically controlled actuator elements, hydraulically controlled actuator elements, and so on).

The multiplicity of actuator elements may be divided into two different divisions: into Nr first subsets (R-subsets) of actuator elements and into Nc second subsets (C-subsets) of actuator elements. A first partitioning of the multiplicity of actuator elements yields the Nr first subsets (R-subsets) and a second partitioning of the multiplicity of actuator elements yields the Nc second subsets (C-subsets). Such partitioning of the multiplicity of actuator elements is exemplified in FIG. 16.

The actuator elements in each of the subsets are connected (or otherwise arranged) in a way which enables a control command to affect all of the actuator elements 110 of the respective subset together. For example, respective components in each of the actuator elements in each of the subsets (for example—all of the movable elements) may be electronically connected to each other, so that the same voltage may be applied to all of those parts (e.g. the movable elements) together. It should however be noted that even though a single control command may be applied to all of the actuator elements of a subset, not necessarily all of those actuator elements would behave in the same way. For example, if different control commands may be sent to the moving element of each of those actuator elements and to its electrodes, even though a single voltage may be applied to all of the movable elements of a single subset of actuator array, the voltages applied to the electrodes 130 of these actuator elements 110 may differ.

In the illustrated implementation, a first plurality of Nr electrical connections (R-wires) interconnects the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset.

In the illustrated implementation, a second plurality of Nc electrical connections (A-wires) interconnects the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset.

A third plurality of Nc electrical connections (B-wires) interconnects the second electrodes of actuator elements in each C-subset, such that the second electrode of any actuator element in each individual C-subset is electrically connected to the second electrode of all other actuator elements in the individual C-subset, and electrically isolated from all actuator elements not in the individual C-subset.

The actuator elements of apparatus 100 may be controlled by one or more controllers (e.g. one or more processors, which may be a part of the apparatus, but are also external thereto). Continuing the example of electrostatically controlled actuator elements, such a controller may be electrically connected to the first, second and third pluralities of electrical connections, operative to receive a digital input signal, and to apply an electric potential to each of the electrical connections respectively, such that resulting movements of the moving elements together produce the desired physical effect. It is appreciated that R-subsets may have, but need not all have, the same number of elements. The same is true for the C-subsets. Each of the R-subsets may or may not intersect with all C-subsets. Likewise, each of the C-subsets may or may not intersect with all R-subsets. Optionally, the electric potentials applied by the processor are selected from a predetermined, finite set of electric potentials, but this is not necessarily so.

According to certain embodiments, e.g. as shown and described herein with reference to FIG. 2, the processor is operative to determine, according to the digital input signal, Nr-tuples of electrical potential for application to the first plurality of Nr electrical connections (R-wires) respectively, first Nc-tuples of electrical potential for application to the second plurality of Nc electrical connections (A-wires) respectively, and second Nc-tuples of electrical potential for application to the third plurality of Nc electrical connections (B-wires) respectively.

It would be understood to a person who is skilled in the art that equivalently, the processor may be operative to determine according to the digital input signal, respective tuples of electrical voltage for application to the respective pluralities of electrical connections. Since the voltages are potential differences (e.g. measured with comparison to a ground voltage), in the following discussed systems and methods, applying a determined potential may be implemented as applying a determined voltage (and vice versa).

Figure 14:
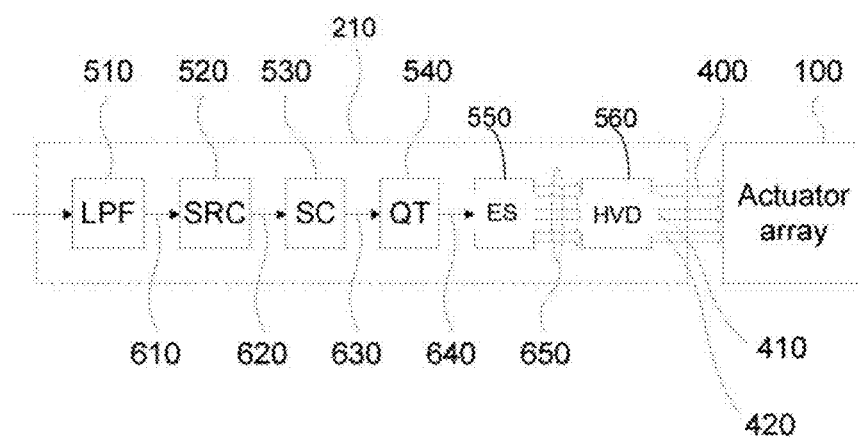
FIG. 14 is a simplified block diagram of a controller and actuator array controlled thereby, constructed and operative in accordance with certain embodiments of the invention.

According to certain embodiments, e.g. as shown and described herein with reference to FIGS. 2 and 14, the Nr-tuples, first Nc-tuples and second Nc-tuples are determined by the controller such that their application to the first, second and third plurality of electrical connections respectively causes the moving elements of the multiplicity of actuator elements to produce a physical effect which corresponds to at least one characteristic of the digital input signal.

It is noted that the controller does not have to issue a full tuple of electrical potentials any time new control commands are issued. For example, if apparatus 101 includes means for storing previous potentials applied to its electrical connections, new electrical potential should be issued by the controller when differing from previously applied potentials, but not necessarily otherwise. However, as a matter of convenience, applying whole tuples is used to exemplify the operation of apparatus 101.

Figure 30A:
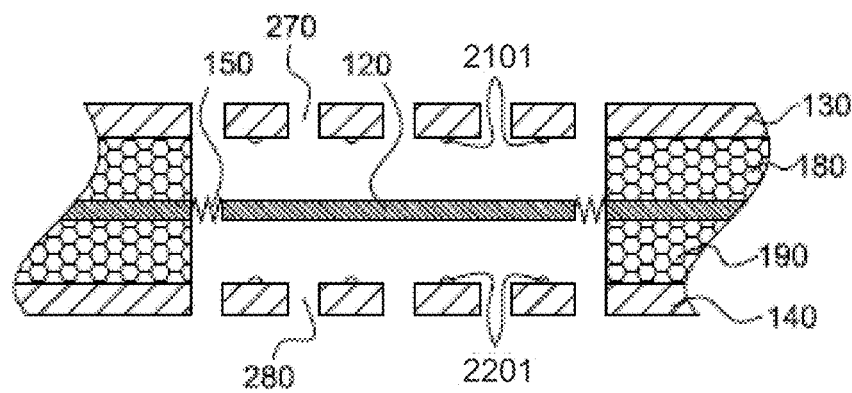
FIGS. 30A to 30C are cross-sectional illustrations of one type of double-sided electrostatic actuator element useful in forming actuator arrays in accordance with certain embodiments of the invention.
Figure 30B:
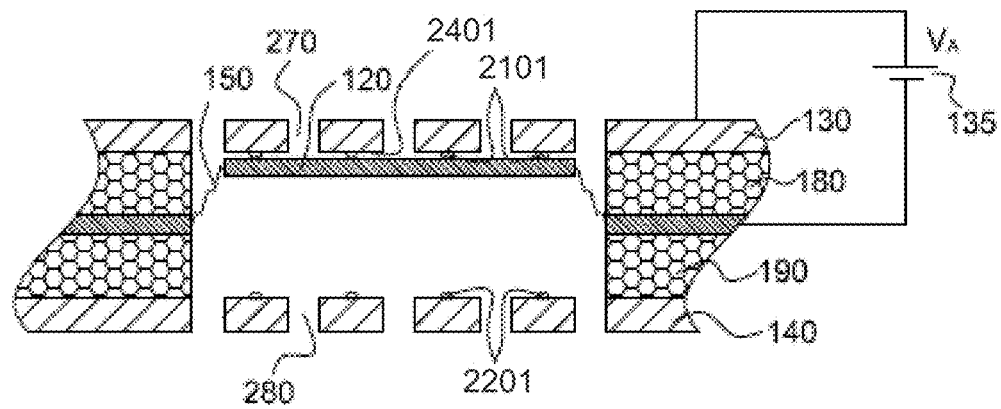
Figure 30C:
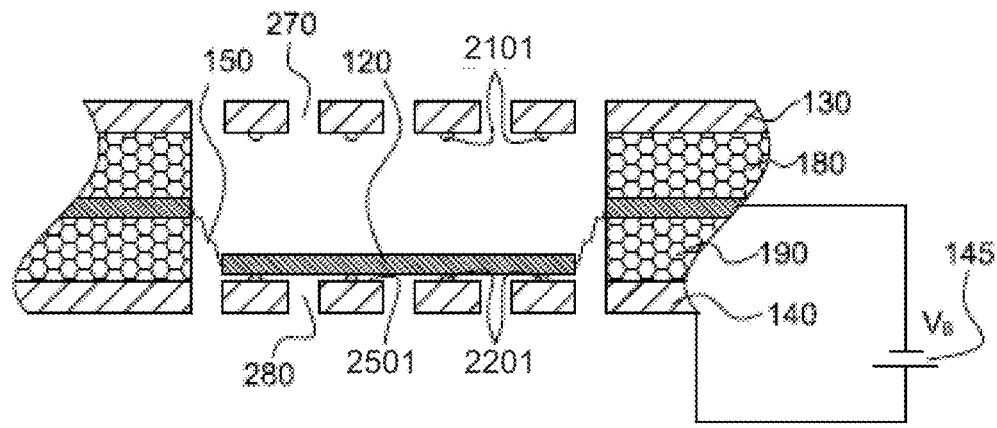

According to certain embodiments, e.g. as shown and described herein with reference to FIG. 30B-30C, each moving element is operative, responsive to potentials applied by the controller, to move from a first extreme position closer to the first electrode than to the second electrode, to a second extreme position closer to the second electrode than to the first electrode, and back.

Figure 3:
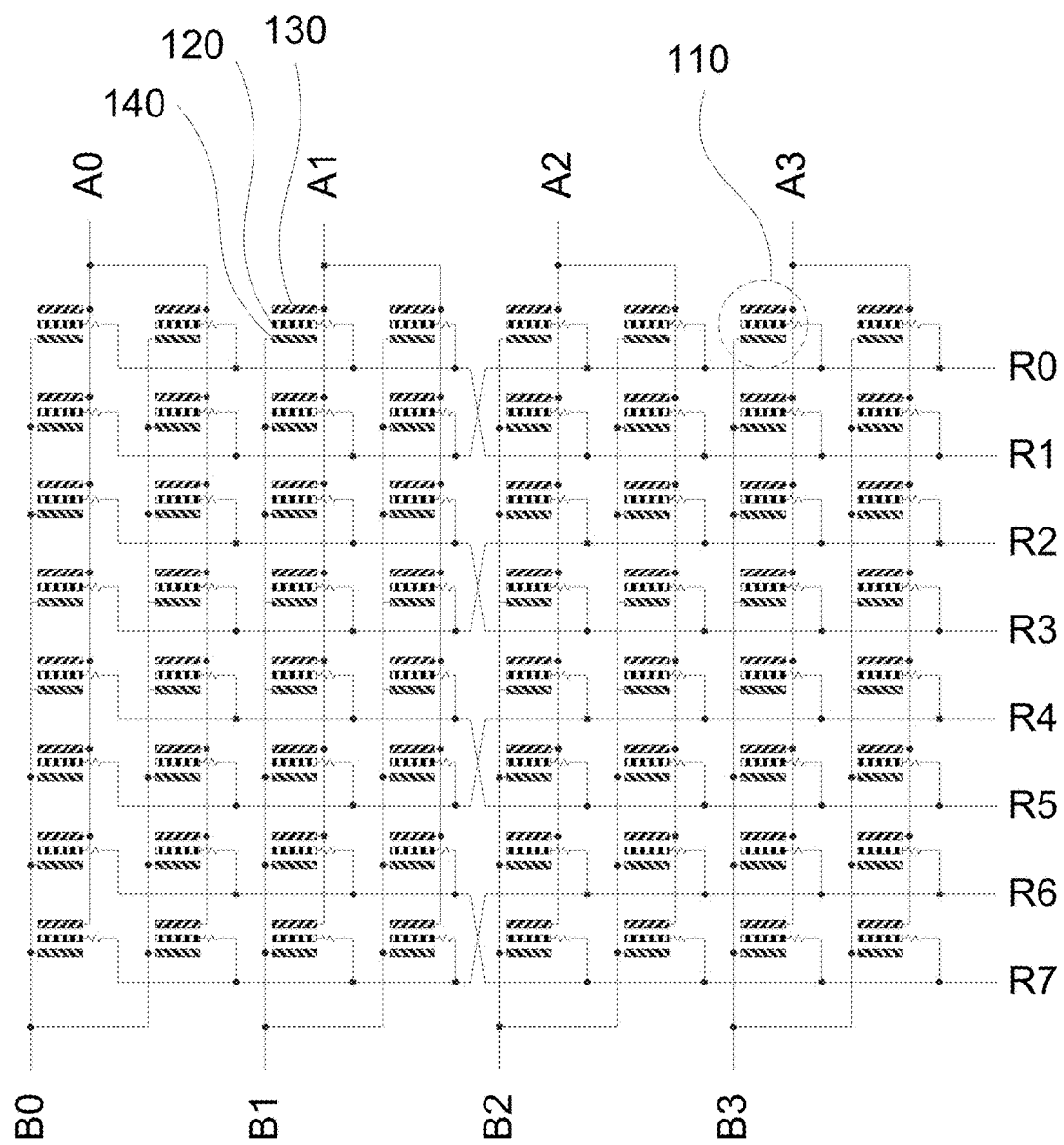

According to certain embodiments, e.g. as shown and described herein with reference to FIG. 2-3, intersections of any individual one of the first subsets of actuator elements and any individual one of the second subsets of actuator elements all include a uniform number of actuator elements (1 or more).

According to certain embodiments, e.g. as shown and described herein with reference to FIGS. 4-8 and 10-12, the predetermined, the set of electric potentials which may be applied to the electrical connections of the plurality of R-subsets and C-subsets includes first and second finite sets of electrical potential values. The Nr-tuples of electrical potentials are selected from the first finite sets of electrical potential values; and the first and second Nc-tuples of electrical potentials are selected from the second finite sets of electrical potential values.

For various technical considerations (e.g. electrical complexity, electrical efficiency, control simplicity, etc.), one or more of the following variations may be applied: At least one member of the first and second finite sets of electrical potential values may be zero (ground). Each of the first and second finite set of electrical potential values may include a member that is zero (ground). At least one of the first and second finite sets of electrical potential values may have exactly two values. Both of the first and second finite sets of electrical potential values may have exactly two values. At least one of the first and second finite sets of electrical potential values may have exactly three values. At least one member of the first finite set of electrical potential values may equal at least one member of the second finite set of electrical potential values. At least one member of the first finite set of electrical potential values may be twice the value of at least one member of the second finite set of electrical potential values. At least one member of the first finite set of electrical potential values may be equal in magnitude and opposite in polarity, relative to at least one member of the second finite set of electrical potential values.

According to certain embodiments, e.g. as shown and described herein with reference to FIGS. 2 and 14, the controller is operative to periodically apply one of the predetermined, finite sets of electric potentials to each member of the first, second and third pluralities of electrical connections respectively. The controller may be operative to periodically determine, according to the digital input signal, Nr-tuples of electrical potential for periodic application to the Nr members of the first plurality of electrical connections (R-wires) respectively, first Nc-tuples of electrical potential for periodic application to the Nc members of the second plurality of electrical connections (A-wires) respectively, and second Nc-tuples of electrical potential for periodic application to the Nc members of the third plurality of electrical connections (B-wires) respectively. Application of the Nr-tuples, first Nc-tuples and second Nc-tuples of electrical potential may be synchronous with an actuation clock, such that an Nr-tuple of electrical potential is applied to the first plurality of Nr electrical connections (R-wires), a first Nc-tuple of electrical potential is applied to the second plurality of Nc electrical connections (R-wires), and a second Nc-tuple of electrical potential is applied to the third plurality of Nc electrical connections (B-wires), periodically and simultaneously, once every actuation clock cycle, for the duration of the actuation clock cycle.

According to certain embodiments, e.g. as shown and described herein with reference to FIG. 30B-30C, each moving element is operative, responsive to the potential applied by the controller, to move from a first extreme position, closer to the first electrode than to the second electrode, to a second extreme position, closer to the second electrode than to the first electrode, and back, and where such movements are completed within a single actuation clock cycle. Each moving element may, e.g. as described herein with reference to FIG. 9, be operative, responsive to the potential applied by the controller, to move from a first extreme position, closer to the first electrode than to the second electrode, to a second extreme position, closer to the second electrode than to the first electrode, and back, and where such movements are completed within k actuation clock cycles, where k is a positive integer, e.g. 2 (FIGS. 9, 10 e.g.) or larger.

According to certain embodiments, e.g. as shown and described herein with reference to FIG. 2, a manufacturing method is provided, for manufacturing apparatus for generating a physical effect, at least one attribute of which corresponds to at least one characteristic of a digital input signal sampled periodically, the method including:

providing a multiplicity of electrostatic actuator elements, each including a moving element moving between first and second electrodes, the providing including defining: (a) a first partitioning of the multiplicity of actuator elements into Nr first subsets (R-subsets), and (b) a second partitioning of the multiplicity of actuator elements into Nc second subsets (C-subsets);

interconnecting the moving elements of actuator elements in each R-subset, via a first plurality of Nr electrical connections (R-wires), such that the moving element of any actuator element in each individual R-subset is electrically connected to the moving elements of all other actuator elements in the individual R-subset, and electrically isolated from the moving elements of all actuator elements not in the individual R-subset;

interconnecting the first electrodes of actuator elements in each C-subset, via a second plurality of Nc electrical connections (A-wires), such that the first electrode of any actuator element in each individual C-subset is electrically connected to the first electrode of all other actuator elements in the individual C-subset, and electrically isolated from all actuator elements not in the individual C-subset;

interconnecting the second electrodes of actuator elements in each C-subset, a third plurality of Nc electrical connections (B-wires), such that the second electrode of any actuator element in each individual C-subset is electrically connected to the second electrode of all other actuator elements in the individual C-subset, and electrically isolated from all actuator elements not in the individual C-subset; and providing a controller electrically connected to the first, second and third pluralities of electrical connections, operative to receive a digital input signal, and to apply one of a predetermined, finite set of electric potentials to each of the electrical connections respectively, such that resulting movements of the moving elements together produce the desired physical effect.

Figure 10:
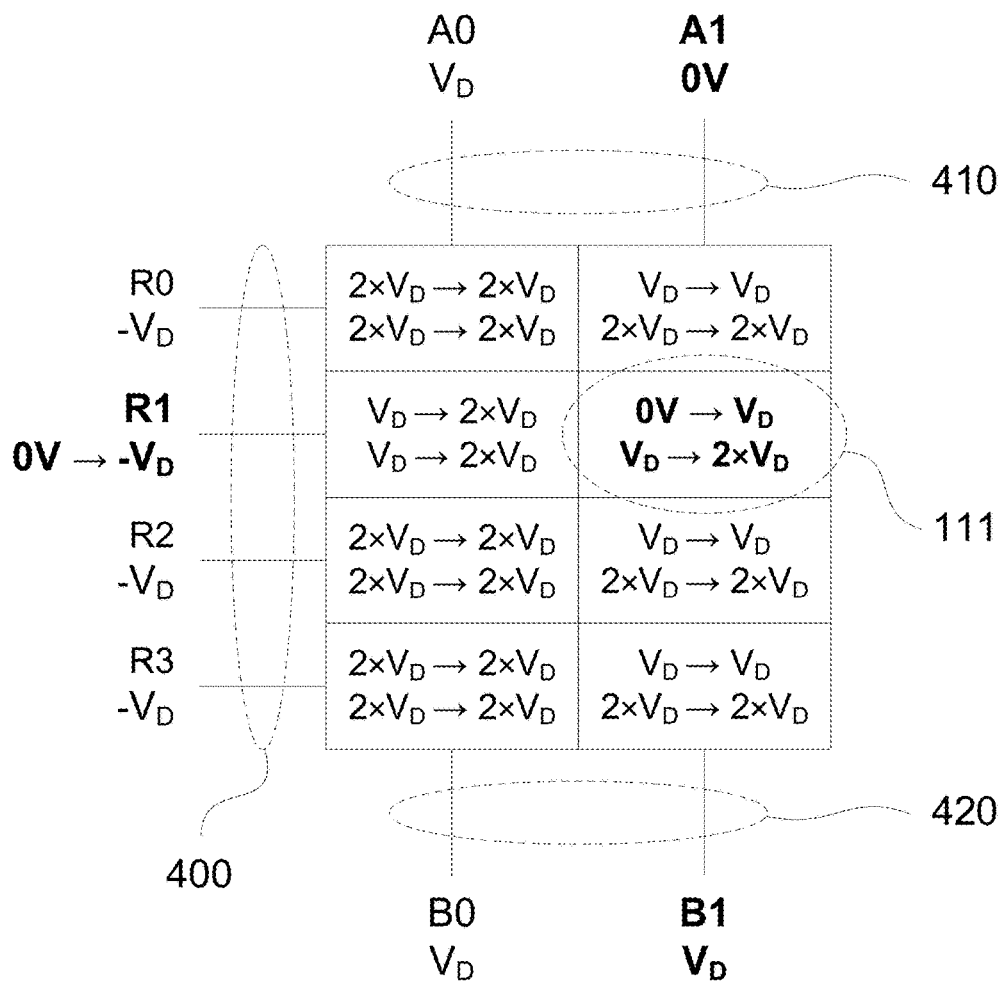
FIG. 10 is a simplified representation of an actuator array constructed and operative in accordance with certain embodiments of the invention.
Figures 24, 25:
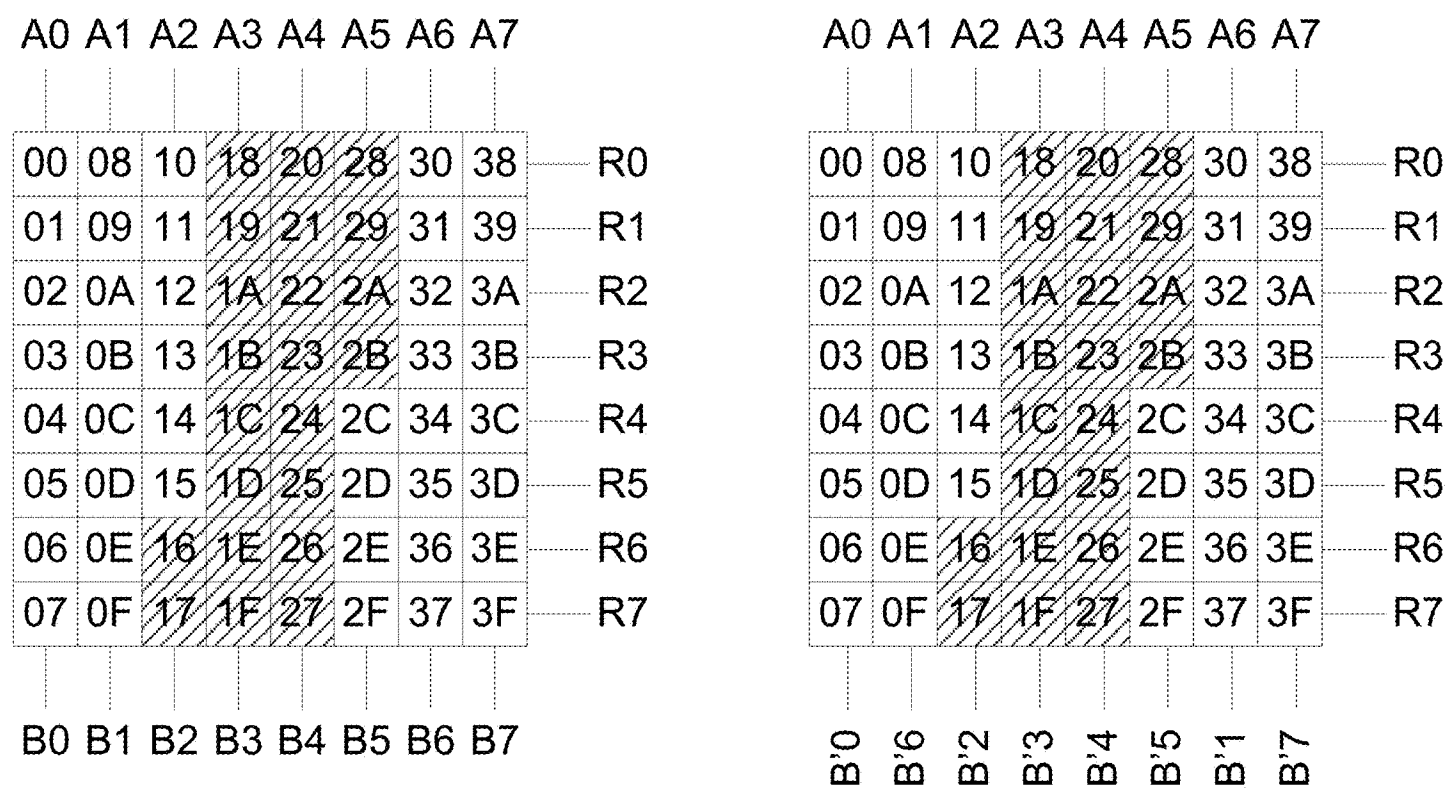

Each moving element may, e.g. as described herein with reference to FIGS. 10, 24, be operative, responsive to the potential applied by the controller, to move from a first extreme position, closer to the first electrode than to the second electrode, to a second extreme position, closer to the second electrode than to the first electrode, and back, and wherein, during a single actuation clock cycle, some of the multiplicity of moving elements leave one of their extreme positions and do not yet reach the other of their extreme positions and others of the multiplicity of moving elements reach one of their extreme positions having left the other of their extreme positions during an actuation clock cycle previous to the single actuation clock cycle.

According to certain embodiments, e.g. as shown and described herein with reference to FIG. 14, a method is provided for generating a physical effect, at least one attribute of which corresponds to at least one characteristic of a digital input signal sampled periodically, the method including:
  providing a multiplicity of electrostatic actuator elements, each including a moving element moving between first and second electrodes, the multiplicity of electrostatic actuator elements including Nr first subsets (R-subsets) of actuator elements and Nc second subsets (C-subsets) of actuator elements, wherein a first partitioning of the multiplicity of actuator elements yields the Nr first subsets (R-subsets) and a second partitioning of the multiplicity of actuator elements yields the Nc second subsets (C-subsets);
  providing a first plurality of Nr electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset;
  providing a second plurality of Nc electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset;
  providing a third plurality of Nc electrical connections (B-wires) interconnecting the second electrodes of actuator elements in each C-subset, such that the second electrode of any actuator element in each individual C-subset is electrically connected to the second electrode of all other actuator elements in the individual C-subset, and electrically isolated from all actuator elements not in the individual C-subset; and
  using a controller, electrically connected to the first, second and third pluralities of electrical connections, to receive a digital input signal, and to apply one of a predetermined, finite set of electric potentials to each of the electrical connections respectively, such that resulting movements of the moving elements together produce the desired physical effect.

It is noted that the herein disclosed systems and methods may be implemented for generation of various kinds of physical effects. Regarding all such systems and methods, the physical effect may be, for example, sound (e.g. defining some or all of the following attributes: volume, pitch, frequency, etc.); wherein the digital input signal has the following characteristics: amplitude; and frequency. The digital input signal's amplitude may correspond to the sound's volume and the digital input signal's frequency may correspond to the sound's pitch (or frequency). Other variations in which the sound may correspond to the input digital signal may also be implemented, depending on the type of input signal, on the application, and so on.

Regarding all such systems and methods, the physical effect may be light, wherein the intensity of light may be controlled, and possibly other attributes as well (e.g. color, polarity, reflection angle, etc.). Utilization of the actuator element to produce an optical physical may be implemented, for example, by using a movable element having varying optical effect (e.g. reflection, polarization) when positioned in different locations along their movement paths.

According to certain embodiments, the moving element is operative, responsive to potentials applied by the controller, to move from a first extreme position, closer to the first electrode than to the second electrode, to a second extreme position, closer to the second electrode than to the first electrode, and back, and wherein, once per actuation clock cycle, the controller is operative for computing a net_moves number characterized in that if, during that individual clock cycle, m1 moving elements are released from the first extreme position and m2 moving elements are released from the second extreme position, and m2−m1=net_moves, the physical effect is produced during the individual clock cycle.

According to certain embodiments, the controller is additionally operative to determine, once per clock cycle, application-effective electrical potentials which, when applied to the first plurality of Nr electrical connections (R-wires), the second plurality of Nc electrical connections (A-wires), and the third plurality of Nc electrical connections (B-wires) respectively, are operative to affect: (a) Release of k1 moving elements from the first extreme position; and (b) Release of k2 moving elements from the second extreme position; such that k1−k2 is close enough to net_moves to produce a physical effect which resembles a target physical effect sufficiently closely for purposes of a given application. While not necessarily so, at each actuation clock cycle, the total number of moving elements released from both extreme positions may be minimized by releasing zero elements from at least one of the extreme positions.

According to certain embodiments, at each actuation clock cycle, the total number of moving elements released from both extreme positions may be determined so that: If net_moves is positive or zero: k1=2×net_moves and k2=net_moves, and if net_moves is negative: k1=net_moves and k2=2×net_moves.

According to certain embodiments, during a single actuation clock cycle, some of the multiplicity of moving elements leave one of their extreme positions and do not yet reach the other of their extreme positions and others of the multiplicity of moving elements reach one of their extreme positions having left the other of their extreme positions during an actuation clock cycle previous to the single actuation clock cycle and the application-effective electrical potentials are selected by the controller to ensure that any moving elements having been released, previously to the single actuation clock cycle, from one of their extreme positions reach the opposite extreme position during an appropriate clock cycle.

Each moving element may be operative, responsive to the potential applied by the controller, to move from a first extreme position, closer to the first electrode than to the second electrode, to a second extreme position, closer to the second electrode than to the first electrode, and back, and where such movements are completed within k actuation clock cycles, where k is a positive integer.

According to certain embodiments, e.g. as shown and described herein with reference to FIGS. 4-7, 10 and 24:

Each R-subset includes Nc moving elements

Each C-subset includes Nr moving elements

R-wires are numbered, arbitrarily, consecutively, or otherwise, from 0 to Nr−1 thereby to define an ordering thereof. It is appreciated that numbering as used herein does not include any physical marking of any element being numbered.

A-wires and B-wires are numbered, arbitrarily, consecutively, or otherwise, from 0 to Nc−1 thereby to define an ordering thereof. Moving elements are numbered such that each moving element has the number: Nr×C-subset number+R-subset number.

The controller may select the application-effective electric potentials such that, at each actuation clock cycle, the numbers of all moving elements currently in the A-position form a continuous wraparound sequence, and the numbers of all moving elements currently in the B-position also form a continuous wraparound sequence.

According to certain embodiments, e.g. as shown and described herein with reference to FIG. 24, the controller selects the application-effective electric potentials such that, at each actuation clock cycle, the numbers of all moving elements currently in the A-position form a single continuous wraparound sequence, and the numbers of all moving elements currently in the B-position also form a single continuous wraparound sequence, unless other application-effective electric potentials exist for which k1−k2 is closer to net-moves. At any actuation clock cycle when the numbers of all moving elements currently in the A-position and the numbers of all moving elements currently in the B-position do not each form a single continuous wraparound sequence, the controller may select the application-effective electric potentials such that, at a subsequent actuation clock cycle, the numbers of all moving elements currently in the A-position again form a single continuous wraparound sequence, and the numbers of all moving elements currently in the B-position also again form a single continuous wraparound sequence. At any actuation clock cycle when the numbers of all moving elements currently in the A-position and the numbers of all moving elements currently in the B-position do not each form a single continuous wraparound sequence, the controller may select the application-effective electric potentials such that, at a subsequent actuation clock cycle, the numbers of all moving elements currently in the A-position again form a single continuous wraparound sequence, and the numbers of all moving elements currently in the B-position also again form a single continuous wraparound sequence, unless other application-effective electric potentials exist for which k1−k2 is closer to net-moves.

According to certain embodiments, e.g. as shown and described herein with reference to FIG. 24, the controller may select the application-effective electric potentials such that, at each actuation clock cycle, the numbers of all moving elements currently in the A-position form S continuous wraparound sequences, and the numbers of all moving elements currently in the B-position also form S continuous wraparound sequences, where S is a positive integer. The controller may select the application-effective electric potentials such that, at each actuation clock cycle, the numbers of all moving elements currently in the A-position form S continuous wraparound sequences, and the numbers of all moving elements currently in the B-position also form S continuous wraparound sequences, where S is a positive integer, unless other application-effective electric potentials exist for which k1−k2 is closer to net-moves, at any actuation clock cycle when the numbers of all moving elements currently in the A-position and the numbers of all moving elements currently in the B-position each form more than S continuous wraparound sequences, the controller may select the application-effective electric potentials such that, at a subsequent actuation clock cycle, the numbers of all moving elements currently in the A-position again form only S continuous wraparound sequences, and the numbers of all moving elements currently in the B-position also again form only S continuous wraparound sequences. At any actuation clock cycle when the numbers of all moving elements currently in the A-position and the numbers of all moving elements currently in the B-position each form more than S continuous wraparound sequences, the controller may select the application-effective electric potentials such that, at a subsequent actuation clock cycle, the numbers of all moving elements currently in the A-position again form only S continuous wraparound sequences, and the numbers of all moving elements currently in the B-position also again form only S continuous wraparound sequences, unless other application-effective electric potentials exist for which k1−k2 is closer to net-moves.

According to certain embodiments, the controller selects the application-effective electric potentials such that the numbers of any moving elements released from the first extreme position during any actuation clock cycle immediately follow the numbers of those moving elements most recently released from the first extreme position, wrapping back to 0 after reaching Nr×Nc−1. The controller may select the application-effective electric potentials such that the numbers of any moving elements released from the first extreme position during any actuation clock cycle immediately follow the numbers of those moving elements most recently released from the first extreme position, wrapping back to 0 after reaching Nr×Nc−1, unless other application-effective electric potentials exist for which k1−k2 is closer to net-moves. The controller may additionally select the application-effective electric potentials such that the numbers of any moving elements released from the second extreme position during any actuation clock cycle also immediately follow the numbers of those moving elements most recently released from the second extreme position, wrapping back to 0 after reaching Nr×Nc−1. The controller may additionally select the application-effective electric potentials such that the numbers of any moving elements released from the second extreme position during any actuation clock cycle also immediately follow the numbers of those moving elements most recently released from the second extreme position, wrapping back to 0 after reaching Nr×Nc−1, unless other application-effective electric potentials exist for which k1−k2 is closer to net-moves. The controller may select the application-effective electric potentials such that all moving elements released from the first extreme position during the same actuation clock cycle are all in a single first C-subset, unless other application-effective electric potentials exist for which k1−k2 is closer to net-moves. The controller may additionally select the application-effective electric potentials such that all moving elements released from the second extreme position during the same actuation clock cycle are all in a single second C-subset, unless other application-effective electric potentials exist for which k1−k2 is closer to net-moves.

According to certain embodiments, e.g. as shown and described herein with reference to FIG. 14, the controller includes, apart from element selection functionality, some or all of a scaler, a quantizer which may or may not use dither, at least one level shifter, a low-pass filter and a sample-rate converter.

Figure 13:
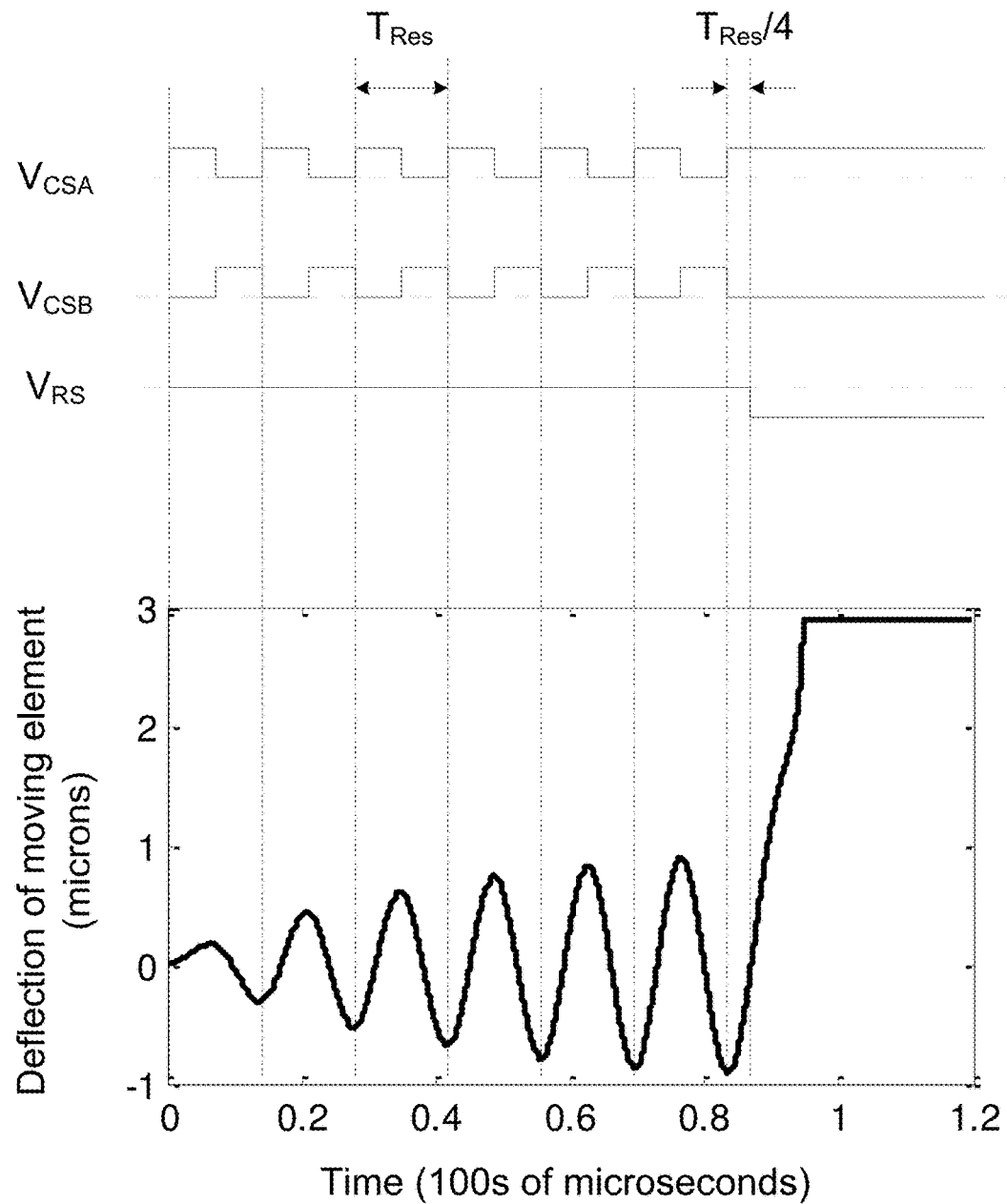

According to certain embodiments, e.g. as shown and described herein with reference to FIG. 13, in the absence of any potentials applied to the first plurality of Nr electrical connections, the second plurality of Nc electrical connections, and the third plurality of Nc electrical connections, such as for example, when the apparatus is powered down, the moving elements may return to a resting position located between the first and second extreme positions, and the controller additionally includes means to cause one or more of the moving elements to move from their resting position to one of the first and second extreme positions. The controller may be operative for simultaneously causing all of the moving elements within the actuator array to move from their resting position to one of the first and second extreme positions.

The controller may be operative for causing some of the moving elements to move from their resting position to the first extreme position, while simultaneously causing other ones of the moving elements to move from their resting position to the second extreme position.

The controller may affect the movement of moving elements from their resting position to one of the first and second extreme positions, and movements of moving elements between their first and second extreme positions, using a single predetermined, finite set of electric potentials. The differences between the potentials may not be sufficient in magnitude to cause moving elements to move directly from equilibrium in their resting position to one of the extreme positions. The controller may affect the movement of moving elements from their resting position to one of the first and second extreme positions by applying a predetermined sequence of potentials to one or more members of the first plurality of Nr electrical connections, the second plurality of Nc electrical connections, and the third plurality of Nc electrical connections.

According to certain embodiments, e.g. as shown and described herein with reference to FIG. 13, the predetermined sequence may include a first part wherein the controller repeatedly changes one or more of the potentials applied to the members of the first plurality of Nr electrical connections, the second plurality of Nc electrical connections, and the third plurality of Nc electrical connections, such that these changes in one or more potentials cause the moving elements to oscillate around their resting position at their mechanical resonance frequency; and a second part wherein the controller applies to the members of the first plurality of Nr electrical connections, the second plurality of Nc electrical connections, and the third plurality of Nc electrical connections a set of potentials which maximizes the electrostatic force attracting each moving element towards the extreme position to which it is to be moved. The controller may be operative to time a transition from the first part to the second part to occur at a point in time where each of the moving elements is closer to the extreme position to which it is to be moved than to the opposite extreme position. The changes in one or more potentials during the first part may occur periodically at a frequency which is twice the mechanical resonance frequency of the moving elements.

Figures 26, 27:
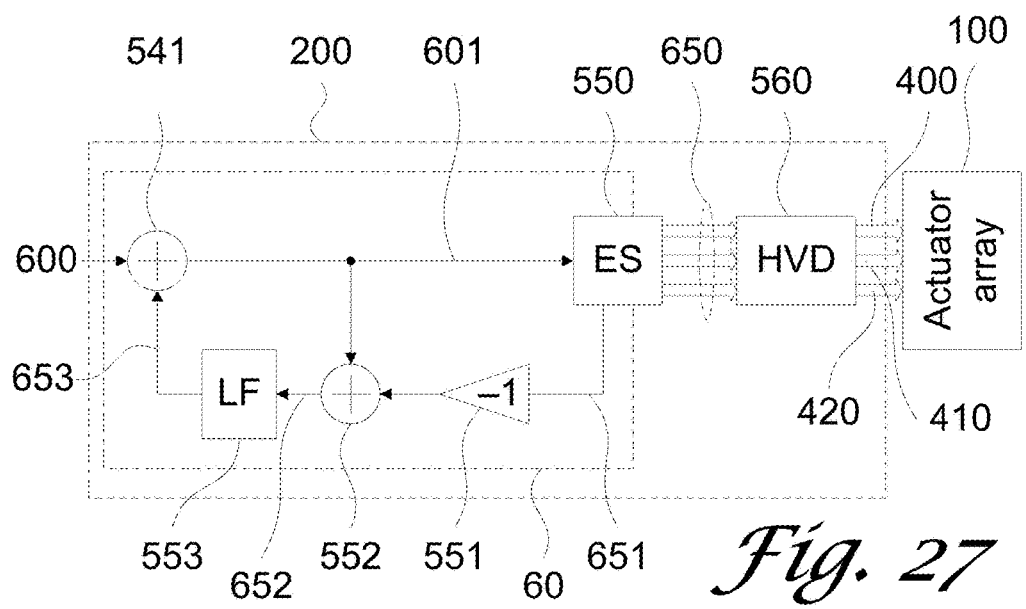

According to certain embodiments, e.g. as shown and described herein with reference to FIG. 27, addressing noise results from nonzero differences (addressing errors) between k1–k2 and net_moves during one or more actuation clock cycles, the addressing noise having a frequency spectrum, wherein the controller includes an addressing noise shaping loop operative to shape the frequency spectrum of the addressing noise, such that addressing noise energy is reduced within a frequency band of interest and increased outside the band of interest. The noise shaping loop may have a loop filter having an impulse response and receiving the addressing noise, such that the frequency spectrum of the addressing noise is shaped according to an addressing noise transfer function determined by the impulse response.

Figure 29:
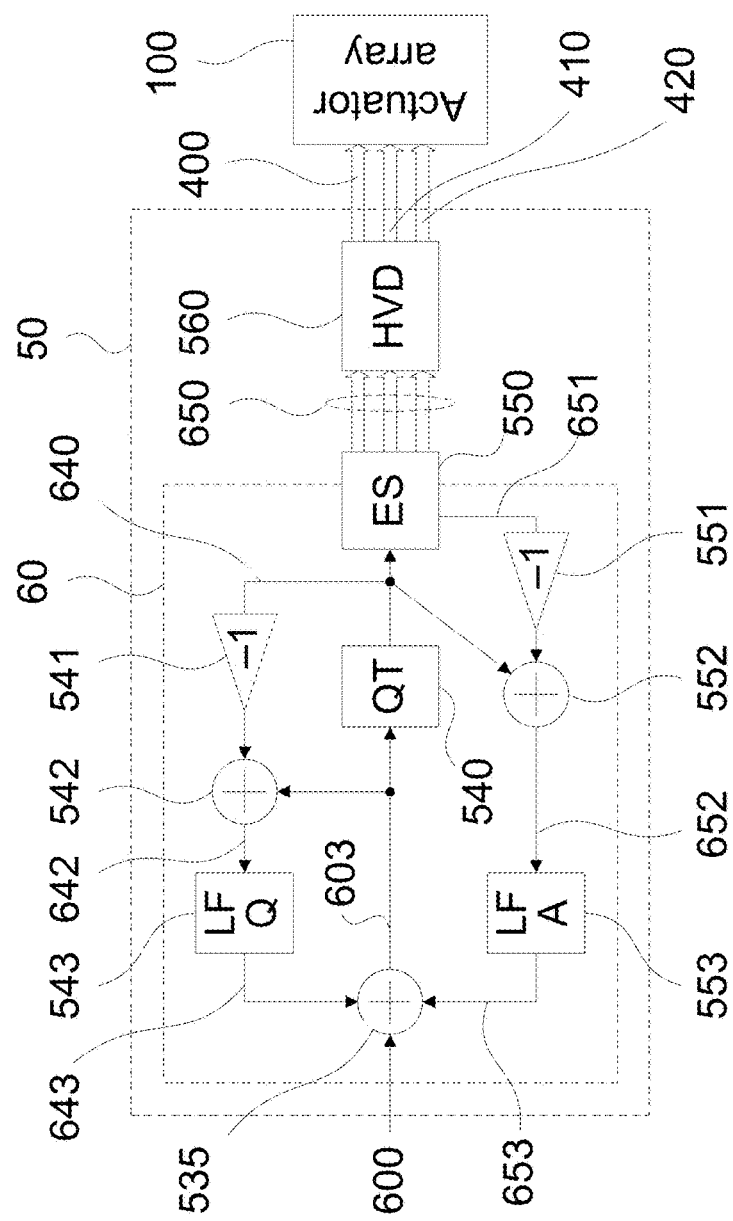

According to certain embodiments, e.g. as shown and described herein with reference to FIG. 29, quantization noise results from the number of actuator elements in the actuator array being less than the number of possible values that the digital input signal can assume, the quantization noise having a frequency spectrum, and the controller includes a quantization noise shaping loop operative to shape the frequency spectrum of the quantization noise, such that quantization noise energy is reduced within a frequency band of interest and increased outside the band of interest. The noise shaping loop may have a loop filter having an impulse response and receiving quantization noise, such that the frequency spectrum of the quantization noise is shaped according to a quantization noise transfer function determined by the impulse response.

Figure 28:
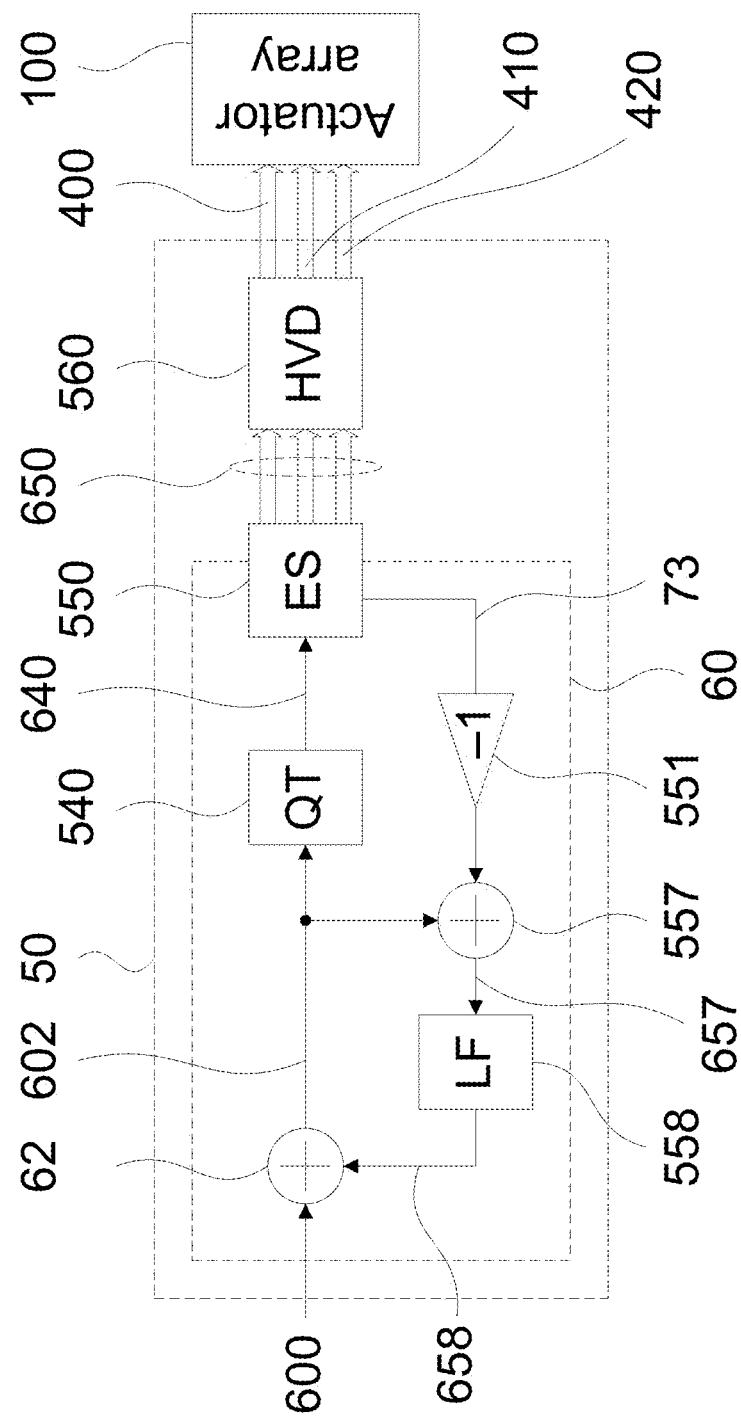

According to certain embodiments, e.g. as shown and described herein with reference to FIG. 28, the controller includes a noise shaping loop operative to shape the frequency spectra of both of the addressing noise and the quantization noise, such that both addressing noise energy and quantization noise energy are reduced within a frequency band of interest and increased outside the band of interest. The noise shaping loop may have a single loop filter having a single impulse response and receiving the sum of the addressing noise and the quantization noise, such that the frequency spectra of both of the addressing noise and the quantization noise are shaped according to a single noise transfer function determined by the single impulse response.

According to certain embodiments, e.g. as shown and described herein with reference to FIG. 29, addressing noise results from nonzero differences (addressing errors) between k1–k2 and net_moves during one or more actuation clock cycles, the addressing noise having an addressing noise spectrum, and the apparatus also suffers from quantization noise resulting from the number of actuator elements in the actuator array being less than the number of possible values that the digital input signal can assume, the quantization noise having a quantization noise spectrum, and the controller includes an addressing noise shaping loop operative to shape the frequency spectrum of the addressing noise and a quantization noise shaping loop operative to shape the frequency spectrum of the quantization noise, such that both addressing noise energy and quantization noise energy are reduced within respective frequency bands of interest and increased outside the bands of interest. The addressing noise shaping loop may have a first loop filter having a first impulse response and receiving the addressing noise, and the quantization noise shaping loop may have a second loop filter having a second impulse response and receiving the quantization noise, such that the frequency spectrum of the addressing noise is shaped according to a first noise transfer function determined by the first impulse response, and the frequency spectrum of the quantization noise is shaped according to a second noise transfer function determined by the second impulse response.

According to certain embodiments, e.g. as shown and described herein with reference to FIG. 13, the duration of the second part is at least half the mechanical resonance period (Tres) of the moving elements. The set of potentials may be selected from among the predetermined, finite set of electric potentials, and does not change during the second part.

According to certain embodiments, e.g. as shown and described herein with reference to FIG. 24, the controller generates, at each actuation clock cycle:

Nr R-signals r0 to r(Nr−1) controlling the potential applied to each of the R-wires R0 to R(Nr−1), Nc A-signals a0 to a(Nc−1) controlling the potential applied to each of the A-wires A0 to A(Nc−1), and Nc B-signals b0 to b(Nc−1) controlling the potential applied to each of the B-wires B0 to B(Nc−1).

The assignment of R-signals to R-wires, A-signals to A-wires and B-signals to B-wires may be fixed, e.g. such that each of the R-signals r0 to r(Nr−1) always controls the same R-wire, each of the A-signals a0 to a(Nc−1) always controls the same A-wire, and each of the B-signals b0 to b(Nc−1) always controls the same B-wire.

Optionally, the controller changes the assignment of R-signals to R-wires and/or the assignment of A-signals to A-wires and B-signals to B-wires during operation of the apparatus. The changes in the assignment of R-signals to R-wires and/or the assignment of A-signals to A-wires and B-signals to B-wires may occur periodically. The changes in the assignment of R-signals to R-wires and/or the assignment of A-signals to A-wires and B-signals to B-wires may occur synchronously with the actuation clock.

The changes in the assignment of R-signals to R-wires and/or the assignment of A-signals to A-wires and B-signals to B-wires may alter the order in which moving elements are subsequently released from one of the extreme positions.

The changes in the assignment of R-signals to R-wires and/or the assignment of A-signals to A-wires and B-signals to B-wires may shape the frequency spectrum of mismatch noise resulting from differences in the magnitude of the physical effect produced by each actuator element, such that the physical effect produced by the apparatus as a whole more closely resembles a target physical effect. The shaping of the frequency spectrum of the mismatch noise may for example include reducing the magnitude of peaks in the frequency spectrum of the mismatch noise.

While not necessarily so, the changes in the assignment of R-signals to R-wires and/or the assignment of A-signals to A-wires and B-signals to B-wires do not result in any immediate change in any of the potentials applied to the R-wires, A-wires and B-wires.

While not necessarily so, the changes in the assignment of R-signals to R-wires and/or the assignment of A-signals to A-wires and B-signals to B-wires do not result in any immediate change in the position of any moving element within the actuator array.

The term "immediate" refers to an occurrence at substantially the same time that the changes in the assignment of R-signals to R-wires and/or the assignment of A-signals to A-wires and B-signals to B-wires occur.

The changes in the assignment of R-signals to R-wires may include swapping of two R-signals, such that a first R-wire previously controlled by a first R-signal becomes controlled by a second R-signal, and a second R-wire previously controlled by the second R-signal becomes controlled by the first R-signal.

The controller may be operative to identify sets of swappable R-signals, and where at least one of the sets of swappable R-signals has more than one member, to determine a new assignment of R-signals to R-wires.

The controller may be operative to identify sets of swappable R-signals such that, for any particular R-signal within a set of swappable R-signals, the moving elements in the R-subset whose R-wire is currently controlled by the particular R-signal, and the moving elements in all R-subsets whose R-wire is currently controlled by another R-signal within the same set of swappable R-signal, are all in the same position and (if in movement) moving in the same direction.

The controller may be operative to identify sets of swappable R-signals such that, for any particular R-signal within a set of swappable R-signals, and for any number i from 0 up to and including Nc−1, the moving element at the intersection of C-subset i and the R-subset whose R-wire is currently controlled by the particular R-signal is in the same position and (if in movement) moving in the same direction as the moving element at the intersection of C-subset i and any other R-subset whose R-wire is currently controlled by any other of the R-signals within the same set of swappable R-signals.

The controller may employ a pseudo-random number generator for determining the new assignment of R-signals to R-wires.

The changes in the assignment of A-signals to A-wires and B-signals to B-wires may include swapping of two A-signals and the respective B-signals, e.g. such that a first A-wire and a first B-wire, previously controlled by a first A-signal and a first B-signal respectively, become controlled by a second A-signal and a second B-signal respectively, and a second A-wire and a second B-wire, previously controlled by the second A-signal and the second B-signal respectively, become controlled by the first A-signal and the first B-signal respectively.

The controller may be operative to identify sets of swappable A-signals and respective B-signals, and where at least one of the sets of swappable A-signals and respective B-signals has more than one member, to determine a new assignment of A-signals to A-wires and respective B-signals to B-wires.

The controller may be operative to identify sets of swappable A-signals and respective B-signals, such that, for any particular A-signal and particular B-signal within a set of swappable A-signals and respective B-signals, the moving elements in the C-subset whose A-wire and B-wire are currently controlled by the particular A-signal and particular B-signal respectively, and the moving elements in all C-subsets whose A-wire and B-wire are currently controlled by another A-signal and its respective B-wire within the same set of swappable A-signals and respective B-signals, are all in the same position and (if in movement) moving in the same direction.

The controller may be operative to identify sets of swappable A-signals and respective B-signals, such that, for any particular A-signal and particular B-signal within a set of swappable A-signals and respective B-signals, and for any number i from 0 up to and including Nr−1, the moving element at the intersection of R-subset i and the C-subset whose A-wire and B-wire are currently controlled by the particular A-signal and the particular B-signal respectively is in the same position and (if in movement) moving in the same direction as the moving element at the intersection of R-subset i and any other C-subset whose A-wire and B-wire are currently controlled by one of the A-signals and its respective B-signal within the same set of swappable A-signals and respective B-signals.

The controller may employ a pseudo-random number generator for determining the new assignment of A-signals to A-wires and respective B-signals to B-wires.

The controller may be operative to identify sets of swappable R-signals such that, for each particular R-signal within a set of swappable R-signals, the electrical potential currently applied to the R-wire controlled by said particular R-signal is the same as the electrical potential currently applied to any R-wire controlled by any other R-signal within the same set of swappable R-signals.

The controller may be operative to identify sets of swappable A-signals and respective B-signals such that, for each particular A-signal and respective B-signal within a set of swappable A-signals and respective B-signals, the electrical potentials currently applied to the A-wire and respective B-wire controlled by said particular A-signal and respective B-signal are the same as the electrical potentials currently applied to any other A-wire and respective B-wire controlled by any other A-signal and respective B-signal within the same set of swappable A-signals and respective B-signals.

The term "currently" is intended to include an occurrence:
At the time the controller does the "identifying" of swappable sets; or
During the actuation clock cycle in which the controller does the "identifying" of swappable sets; or
During the current actuation clock cycle.

Reference is now made to FIGS. 30A to 30C which are cross-sectional illustrations of one type of double-sided electrostatic actuator element to which the present invention can be applied, according to an embodiment of the invention. The actuator element includes a moving element 120 mechanically connected to the stationary portions of the actuator element by means of a suitable bearing 150 such as a flexure or spring. The bearing 150 defines an axis 125 along which the moving element 120 can travel, prevents the moving element 120 from travelling in other directions, and defines an at-rest position of the moving element 120. The actuator element further includes two electrodes 130 and 140, also referred to hereinafter as "A-electrode" and "B-electrode" respectively, disposed on opposite sides of the moving element 120. The moving element 120 is separated from the electrodes 130 and 140 by spacers 180 and 190. Dimples 2101 and 2201 are formed on the surfaces of the electrodes 130 and 140 respectively which each face the moving element 120.

FIG. 30A shows the moving element 120 in its resting position, with no voltage applied between the moving element 120 and either electrode 130 and 140.

Applying a voltage between the moving element and either electrode produces an electrostatic force attracting the moving element towards that electrode, the magnitude of the electrostatic force being proportional to the magnitude of the voltage applied, and inversely proportional to the square of the separation distance between facing surfaces of moving element 120 and the respective electrode. At the same time, any movement of the moving element 120 away from its resting position causes bearing 150 to exert on the moving element 120 a spring force pulling it back towards its resting position. Moving element 120 may also be affected by other forces such as damping or friction forces which may either occur naturally or be deliberately introduced for practical reasons such as to improve long-term reliability. However, such additional forces are not required for the purpose of the present invention. The moving element 120 may reach an equilibrium position where the sum of all forces acting on it is zero, or it may be latched as described under FIGS. 30B and 30C.

FIG. 30B shows moving element 120 latched in a first extreme position, as close as possible to A-electrode 130 and as far as possible from B-electrode 140, also referred to hereinafter as the "A-position". Typically, moving element 120 reaches this position as a result of a voltage $V_A$ being applied between A-electrode 130 and moving element 120, generating an electrostatic force, also referred to hereinafter as "A-force", attracting moving element 120 towards A-electrode 130. As moving element 120 approaches A-electrode 130, the A-force increases inversely proportional to the square of the separation distance between facing surfaces of moving element 120 and electrode 130, whereas the spring force pulling moving element 120 back towards its resting position increases proportionally to its deflection from its resting position. Depending on the spring constant of bearing 150 and on the range of $V_A$, a critical point may exist along axis 125 where A-force and the spring force are equal and any further travel of moving element 120 towards A-electrode 130 causes the A-force to grow more quickly than the spring force. If moving element 120 moves even marginally beyond this critical point, and assuming that $V_A$ remains constant, the balance of forces causes moving element 120 to accelerate towards A-electrode 130 until it makes contact with dimples 2101, a process referred to hereinafter as "latching". After latching, the magnitude of $V_A$ sufficient to hold moving element 120 in this position (referred to hereinafter as "hold voltage"), is smaller than the magnitude of $V_A$ sufficient to achieve latching of moving element 120 into the A-position (referred to hereinafter as "latching voltage").

When moving element 120 is latched in the A-position and a second voltage $V_B$ is applied between B-electrode 140 and moving element 120, the electrostatic force resulting from $V_B$ is significantly smaller in magnitude than the A-force resulting from a $V_A$ of equal magnitude. Hence, the presence of a non-zero $V_B$ only marginally increases the magnitude of the hold voltage sufficient to keep moving element 120 latched in the A-position.

If $V_A$ subsequently falls below the hold voltage, the A-force becomes smaller in magnitude than the spring force, causing moving element 120 to move away from the A-position and towards its resting position, a process referred to hereinafter as "release". With both $V_A$ and $V_B$ equal to zero, moving element 120 then oscillates around its resting position with its frequency of oscillation, also referred to hereinafter as its "mechanical resonance frequency", determined primarily by the mass of moving element 120 and the spring constant of bearing 150 (neglecting damping), and the amplitude of oscillation gradually decreasing as a result of friction, air damping or other energy loss. Alternatively, in the presence of a non-zero $V_B$ of sufficient magnitude, moving element 120 is latched into a second extreme position, as close as possible to B-electrode 140 and as far as possible from A-electrode 130, also referred to hereinafter as the "B-position".

According to one embodiment of the present invention, the controller may adjust $V_A$ and $V_B$ such that moving element 120 is always either in the A-position or the B-position, or transitioning between these two positions; i.e. during normal operation, moving element 120 never settles in its resting position or any other position except the two extreme positions.

When moving element 120 reaches its resting position during transitions between the two extreme positions, it has non-zero kinetic energy and linear velocity relative to electrodes 130 and 140 and therefore continues to travel towards its new extreme position until its kinetic energy is absorbed by bearing 150. Since latching moving element 120 from a position closer to its new extreme position requires a lower electrostatic force than latching moving element 120 into that same extreme position from equilibrium at its resting position, latching voltages are lower for transitions between extreme positions than for latching from rest.

The purpose of dimples 2101 is to maintain an air gap 2401, thereby allowing air to flow through holes 270 in the electrode 130 and into the space between the moving element 120 and first electrode 130 more easily than would be the case without an air gap, thereby facilitating a faster release of moving element 120 from the A-position. If dimples 2101 include electrically insulating material, they may also serve to insulate moving element 120 from electrode 130. If dimples 2101 include electrically conductive material, then some other means of electrical insulation may be employed, such as coating at least one of moving element 120 and electrode 130 with electrically insulating material.

FIG. 30C shows the moving element 120 latched in the B-position, as close as possible to electrode 140 and as far as possible from electrode 130. Latching of the moving element 120 into the B-position and release from the B-position may be achieved in a manner analogous to that described under FIG. 30B above, reversing the roles of A-electrode 130 and B-electrode 140, that of $V_A$ and $V_B$, and that of A-force and B-force. The function of dimples 2201 and air gap 2501 is analogous to that of dimples 2101 and air gap 2401 described above. In certain embodiments, the actuator element's geometry is substantially symmetric about the plane of moving element 120, resulting in hold and latching voltages for the B-position substantially equal to those for the A-position. Alternatively, the actuator element's geometry may be asymmetric; for example, spacers 180 and 190 may differ in thickness, resulting in two different latching voltages for the A-position and B-position respectively; and/or dimples 2101 and 2201 may differ in height, resulting in two different hold voltages.

Suitable materials and manufacturing techniques for the production of actuator elements as shown in FIGS. 30A-30C and closely related types of actuator elements are discussed in co-owned WO2011/111042 ("Electrostatic Parallel Plate Actuators Whose Moving Elements Are Driven Only By Electrostatic Force and Methods Useful in Conjunction Therewith"), published 15 Sep. 2011.

The present invention does not depend on any particular materials or manufacturing techniques.

It is appreciated that the polarity of voltages $V_A$ and $V_B$ can be reversed without affecting operation of the actuator element, since both electrostatic forces are the same, regardless of the polarity of these voltages.

The orientation of the devices shown and described herein relative to the horizontal need not be as shown. For example, the apparatus of FIGS. 30A-30C may be disposed such that the layers are horizontal, as shown, or may for example be disposed such that the layers are vertical. Also, the apparatus may be set on its side or may be inverted, if desired, such that the electrode layer 140 is atop the moving element 120 rather than vice versa. According to certain embodiments, the force of gravity is negligible, since the forces exerted on the moving element by the bearing 150 and the electrostatic forces generated by the electrode or electrodes are many orders of magnitude larger than gravitational forces.

The term "air gap" is used herein merely by way of example since the apparatus of the present invention normally operates in air however this need not be the case and alternatively, for example, the apparatus may operate in any other suitable medium.

It is also appreciated that the dimples shown in FIGS. 30A to 30C are not required for the purposes of the present invention. Furthermore, dimples can be formed on the surface of the moving element 120 instead of the electrodes 130 and 140, or mechanical limiters, e.g. as described in FIG. 2 in co-owned WO2011/111042 ("Electrostatic Parallel Plate Actuators Whose Moving Elements Are Driven Only By Electrostatic Force and Methods Useful in Conjunction Therewith"), published 15 Sep. 2011, may be used instead of dimples.

FIG. 2 is a simplified schematic diagram of an actuator array in accordance with certain embodiments of the invention, including a plurality of electrostatic actuator elements 110, which may, for example, be of the type shown and described herein e.g. with reference to FIGS. 30A-30C.

The actuator elements 110 are partitioned into Nr first subsets, referred to hereinafter as "R-subsets", whose moving elements are electrically interconnected, resulting in a set of Nr interconnections 400, referred to hereinafter as "R-wires". Additionally, the actuator elements 110 are also partitioned into Nc second subsets, referred to hereinafter as "C-subsets", whose A-electrodes and B-electrodes respectively are electrically interconnected, resulting in a first set of Nc interconnections 410, referred to hereinafter as "A-wires", for the A-electrodes and a second set of Nc interconnections 420, referred to hereinafter as "B-wires", for the A-electrodes.

In the Figure, Nr=Nc=3, however the subsets may contain any number of actuator elements. In certain embodiments, all R-subsets contain Nc actuator elements, all C-subsets contain Nr actuator elements, and the total number of moving elements in the array is Nr×Nc. In FIG. 2, the R-subsets are arranged in rows and the C-subsets in columns, however any other layout of actuator elements may also be used.

Each R-wire, A-wire and B-wire is also connected to processor 210. Thus, the total number of electrical interconnections between the array and the processor 210 is Nr+2Nc, whereas implementations with dedicated interconnections for each actuator element may employ more such interconnections. For example, providing separate interconnections for each moving element, each A-electrode and each B-electrode may employ 3×Nr×Nc interconnections; alternatively, providing separate interconnections for each moving element plus one shared connection each for all A-electrodes and all B-electrodes may employ (Nr×Nc)+2 interconnections, e.g. as described in co-owned WO2011/111042 ("Electrostatic Parallel Plate Actuators Whose Moving Elements Are Driven Only By Electrostatic Force and Methods Useful in Conjunction Therewith"), published 15 Sep. 2011.

Actuator arrays of the type described may be manufactured, for example, on a single monolithic die of silicon or other semiconductors or certain metals, using MEMS fabrication techniques e.g. as described in co-owned WO2011/111042 ("Electrostatic Parallel Plate Actuators Whose Moving Elements Are Driven Only By Electrostatic Force and Methods Useful in Conjunction Therewith"), published 15 Sep. 2011.

FIG. 3 is a simplified schematic diagram of an actuator array in accordance with certain embodiments of the invention, similar to the array shown in FIG. 2, but where the R-subsets do not coincide with rows and the C-subsets do not coincide with columns. The array includes 64 actuator elements 110, partitioned into eight R-subsets and four C-subsets. Each R-subset has one R-wire, labeled R0 to R7 respectively, and each C-subset has one A-wire and one B-wire, labeled A0 to A3 and B0 to B3 respectively. Every intersection of one R-subset and one C-subset contains two actuator elements. Every R-subset contains four actuator elements from one row and four actuator elements from another row; for example, R-subset 1, associated with R-wire R1, contains the left-hand half of the top row and the right-hand half of the second row from the top. Every C-subset contains all the actuator elements of two adjacent columns; for example, C-subset 1, associated with A-wire A1 and B-wire B1, contains the third and fourth columns from the left. Actuator arrays constructed in accordance with the invention may have their actuator elements laid out in any pattern, and may have any number of actuator elements at each intersection of one R-subset and one C-subset. Certain embodiments have the same number of actuator elements at each such intersection.

The terms "latching voltage" and "hold voltage" for a single specific actuator element have been defined previously with reference to FIG. 30B. In the following, these terms are defined for an actuator array, whose actuator elements may not all be exactly identical. Additionally, the term "release voltage" is also defined below for use hereinafter.

"Latching voltage" VL means a voltage of only just sufficient magnitude to reliably latch any of the moving elements within the array into either its A-position or its B-position as described with reference to FIG. 30B, after the moving element has been released from the opposite extreme position. While not necessarily so, this latching voltage for an actuator array may be slightly higher than the latching voltage for an individual actuator element previously defined with reference to FIG. 30B, e.g. because: (1) since the geometry of individual actuator elements may vary due to manufacturing tolerances, each individual actuator element may have a slightly different latching voltage; While not necessarily so, the VL defined here may exceed all of them by definition. (2) likewise, asymmetry in an actuator element's geometry may produce two different latching voltages for its A-position and B-position, respectively; in this case, while not necessarily so, the VL defined here may exceed the higher of the two. (3) depending on the actuator array's intended usage, actuator elements 110 may be subject to environmental conditions such as mechanical shock (e.g. in portable/handheld applications), magnetic fields, or air flow, which may produce additional forces on their moving elements 120. In order for latching to be reliable, the VL defined here are typically sufficient to overcome such additional forces under the environmental conditions for which the array is designed.

"Hold voltage" VH means a voltage of only just sufficient magnitude to hold any of the moving elements within the array in either of the two extreme positions. While not necessarily so, this hold voltage may be slightly higher than the hold voltage for an individual actuator element defined with reference to FIG. 30B, for the same reasons described above with reference to "latching voltage".

"Release voltage" VR means a voltage whose magnitude is only just sufficiently low to release any of the actuator elements within the array from either of its two extreme positions. For an ideal actuator element, the difference between VR and VH is infinitesimal; however, in a real array, there is a finite difference between VR and VH due to the manufacturing tolerances, asymmetry and environmental conditions described above with reference to "latching voltage".

The present invention, according to certain embodiments, employs an actuator array's hold voltage $V_H$ sufficiently low in magnitude to not induce any individual actuator element to latch onto either extreme position.

Figure 4:
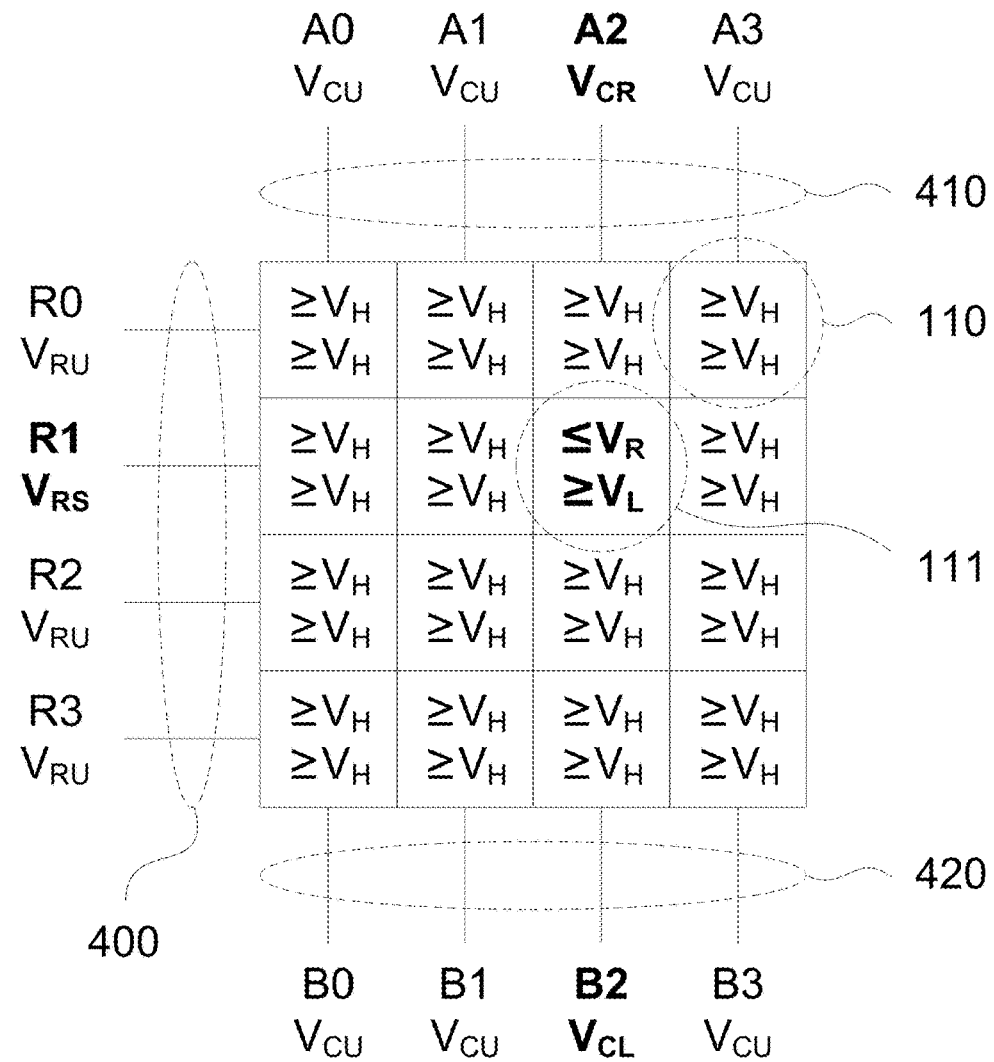

FIG. 4 is a simplified representation of an actuator array in accordance with certain embodiments of the invention, including sixteen actuator elements partitioned into four R-subsets and four C-subsets, analogously to the actuator array shown in FIG. 2. R-wires are labeled R0 to R3, A-wires A0 to A3 and B-wires B0 to B3. Each square represents one actuator element 110. The actuator element located at the intersection of R-subset 1 and C-subset 2, also referred to hereinafter as the "selected element" and labeled 111, is currently latched in the A-position and is to be moved into the B-position. Hence, the task of processor 210 in this example is to apply suitable electric potentials to the array's R-wires, A-wires and B-wires such that the selected element is released from the A-position and latched into the B-position, while keeping all other actuator elements within the array, also referred to hereinafter as "unselected elements", latched in whichever of the two extreme positions they currently are. Within each square in FIG. 4, the top line refers to the magnitude of $V_A$ and the bottom line to the magnitude of $V_B$ sufficient to achieve this. For the selected element, the magnitude of $V_A$ is equal to or less than the release voltage $V_R$ and the magnitude of $V_B$ equal to or larger than the latching voltage $V_L$; whereas for all unselected elements, the magnitude of both $V_A$ and $V_B$ is equal to or higher than the hold voltage $V_H$.

This can be achieved by:
applying a first voltage VRS ("selected R-voltage") to the R-wire connected to the selected element, also referred to hereinafter as the "selected R-wire", in this case R1, while applying a second voltage VRU ("unselected R-voltage") to all other R-wires; this process is referred to hereinafter as "selecting" an R-wire, or the R-subset associated with an R-wire; and applying a third voltage $V_{CR}$ ("releasing C-voltage") to the A-wire or B-wire connected to the electrode from which the selected element is to be released, also referred to hereinafter as the "releasing wire", in this case A2, while applying a fourth voltage $V_{CL}$ ("latching C-voltage") to the A-wire or B-wire connected to the electrode to which the selected element is to be latched, also referred to hereinafter as the "latching wire", in this case B2, and also applying a fifth voltage $V_{CU}$ ("unselected C-voltage") to all other A-wires and all other B-wires, also referred to hereinafter collectively as "unselected" A-wires and B-wires; this process is referred to hereinafter as "selecting" a C-subset, and the C-subset containing the releasing wire and the latching wire is referred to hereinafter as the "selected C-subset".

"Drive schemes" described below with reference to FIGS. 5 to 8, are operative for applying appropriate voltages to the R-wires, A-wires and B-wires, such that the following six conditions below are satisfied:

$|V_{RS}-V_{CR}| \leq V_R$

Satisfying this condition ensures successful release of the selected element from its current latched position. In certain embodiments it may be desirable to maximize the moving element's acceleration away from the electrode to which it is currently latched, also referred to hereinafter as the "releasing electrode"; in this case it may be preferable to have $|V_{RS}-V_{CR}|=0V$ as this completely eliminates the electrostatic force attracting the moving element to the releasing electrode, as opposed to only reducing this electrostatic force.

$|V_{RS}-V_{CL}| \geq V_L$

Satisfying this condition ensures successful latching of the selected element into its new extreme position.

$|V_{RS}-V_{CU}| \geq V_H$

Satisfying this condition prevents release of any unselected actuator elements located in the selected R-subset.

$|V_{RU}-V_{CR}| \geq V_H$

Satisfying this condition prevents release of any unselected actuator elements located in the selected C-subset and currently latched in the same position as the selected element.

$|V_{RU}-V_{CL}| \geq V_H$

Satisfying this condition prevents release of any unselected actuator elements located in the selected C-subset and latched in the extreme position opposite the selected element's current position.

$|V_{RU}-V_{CU}| \geq V_H$

Satisfying this condition prevents release of unselected actuator elements located at the intersections of any unselected R-subset and any unselected C-subset, and latched in either of the two extreme positions.

The method described herein may also be used to move actuator elements from the B-position to the A-position; in that case, the releasing wire is a B-wire and the latching wire is an A-wire. For example, if the selected element 111 is in the B-position, it may be moved into the A-position by applying $V_{RS}$ to R1, $V_{CL}$ to A2 and $V_{CR}$ to B2. Since selecting more than one R-subset and/or more than one C-subset at the same time selects all actuator elements located at the intersection of any selected R-subset and any selected C-subset, the same method may also be used to move more than one moving element from one extreme position to the other. For example, applying $V_{RS}$ to R2 and R3, $V_{CL}$ to B0 and B1, and $V_{CR}$ to A0 and A1 moves all moving elements in the bottom left quadrant in FIG. 4 from the A-position to the B-position, assuming they are in the A-position to begin with. Any selected actuator elements whose moving element is already in the B-position would remain latched in the B-position.

In certain embodiments, the time during which a moving element moves from one extreme position to the other (including its release from the first extreme position and latching into the second extreme position) is approximately half of the resonance period $T_{res}$ of the selected element, where $T_{res}$ is the inverse of its mechanical resonance frequency described previously with reference to FIG. 30B. The time dedicated to such a movement may be somewhat longer than $T_{res}/2$, e.g. if there is significant friction or damping, or it may be somewhat faster than $T_{res}/2$, e.g. if the magnitude of $V_{RS}-V_{CL}$ is sufficiently high to significantly accelerate the movement. However, in certain embodiments, it is close to $T_{res}/2$.

In order to ensure successful latching of moving elements, the application of VRS to the selected R-wire, VCR to the releasing wire, and VCL to the latching wire, is timed to last long enough for the slowest moving element within the array (allowing for variations due to manufacturing tolerances) to complete a movement, i.e. typically slightly longer than Tres/2. After this time has elapsed, the selected element is latched in its new position, and the selected R-wire, A-wire and B-wire typically become unselected, i.e. the controller applies $V_{RU}$ to the formerly selected R-wire and $V_{CU}$ to the former latching wire and releasing wire. The controller may then move other moving elements between their extreme positions by selecting other R-subsets and/or C-subsets. In certain embodiments, the voltages applied to R-wires, A-wires and B-wires are all sampled in accordance with a clock, referred to hereinafter as the "actuation clock", whose frequency is typically slightly below double the moving elements' mechanical resonance frequency.

Figure 5:
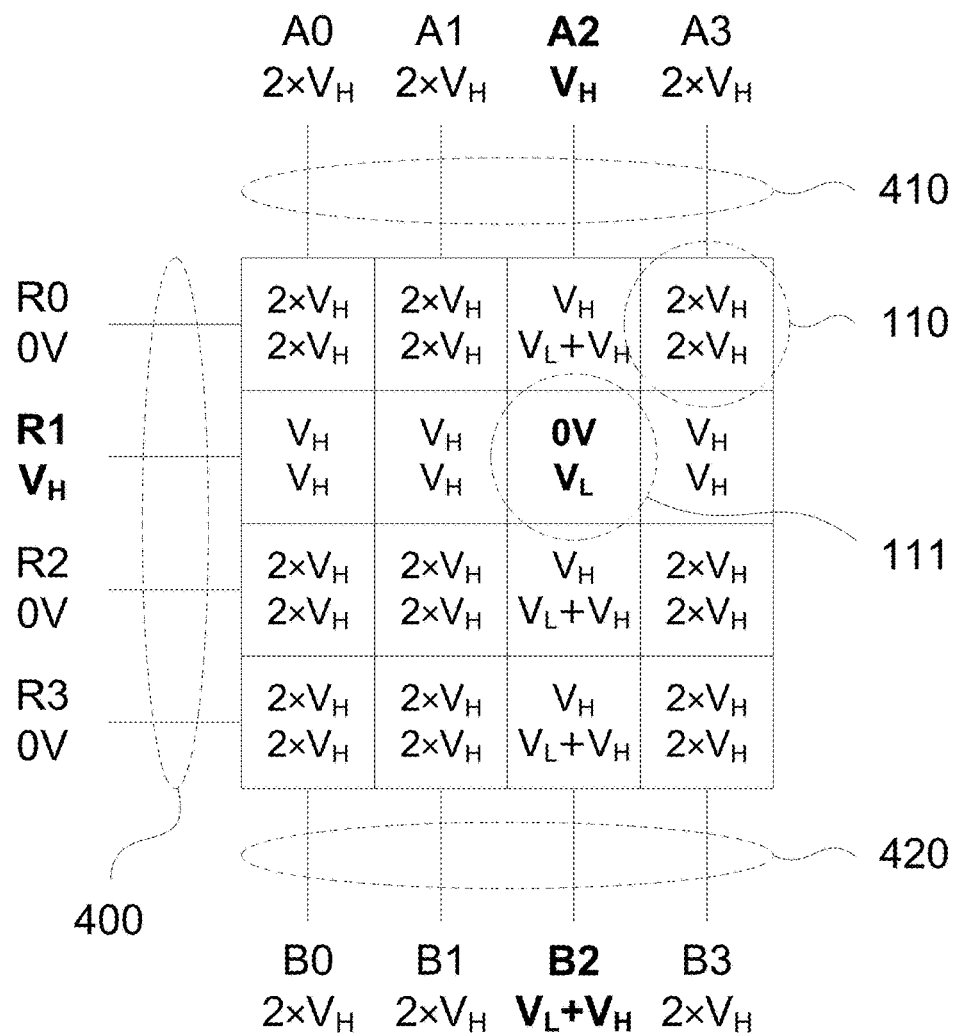
FIGS. 5-7 illustrate drive schemes according to which various actuator arrays may operate, all in accordance with certain embodiments of the invention.

FIG. 5 illustrates the actuator array of FIG. 4 operating according to what is referred to hereinafter as "drive scheme 1". Drive scheme 1 is characterized in that:

$V_{RS}=V_{CR} \geq V_H$
$V_{RU}=0$
$V_{CL} \geq V_L+V_{RS}$
$V_{CU} \geq 2 \times V_{RS}$ Within each square in FIG. 5, the top line refers to the magnitude of $V_A$ and the bottom line to the magnitude of $V_B$. It can be seen that this drive scheme fulfills the six conditions described above with reference to FIG. 4, and also has a number of additional useful properties, e.g.:

Any number of R-subsets and any number of C-subsets may be selected; all actuator elements located at the intersection of any selected R-subset and any selected C-subset are selected, all other actuator elements are unselected.

Any moving element which is already latched in the desired new position (e.g. in this example, in the B-position), remains in that position. Hence, drive scheme 1 can be used to control a subset of actuator elements which may not all have their moving elements latched in the same position, or whose current latched position may be unknown.

It fulfills the stricter version of the first of the six conditions above ($|V_{RS}-V_{CR}|=0V$), thereby minimizing the time during which selected elements are released from their current latched position.

In order to permit selection of any desired R-subset or R-subsets, a controller implementing drive scheme 1 is operative for applying either of two voltages (VRS or VRU) to each R-wire 400. Likewise, in order to permit selection of any desired C-subset or C-subsets, and since each A-wire and each B-wire can be either a releasing wire, a latching wire or an unselected wire at a given time, such a controller is operative for applying either of three voltages ($V_{CR}$, $V_{CL}$ or $V_{CU}$) to each A-wire 410 and to each B-wire 420.

Figure 6:
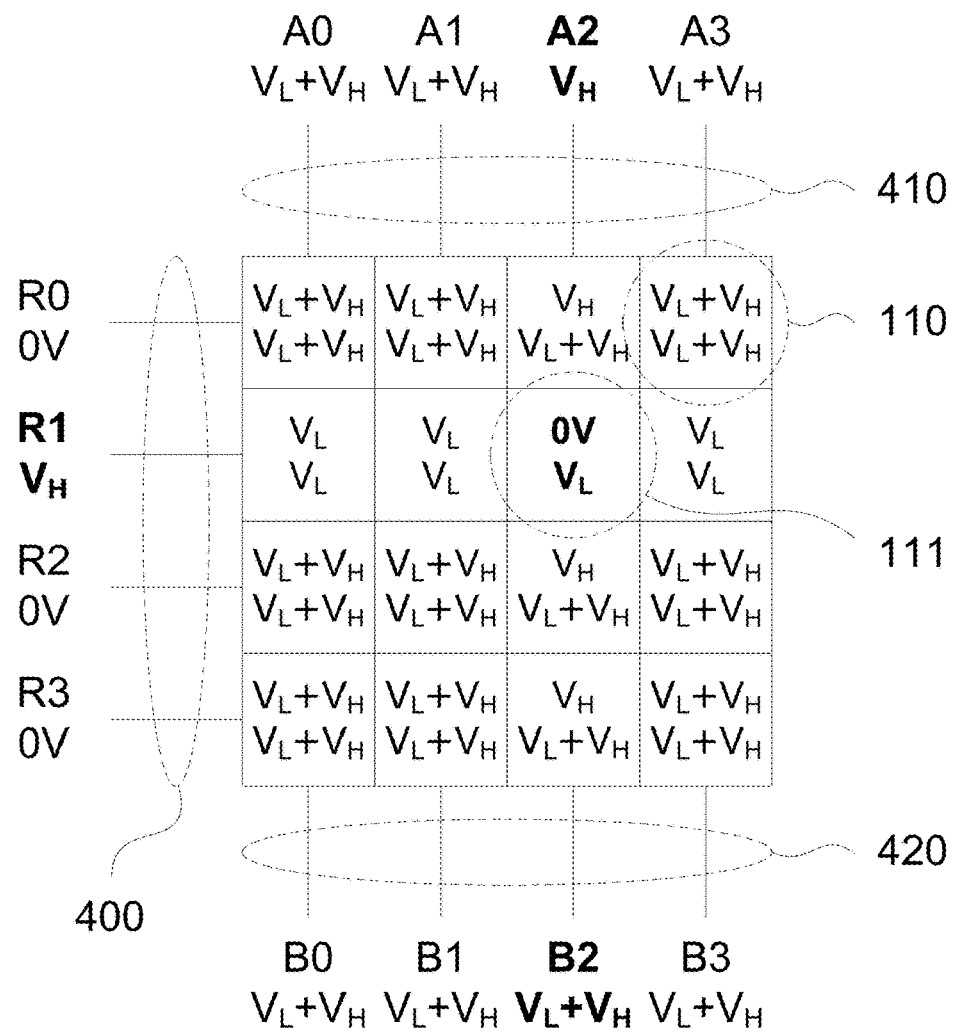

FIG. 6 illustrates the actuator array of FIGS. 4 and 5 operating according to what is referred to hereinafter as "drive scheme 2". This drive scheme is characterized by:

$V_{RS}=V_{CR} \geq V_H$
$V_{RU}=0$
$V_{CL}=V_{CU} \geq V_L+V_{RS}$

The difference between the two drive schemes is that the minimum magnitude of $V_{CU}$ has been increased from $2 \times V_H$ to $V_L+V_H$. Since, by definition, $V_L$ is larger than $V_H$ (as described above with reference to FIG. 4), drive scheme 2 satisfies the six conditions. A controller implementing drive scheme 2 has the advantage that it is capable of applying either of only two voltages ($V_{CR}$ or $V_{CL}/V_{CU}$) to each A-wire 410 and to each B-wire 420, resulting in reduced complexity and cost compared to drive scheme 1 where each A-wire and B-wire can take three different voltages.

Under drive scheme 2, $V_A$ and $V_B$ of those unselected actuator elements in unselected C-subsets are higher in magnitude than with drive scheme 1 and higher than required to keep the unselected elements latched in their current extreme position, but no higher than the highest $V_A$ and $V_B$ already occurring under drive scheme 1 (which equals the difference between $V_{CL}$ and $V_{RU}$ and occurs in actuator elements located at the intersections of unselected R-subsets and selected C-subsets). This is generally not a drawback.

Figure 7:
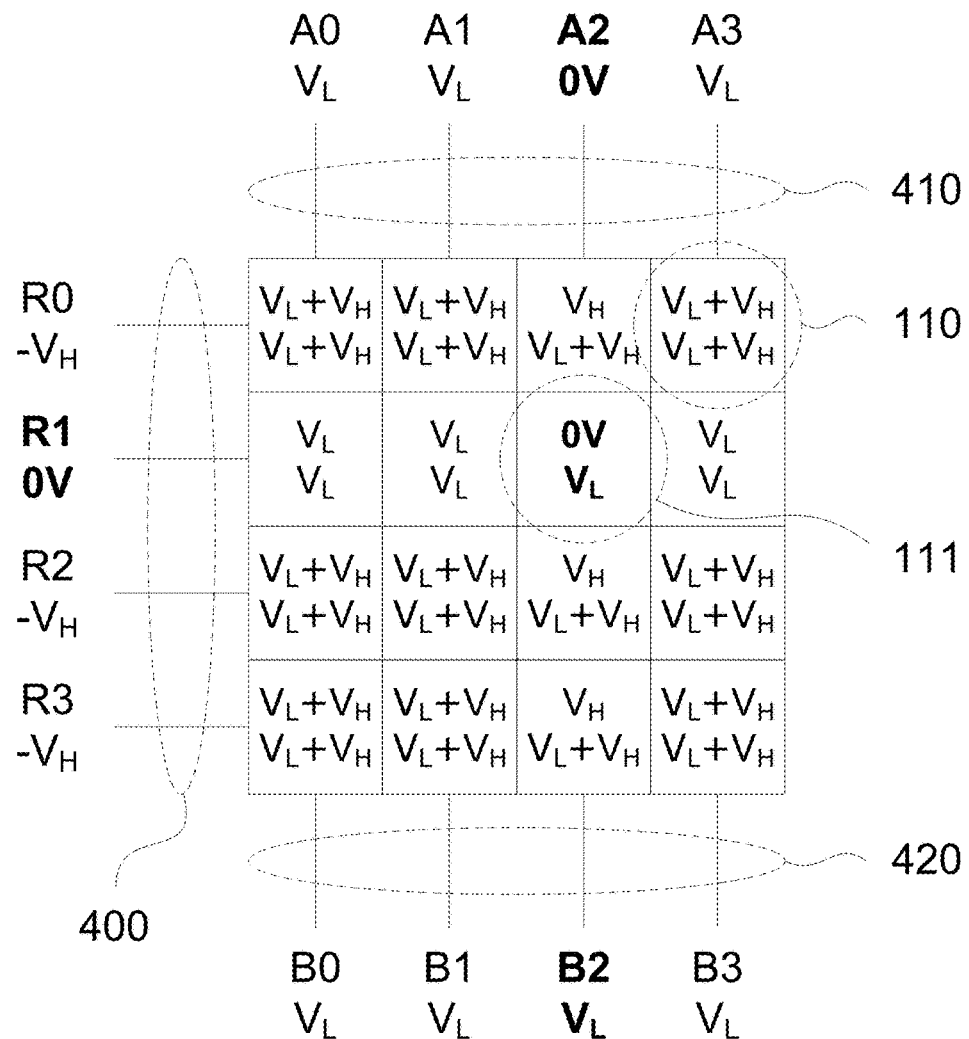

FIG. 7 illustrates the actuator array of FIGS. 4 to 6 operating according to what is referred to hereinafter as "drive scheme 3". Drive scheme 3 is characterized by:

$V_{RS} = V_{CR} = 0$
$V_{RU} \leq -V_H$
$V_{CL} = V_{CU} \geq V_L$

This produces the same $V_A$ and $V_B$ as drive scheme 2 in all actuator elements. However, compared to drive scheme 2, $V_H$ has been subtracted from the voltages applied to all R-wires, A-wires and B-wires.

It is appreciated that adding or subtracting any other given voltage from all R-wire, A-wire and B-wire voltages also results in drive schemes equivalent to drive scheme 2. Furthermore, the polarity of drive voltages in any drive scheme may be inverted without affecting the operation of the actuator array as long as $V_A$ and $V_B$ retain the same magnitude as under drive scheme 2. For example, the following drive scheme, referred to hereinafter as "drive scheme 4", is equivalent to drive schemes 2 and 3:

$V_{RS} = V_{CR} \leq -V_H$
$V_{RU} = 0$
$V_{CL} = V_{CU} \leq -(V_L + V_{RS})$

Likewise, the following drive scheme, referred to hereinafter as "drive scheme 5", is equivalent to drive schemes 2 to 4:

$V_{RS} = V_{CR} = 0$
$V_{RU} \geq V_H$
$V_{CL} = V_{CU} \leq -V_L$

FIG. 8 is a summary of drive schemes 1 to 5 in tabular form.

Figure 9:
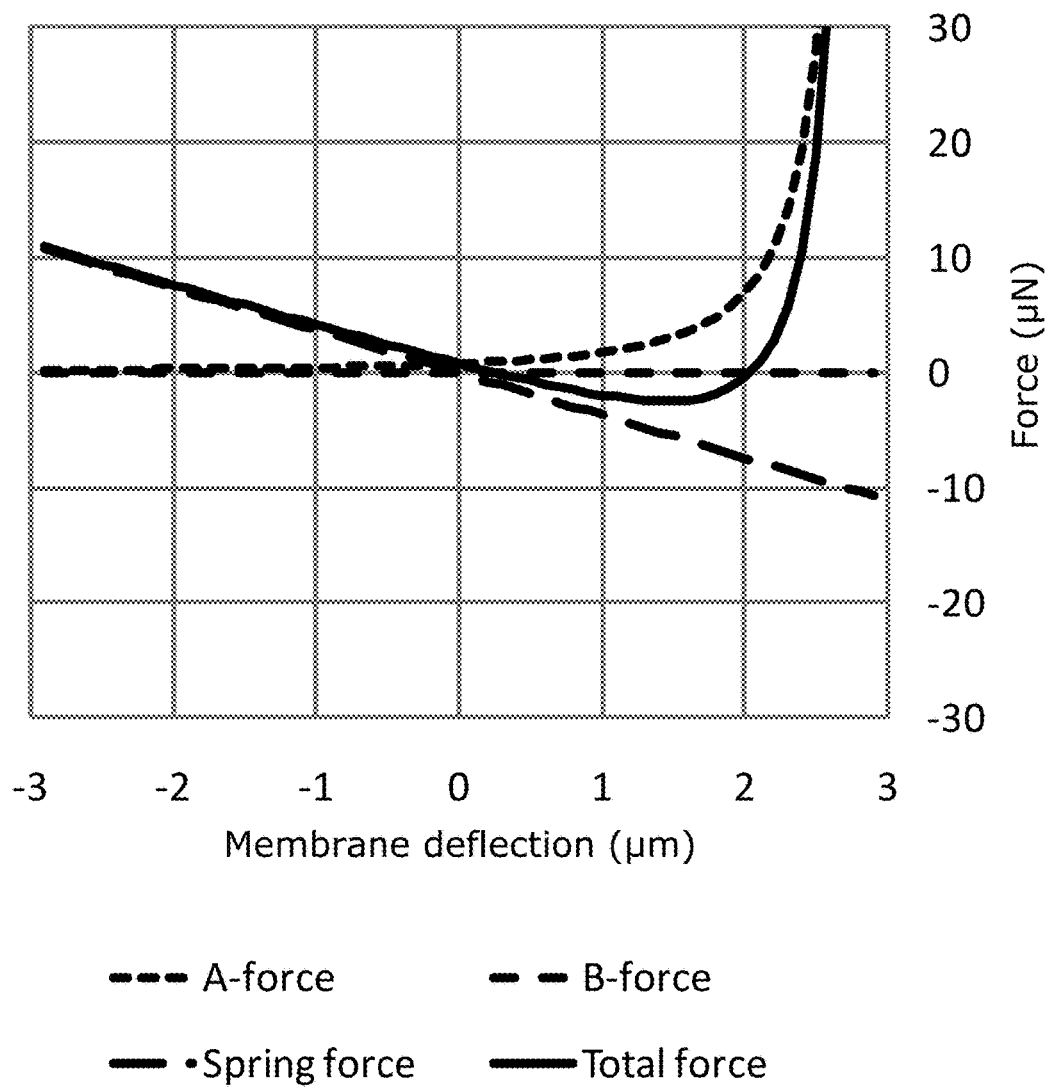
FIGS. 9 and 13 are graphs useful in understanding certain embodiments of the invention.

FIG. 9 is a graph of electrostatic and spring forces acting on a moving element 120, constructed as described with reference to FIGS. 30A to 30C, as a function of its deflection along axis 125 and towards the A-electrode 130. In the example of FIG. 9, the thickness of spacers 180 and 190 is 3 μm. The horizontal axis represents the deflection of the moving element from its resting position towards the A-electrode, with negative values indicating a deflection away from the A-electrode and towards the B-electrode. The A-force, B-force, spring force (previously defined with reference to FIGS. 30B, 30C and 30A respectively) and total force are plotted on the vertical axis.

In the example of FIG. 9, $V_B$ and hence also the B-force are zero, whereas $V_A$ is nonzero and produces a nonzero A-force. Thus the total force exerted on moving element 120 is the sum of the A-force and spring force. It can be seen that there are two equilibrium points where the total force acting on moving element 120 is zero. The first equilibrium point is close to the resting position, i.e. slightly to the right of the origin in the graph of FIG. 9, and is a stable equilibrium, i.e. if the moving element 120 is a small distance away to either side of the equilibrium point then the balance of forces acting on it will cause it to move towards the first equilibrium point. The second equilibrium point occurs closer to the A-electrode, at a deflection of approximately 2 μm, and is an unstable equilibrium. If the moving element 120 is a small distance further away from A-electrode 130 than this second equilibrium point then the balance of forces acting on it will cause it to move towards the first equilibrium point. If moving element 120 is a small distance closer to the A-electrode 130 than the second equilibrium point then the balance of forces acting on it will cause it to move towards the A-electrode and be latched in the A-position.

The drive schemes described below are suitable for embodiments in which the motion of a selected element between its two extreme positions in an actuator element may be dominated by different effects at different points in time.

Immediately after the selected element is released from its current latched position, the spring force exerted on its moving element by bearing 150 dominates its motion, propelling it towards its new location. The electrostatic force pulling moving element 120 back towards its previous latched position is zero under any of the drive schemes described above. Although the drive schemes previously discussed provide an electrostatic force attracting moving element 120 towards the latching electrode, this electrostatic force is not actually required at this time, since the desired motion can be achieved by the spring force alone. In any case, the electrostatic force, if present, is relatively weak at this time, because moving element 120 is relatively far from the latching electrode. Hence, the voltage between the latching electrode and moving element 120 ($V_{CL} - V_{RS}$) which produces the electrostatic force is not critical at this time, and may be altered without substantially affecting operation of the actuator array.

As the moving element 120 of the selected element approaches the latching electrode, the spring force exerted on it by bearing 150 opposes its current direction of travel and grows in magnitude. At this time, an electrostatic force attracting moving element 120 towards the latching electrode is employed to achieve latching. Hence, successful latching depends on the voltage between the latching electrode and the moving element 120 ($V_{CL} - V_{RS}$) being of sufficiently high magnitude to overcome the spring force as well as any other opposing forces such as friction or damping forces. On the other hand, any voltage applied between the releasing electrode and moving element 120 ($V_{CR} - V_{RS}$) at this time produces only a relatively small electrostatic force pulling moving element 120 back towards the releasing electrode, since moving element 120 is relatively far from the releasing electrode. Hence, the voltage $V_{CR} - V_{RS}$ is not critical at this time, and may be altered without substantially affecting operation of the actuator array.

In the middle portion of axis 125, around the resting position of moving element 120, both the spring force and the two electrostatic forces are relatively low in magnitude. When the moving element 120 of the selected element is in this region, it remains in motion primarily due to the momentum it acquired since being released from its previous latched position.

In the embodiments described above, one or both of the first two of the "six conditions" described previously with reference to FIG. 4 can be relaxed as follows:

|VRS−VCR|≤VR (typically |VRS−VCR|=0V)
    during the early part of the movement only, i.e. during and shortly after release.

|$V_{RS} - V_{CL}$|≥$V_L$
    in the latter part of the movement only, i.e. during and shortly before latching.

These two conditions together with the unmodified conditions 3 to 6 of the original six conditions are referred to hereinafter as the "relaxed conditions". Based on these relaxed conditions, the movement of a moving element from one extreme position to the other (including its release from the first extreme position and latching into the second extreme position) can be split into two or more phases, such that at least one of the selected R-voltage and the selected C-voltage varies between phases.

For example, the drive scheme described below, also referred to hereinafter as "drive scheme 6", uses two phases, where the following holds:

$V_{RS}$ varies between phases as follows:
  Phase 1: $V_{RS}=V_{CR}$
  Phase 2: $V_{RS}=0$
$V_{RU}=0$ in both phases
$V_{CR} \geq V_H$ in both phases
$V_{CL}=V_{CU} \geq \max(V_L, 2 \times V_H)$ in both phases This can be viewed as a variation on drive scheme 2, the differences being that (a) the selected R-subset is selected only during Phase 1 rather than throughout as in drive scheme 2; and (b) the latching C-voltage $V_{CL}$ and unselected C-voltage $V_{CU}$ are lower than in drive scheme 2. This last point is an advantage of drive scheme 6 since it allows the controller circuit to be implemented more cost-effectively compared to drive scheme 2.

The frequency of the actuation clock (described previously with reference to FIG. 4) for drive scheme 6 is typically twice the actuation clock frequency for single-phase drive schemes such as drive schemes 1 to 5 described previously, used with the same actuator array.

Subtracting $V_H$ from all R-wire, A-wire and B-wire voltages in drive scheme 6 yields an electrically equivalent scheme referred to hereinafter as "drive scheme 7" characterized by:

VRS varies between phases as follows:
  Phase 1: VRS=0
  Phase 2: VRS=VRU
VRU≤−VH in both phases
VCR=0 in both phases
VCL=VCU≥max(VL, −2×VRU)+VRU in both phases Drive scheme 7 has the advantage that the highest magnitude of drive voltage (in this case, $V_{CL}/V_{CU}$) is lower than in all other drive schemes described so far. However, it also has the disadvantage of employing both positive and negative drive voltages.

FIG. 10 is a simplified representation of an actuator array in accordance with certain embodiments of the invention, including eight actuator elements partitioned into four R-subsets and two C-subsets, analogously to the actuator arrays shown in FIGS. 4 to 7. R-wires are labeled R0 to R3, A-wires A0 to A1 and B-wires B0 to B1. Each square represents one actuator element 110. The actuator element located at the intersection of R-subset 1 and C-subset 1, also referred to hereinafter as the "selected element" and labeled 111, is currently latched in the A-position and is to be moved into the B-position.

The actuator array operates according to a drive scheme referred to hereinafter as "drive scheme 8", which uses two drive voltages of opposite polarities, a positive drive voltage $+V_D$ and a negative drive voltage $-V_D$. The magnitude of both drive voltages is the larger of the hold voltage $V_H$ and half of the latching voltage $V_L$ (i.e. $V_D=\max(V_L/2, V_H)$). Drive scheme 8 is further characterized by:

$V_{RS}$ varies between phases as follows:
  Phase 1: $V_{RS}=0V$
  Phase 2: $V_{RS}=-V_D$
$V_{RU}=-V_D$ in both phases
$V_{CR}=0V$ in both phases
$V_{CL}=V_{CU}=+V_D$ in both phases Within each square in FIG. 10, the top line refers to the magnitude of $V_A$ and the bottom line to the magnitude of $V_B$. It can be seen that this drive scheme fulfills the "relaxed conditions" described above with reference to FIG. 9, and furthermore, offers some or all of the following advantages over drive schemes described so far:

Since $+V_D$ and $-V_D$ have the same magnitude, one can be generated from the other using a relatively simple and low-cost circuit such as an inverting charge pump; whereas in other drive schemes discussed so far, drive voltages generally differ in magnitude and hence, generating drive voltages for these drive schemes would normally employ a more complex and expensive circuit such as a switched-mode DC-to-DC converter.

If $V_H<V_L/2$, then the highest magnitude of drive voltage employed (in this case, $V_{CL}/V_{CH}$) is lower than in all other drive schemes described so far.

Drive scheme 8 is not equivalent to drive schemes 6 and 7. For example:

For unselected elements located at the intersection of selected C-wires and unselected R-wires and latched at the releasing side, the $V_A$ and $V_B$ used to hold their moving elements in their current position differs between drive schemes 6/7 and drive scheme 8, during both phases.

For unselected elements located at the intersection of unselected C-wires and unselected R-wires, the $V_A$ and $V_B$ used to hold their moving elements in their current position differs between drive schemes 6/7 and drive scheme 8, during phase 1 only.

For selected elements, the voltage between the latching wire and their moving elements differs between drive schemes 6/7 and drive scheme 8, during phase 1 only.

For selected elements, the voltage between the releasing wire and their moving elements differs between drive schemes 6/7 and drive scheme 8, during phase 2 only.

The drive schemes above may assume that, at any given time during normal operation, the controller either moves one or more actuator elements from the A-position to the B-position, or moves one or more actuator elements from the B-position to the A-position, or does not move any actuator elements. However, with drive scheme 8 it is also possible to simultaneously move one or more actuator elements from the A-position to the B-position, while also moving one or more actuator elements from the B-position to the A-position, under the following conditions:

All actuator elements to be moved are located in selected R-subsets, since moving elements can only be released if the respective R-subset is selected; and Actuator elements to be moved from their A-position to their B-position cannot be located in the same C-subset as actuator elements to be moved from their B-position to their A-position. This is because, under drive scheme 8, the latching C-voltage ($V_{CL}=+V_D$) differs from the releasing C-voltage ($V_{CR}=0V$), making it impossible for a single A-wire or B-wire to be both a latching wire and a releasing wire at the same time.

In summary, under drive scheme 8 it is possible to simultaneously move actuator elements in opposite directions, if they are all in the same R-subset but in different C-subsets.

As described previously with reference to drive schemes 3 and 6, adding or subtracting a given voltage from all R-wire, A-wire and B-wire voltages results in drive schemes that are equivalent to drive scheme 8. For example, adding $V_D$ to all R-wire, A-wire and B-wire voltages yields a variation referred to hereinafter as "drive scheme 9" characterized by $V_{RS}$ varies between phases as follows:
  Phase 1: $V_{RS}=V_D$
  Phase 2: $V_{RS}=0V$ $V_{RU}$=0V in both phases
$V_{CR}$=$V_D$ in both phases
$V_{CL}$=$V_{CU}$=2×$V_D$ in both phases Drive scheme 9 eliminates negative voltages from the controller, which, depending on the technology used to implement the controller, may reduce its cost. Since the higher drive voltage 2×$V_D$ is exactly double the magnitude of the lower drive voltage $V_D$, it becomes possible to generate the higher drive voltage from the lower one using a relatively simple and low-cost circuit such as a voltage-doubling charge pump; whereas other drive schemes discussed so far do not generally have a 2:1 ratio between drive voltages and hence, generating drive voltages for these drive schemes would normally employ a more complex and expensive circuit such as a switched-mode DC-to-DC converter. Depending on the technology used to implement the controller circuit, the use of a doubling charge pump may reduce or increase the cost of the controller compared to using an inverting charge pump as with drive scheme 8.

It is appreciated that drive scheme 8, like all other drive schemes discussed here, can be used with actuator arrays of any size (i.e. any number of R-subsets and C-subsets, and any number of actuator elements at each intersection of an R-subset and a C-subset). The small number of R-subsets and C-subsets in FIGS. 2 to 7 and 10 have been chosen merely for simplicity.

In practice, a 4×2 matrix of actuator elements as shown in FIG. 10 does not reduce the number of electrical connections between the actuator array and processor 210 compared to an implementation with dedicated connections for each moving element and two shared connections for all A-electrodes and all B-electrodes respectively; and hence there is no advantage in building such a matrix. However for larger array dimensions the number of connections is reduced dramatically (from NrNc+2 to Nr+2×Nc). It is also appreciated that the polarity of drive voltages in drive schemes 6 to 9 may be inverted without affecting operation of the actuator array, as previously described with reference to drive schemes 4 and 5. Furthermore, it is appreciated that drive schemes with more than two phases can be devised which will also fulfill the "relaxed conditions" described above with reference to FIG. 9.

In drive schemes 1 to 9, the time for releasing a moving element from one extreme position and latching it in the opposite extreme position, also referred to hereinafter as the actuation time Ta, is determined primarily by the mass of moving element 120 and the spring force exerted on it by bearing 150, and is approximately equal to half the resonance period Tres of moving elements 120, where Tres is the inverse of their mechanical resonance frequency described previously with reference to FIG. 30B. This may limit the suitability of the apparatus for specific purposes; for example, if the apparatus is used to produce sound or ultrasound waves then the actuation time Ta is typically shorter than half the period of the highest sound or ultrasound frequency to be generated (according to the Nyquist sampling theorem). Furthermore, where oversampling is used (for example, in a noise-shaping loop such as that described below with reference to FIGS. 27 to 29), it is desirable to minimize the actuation time in order to increase the oversampling ratio. One way to reduce actuation time is to reduce the mass of moving element 120; however, application-specific requirements for mechanical stability and reliability may limit how far this weight can be reduced. Another option is to increase the spring coefficient of bearing 150, but this has the disadvantage of increasing the magnitude of the drive voltages employed.

For actuator arrays controlled using multi-phase drive schemes, such as drive schemes 6 to 9, an alternative approach to this problem is to overlap phases. For example, drive scheme 8 allows for the simultaneous movement of two sets of actuator elements, such that a first set of actuator elements is in Phase 1 as described above, while a second set of actuator elements is in Phase 2; a process also referred to hereinafter as "double-speed addressing". Although it does not affect the overall time to complete each movement, double-speed addressing doubles the number of opportunities per time unit for releasing moving elements. As a result, the physical effect produced by the actuator array can be controlled more accurately in time. For example, if the actuator array produces sound or ultrasound waves then the maximum frequency that can be produced is doubled; and if oversampling is used, the oversampling ratio is effectively doubled. The effect is similar to reducing the actuation time $T_a$ from $T_{res}/2$ to $T_{res}/4$, but without any change in the mechanical properties of actuator elements. However, whenever two elements are simultaneously in motion such that one is in Phase 1 and the other in Phase 2, two conditions, referred to hereinafter as the "double-speed rules", hold:

The two elements cannot be in the same R-subset, because drive scheme 8 applies different voltages to selected R-wires in each phase (0V in Phase 1 versus $-V_D$ in Phase 2 and for unselected R-wires).

If the two elements are moving in opposite directions, they are in different C-subsets. This is because drive scheme 8 applies different voltages to releasing and latching wires (0V for releasing wires versus $+V_D$ for latching wires, in both phases).

The second double-speed rule can be removed using a modified drive scheme, also referred to hereinafter as "drive scheme 10", which is characterized by:

$V_{RS}$ varies between phases as follows:
Phase 1: $V_{RS}$=0V
Phase 2: $V_{RS}$=$-V_D$
$V_{RU}$=$-V_D$ in both phases
$V_{CR}$ varies between phases as follows:
Phase 1: $V_{CR}$=0V
Phase 2: $V_{CR}$=$+V_D$
$V_{CL}$=$V_{CU}$=$+V_D$ in both phases Drive scheme 10 differs from drive scheme 8 in that the releasing C-voltage in Phase 2 is $+V_D$ rather than 0V, which is the same as the latching C-voltage in Phase 2. As a result, it becomes possible for an A-wire or B-wire to be the releasing wire for a moving element which is in Phase 1, while simultaneously acting as the latching wire for another moving element which is in Phase 2. However, this drive scheme may employ slightly higher drive voltages to ensure successful latching, and/or may slightly increase the time for latching under otherwise identical conditions.

FIG. 11 is a summary of drive schemes 6 to 10 in tabular form.

FIG. 12 is a summary of some further possible two-phase drive schemes. These are obtained by combining three different options (0, $+V_D$ and "don't care", i.e. either 0 or +VD) for $V_{CR}$ in phase 2 with the same three options for $V_{CL}$ in phase 1, yielding a total of nine possible combinations, of which seven are shown in FIG. 12 (the remaining two combinations being drive schemes 8 and 10 which are shown in FIG. 11). Each drive scheme results in a different set of "double-speed rules" (described previously for drive schemes 8 and 10). Some of the drive schemes shown may employ a slight adjustment of $V_D$ to ensure successful release and latching.

Drive schemes containing "don't care" conditions such as drive schemes 11 14, 15, 16 and 17, where one or both of $V_{CR}$ and $V_{CL}$ may be either 0 or $+V_D$ in the same phase, offer more degrees of freedom in selecting R-wire, A-wire and B-wire voltages to produce a desired physical effect. As a result, such drive schemes may enable more accurate production of the desired physical effect, and/or may simplify the process of determining the R-wire, A-wire and B-wire voltages. However, the physical effect produced by actuator elements under such drive schemes may vary slightly depending on whether the respective voltage is 0 or $+V_D$. Depending on the application, this variation may or may not represent a disadvantage outweighing the advantage of higher accuracy.

"Double-speed addressing" has been described previously with reference to FIG. 10. In some embodiments, the method may be extrapolated, e.g. to achieve higher-than-double speed addressing, and generalized to triple, quadruple, or k-tuple speed addressing. k-tuple speed addressing in accordance with certain embodiments of the present invention uses a drive scheme with k phases (where k is a positive integer), and an actuation clock k times faster than for a single-phase drive scheme with the same actuator array, to effect movement of a moving element from one of its extreme positions to the opposite extreme position. Potentially useful drive schemes derived from drive scheme 8 share some or all of the following features:

$V_{RS}$=0 in the first phase and $-V_D$ in the last phase.
$V_{RU}$=$-V_D$ in all phases.
$V_{CR}$=0 in the first phase.
$V_{CL}$=$+V_D$ in the last phase.
$V_{CU}$=$+V_D$ in all phases.

Differences between these drive schemes include one or more of:
  the value of $V_{RS}$ in intermediate phases (i.e. any phases which are neither the first nor the last); possible values include 0, $-V_D$ and "don't care" (i.e. either 0 or $-V_D$)
  the value of $V_{CR}$ in phases other than the first phase; possible values include 0, $+V_D$ and "don't care" (i.e. either 0 or $+V_D$)
  the value of $V_{CL}$ in phases other than the last phase; possible values include 0, $+V_D$ and "don't care" (i.e. either 0 or $+V_D$)

As an example, one possible quadruple-speed drive scheme, referred to hereinafter as "drive scheme 18", is characterized by:

$V_{RS}$ varies between phases as follows:
  Phases 1 and 2: $V_{RS}$=0V
  Phases 3 and 4: $V_{RS}$=$-V_D$
$V_{RU}$=$-V_D$ in all phases
$V_{CR}$ varies between phases as follows:
  Phases 1 to 3: $V_{CR}$=0V
  Phase 4: $V_{CR}$=0V or $+V_D$ ("don't care")
$V_{CR}$ varies between phases as follows:
  Phase 1: $V_{CR}$=0V or $+V_D$ ("don't care")
  Phase 4: $V_{CR}$=$+VD$
$V_{CU}$=$+V_D$ in all phases As described previously with reference to FIG. 10, the key advantage of higher-speed addressing is that the physical effect produced by the actuator array can be controlled more accurately in time. On the other hand, higher-speed addressing also complicates the process of determining R-wire, A-wire and B-wire voltages to produce a desired physical effect (referred to hereinafter as an "addressing method"). While not necessarily so, with double-speed or higher-speed addressing methods, the R-wire, A-wire and B-wire voltages for each actuation clock cycle may be chosen such that any moving elements released in previous actuation lock cycles, but not yet latched in their new position, are correctly latched; whereas with single-speed addressing methods, there is no such constraint on the selection of R-wire, A-wire and B-wire voltages, since all movements are completed within a single actuation clock cycle. As a result, double-speed or higher-speed addressing methods typically have fewer degrees of freedom available at each actuation clock cycle to produce the desired physical effect. Depending on the application, this potential disadvantage may or may not outweigh the advantage of higher-speed addressing.

It is appreciated that adding or subtracting any given voltage from all drive voltages in any higher-speed drive scheme, or inverting the polarity of all drive voltages, results in drive schemes that are electrically equivalent to the original drive scheme. Furthermore, it is appreciated that higher-speed drive schemes may also be devised using asymmetric drive voltages (for example, as a higher-speed version of drive schemes 6 or 7 presented previously), or using more than two nonzero drive voltages (for example, as a higher-speed version of drive scheme 1 presented previously).

FIG. 13 is a graph of voltage waveforms for initialization of one or more actuator elements in an actuator array using the previously described drive scheme 8, and the resulting deflection of moving element 120 from its resting position.

"Initialization" herein refers to a process of latching some or all actuator elements within an array of electrostatic actuators, such as those described previously with reference to FIGS. 2 to 4, into one of their extreme positions, for example, immediately after power-up. Since moving elements are in equilibrium at their resting position when the apparatus is powered down, the initialization process typically achieves latching from the resting position; whereas during normal operation, moving elements are always latched into a new extreme position after having been previously latched in, and then released from, the opposite extreme position. The latching voltage $V_L$ defined previously with reference to FIG. 3 is sufficient only to achieve latching in the latter case but not from the resting position. As a result, the above drive schemes, which typically generate a voltage equal to VL between moving elements and latching electrodes, are not necessarily capable of latching moving elements directly from their resting positions; this is typically first achieved in a separate initialization procedure before these drive schemes can be used.

One possible solution is to increase the magnitude of the selected R-voltage and/or the latching C-voltage such that the magnitude of the resulting voltage between latching electrodes and moving elements becomes sufficiently large to latch moving elements directly from their resting positions. However higher drive voltages may make the controller circuit more costly to implement and/or increase the power consumption of the apparatus during normal operation. Another possible solution is to use higher drive voltages for initialization only and revert to lower drive voltages for normal operation. However, the additional voltages may add complexity to the controller. For example, a controller operating according to drive scheme 8 is typically only capable of applying one of two drive voltages (0 or $-VD$) to each R-wire and one of two drive voltages (0 or $+VD$) to each A-wire and B-wire, whereas a modified version with additional higher drive voltages would have to switch R-wires and/or A-wires and B-wires between three different voltages.

The initialization procedure illustrated in FIG. 13 takes advantage of the moving elements' mechanical resonance and as a result, does not employ higher or additional drive voltages. In FIG. 13, $T_{Res}$ refers to the resonance period of moving elements 120, i.e. the inverse of their mechanical resonance frequency described previously with reference to FIG. 30B; $V_{CSA}$ refers to the voltage applied to selected A-wires, i.e. A-wires of C-subsets containing actuator elements to be initialized; likewise, $V_{CSB}$ refers to the voltage applied to selected B-wires; and $V_{RS}$ refers to the voltage applied to selected R-wires, i.e. those of R-subsets containing actuator elements to be initialized. In the bottom part of the graph, the deflection of a typical moving element 120 away from its resting position and towards the A-position is plotted over time.

The initialization procedure illustrated in FIG. 13 typically includes first and second phases. In the first phase, the controller applies a voltage of 0V to selected R-wires, and the negative drive voltage $-V_D$ to any other R-wires, also referred to hereinafter as unselected R-wires (i.e. $V_{RS}=0$, $V_{RU}=-V_D$). At the same time, the controller alternately sets $V_{CSA}$ and $V_{CSB}$ to the positive drive voltage $+V_D$ and 0V respectively, switching between these voltages periodically such that whenever $+V_D$ is applied to a selected A-wire, 0V is applied to the respective B-wire and vice versa, creating two square waves whose frequency is substantially equal to the mechanical resonance frequency described with reference to FIG. 30B of moving elements 120, and which are 180 degrees out of phase; while also constantly applying the positive drive voltage $+V_D$ to any other A-wires and B-wires. This causes moving element 120 to oscillate around its resting position, with the amplitude of the oscillation gradually increasing over time. In certain embodiments, the duration of this first phase is substantially equal to an integer multiple of half the resonance period $T_{res}$ of moving element 120, plus one quarter of the resonance period (i.e. $T_{phase1} \approx (0.5 \times Ni+0.25) \times T_{res}$, where Ni is an integer), and just sufficiently long to allow maximum oscillation amplitude to be reached. Thus, at the end of the first phase, the moving element 120 is near its resting position and travelling towards one of the two electrodes (in the case of FIG. 13, towards the A-electrode). In the simulated example shown in FIG. 13, the duration of the first phase is six and a quarter resonance periods, i.e. Ni=12. However, it is appreciated that the optimum Ni depends on mechanical properties and damping of the actuator element. In the second phase of the initialization procedure, the controller applies the negative drive voltage $-V_D$ to all R-wires including selected R-wires, while keeping all A-wires and B-wires constantly at the same voltage applied to them at the end of the first phase.

The change in $V_{RS}$ from the first phase to the second increases the voltage between moving element 120 and the latching electrode (i.e. the electrode towards which it is travelling) such that the resulting electrostatic force combined with the moving element's momentum is sufficient to overcome the spring force exerted by bearing 150, allowing moving element 120 to reach a position close enough to the latching electrode to achieve latching into one of the two extreme positions as described with reference to FIG. 30B (in the case of FIG. 13, the A-position). The duration of this second phase is typically sufficient to achieve latching, typically between half a resonance period and a full resonance period. For an initialization procedure to latch moving elements into the B-position rather than the A-position, the procedure is as described above, with the waveforms for $V_{CSA}$ and $V_{CSB}$ reversed. It is also possible to latch moving elements of some C-subsets into the A-position and those of other C-subsets into the B-position simultaneously in a single initialization, by applying different waveforms to the respective A-wires and B-wires.

Similar initialization procedures can be devised for other drive schemes described previously. For example, adding $V_D$ to all R-wire, A-wire and B-wire voltages yields an initialization procedure using only the drive voltages already present in drive scheme 9.

It is appreciated that there need not be any unselected R-subsets or C-subsets during initialization; if all moving elements within the actuator array have substantially the same mechanical resonance frequency, the entire array can be initialized at the same time. On the other hand, in an actuator array where mechanical resonance frequencies vary substantially, the initialization procedure may be repeated several times with signal timing adjusted to the different mechanical resonance frequencies. It is also appreciated that the initialization procedure can also be used at times other than after power-up, for example, in order to return to a well-defined position any moving elements which may previously have failed to latch, for example, as a result of unusually strong mechanical shock.

FIG. 14 is a simplified block diagram of one embodiment of the present invention, including a processor 210 and actuator array 100. This particular embodiment relies on the assumption that the physical effect produced by the moving elements within the actuator array 100 is determined primarily by the number of moving elements in each extreme position at any point in time, and that variations in the physical effect depending on which particular moving elements are in each extreme position are either negligible or not relevant to the application where the apparatus is used; or alternatively, that the physical effect is determined primarily by the number of moving elements moving from one extreme position to the other at any point in time, regardless of which particular moving elements execute the movement.

The latter is true, for example, where the physical effect produced by an individual actuator element is a pressure pulse, the overall physical effect produced by the entire apparatus is audible sound, and the physical size of the actuator array is significantly smaller than the wavelength of the highest audio frequencies being reproduced (with larger or more widely spaced actuator arrays, the resulting audible sound may be directional, as described in WO2007/135678 ("Direct digital speaker apparatus having a desired directivity pattern")). In that case, the entire apparatus is essentially a digital-to-analog converter (DAC) whose analog output is sound pressure (rather than voltage or current, like most DACs).

The processor 210 receives a digital audio signal 600 which is sampled periodically, and adjusts the voltages applied to R-wires 400, A-wires 410 and B-wires 420, causing the actuator elements within actuator array 100 to move between their two extreme positions and thereby reproduce an audible sound represented by audio signal 70.

Processor 210 itself, or an input interface connected thereto, may include any one or more of the following components: a low-pass filter 510, a sample-rate converter 520, a scaler 530, a quantizer 540, an element selector 550, and a high-voltage driver 560 e.g. as described below.

The low-pass filter (LPF) 510 receives digital audio signal 600 and produces a low-pass filtered signal 610. The purpose of the LPF is volume control. LPFs are well known in the art, but are not generally used for volume control in sound reproduction systems based on conventional loudspeakers. In sound reproduction systems based on actuator arrays, however, using an LPF rather than conventional methods for volume control can be advantageous because it can result in improved bass response at low volumes. This is described in detail in WO2007/135679 ("Systems and Methods for Volume Control in Direct Digital Speakers").

The LPF is optional and may be omitted if there is no need for volume control, or if volume control is to be effected by conventional methods despite the disadvantage of poorer bass response at low volumes. Alternatively, the LPF may be implemented in another part of a larger system into which the entire apparatus is embedded; for example, it may run as a signal-processing algorithm in a multimedia processor IC (integrated circuit) in a consumer electronics device. As described in Published PCT Application WO2007/135679 ("Systems and Methods for Volume Control in Direct Digital Speakers"), the LPF typically has a slope of 6 dB/octave above its corner frequency. Other characteristics of the LPF described in the above-referenced application are not critical to the invention.

The sample rate converter (SRC) 520 matches the sample rate of the low-pass filtered signal 610 to the actuation clock frequency at which element selector 550 operates, producing a resampled signal 620. The sample rate of the digital audio signal 600 and thus of the low-pass filtered signal 610 depends on the application. For example, digital telephony typically uses sample rates of 8 kHz or 16 kHz, whereas commonly used sample rates for digital music reproduction in consumer audio devices include 44.1 kHz and 48 kHz. The actuation clock frequency, on the other hand, is dictated by the mechanical properties of the actuator elements and the number of phases used in the drive scheme (k), as described previously with reference to FIGS. 4, 9 and 12, and is typically not equal to (typically higher than) typical sample rates for digital audio content, therefore sample rate conversion is employed. Sample rate conversion is well known in the art, and implementation details, while they may affect overall sound fidelity of the apparatus, are not critical. The SRC is optional and may be omitted if the audio signal 600 is delivered to the processor 210 at a sample rate that equals the actuation clock rate. It may also be implemented in another part of a larger system into which the entire apparatus is embedded.

The scaler 530 matches the range of the resampled signal 620 to the resolution of the actuator array 100, producing a scaled signal 630 which directly represents the number of actuator elements that should be in the A-position (or alternatively, the number of elements that should be in the B-position at any given time in order to produce the desired sound. For example, the digital audio signal may be in two's complement format with 16-bit resolution, such that its value can vary between −32768 and +32767. The range of actuator array 100, on the other hand, is equal to the number of actuator elements it contains, plus one. For example, in an actuator array with 32 R-subsets and 32 C-subsets, containing 1024 actuator elements, the number of moving elements in the A-position can take 1025 different values (from 0 to 1024; likewise for the B-position). The range of the actuator array is typically lower than that of the resampled signal, therefore scaling is employed. Scaling is typically achieved by multiplying the resampled signal with a first constant and adding a second constant. In the example above, the first constant may be 1/64 and the second constant 512. The scaler is optional and may be omitted if the ranges of resampled signal 620 and actuator array 100 match.

The quantizer 540 quantizes the scaled signal 630, taking account of the fact that the number of moving elements in the A-state (or B-state) is always an integer. Its output is a quantized signal 640, which takes only integer values. Quantization is well known in the art. The quantized signal may, for example, be a truncated version of the scaled signal 630, discarding the fractional part. Alternatively, the quantizer may use dithering, to improve performance of the apparatus. Dithering is well known in the art, and is commonly used, inter alia, in analog-to digital and digital-to-analog converters. Dithering may be achieved, for example, by adding a pseudo-random signal with a rectangular or triangular probability distribution function (PDF) to the scaled signal 630 before truncation. The quantizer is optional and may be omitted, for example, if the resolution of the resampled signal 620 is less than or equal to that of actuator array 100.

The element selector 550 receives the quantized signal 640 and determines from it the array drive signals 650, indicating which of the drive voltages is to be applied to each R-wire, A-wire and B-wire at any point in time in order to make the number of actuator elements in the A-position (or alternatively, the number of elements in the B-position) equal to, or as close as possible to, the number represented by the quantized signal 640. Methods for moving one or more specific actuator elements between their two extreme positions, i.e. drive schemes, have been described previously with reference to FIGS. 4 to 12. Depending on the state of each actuator element and on the quantized signal at any given time, there may be more than one way of obtaining the desired number of moving elements in the A-position (or in the B-position). Hence, various different element selection methods may be employed to determine which specific actuator elements to select at any given point in time.

The high-voltage driver 560 translates the voltage levels of drive signals 650 to the drive voltages employed by the actuator array 100 under whichever drive scheme is used, and applies these drive voltages to R-wires 400, A-wires 410 and B-wires 420. The high-voltage driver may be implemented, for example, as a plurality of conventional level-shifting circuits. Depending on the mechanical dimensions of actuator elements, drive voltages may have magnitudes of tens or hundreds of volts, whereas digital electronic circuits typically use supply voltages well below 10 volts. Furthermore, all drive schemes described above with reference to FIGS. 5 to 12 employ at least three different drive voltages (for example, drive scheme 8 described with reference to FIG. 10 has $+V_D$ and 0 for A-wires and B-wires, and $-V_D$ and 0 for R-wires), whereas digital circuitry generally uses only two distinct levels (logic high/low). For example, if drive scheme 8 is used, "high" and "low" outputs from the element selector 550 may be translated to $-V_D$ and 0 respectively for R-wires, and to $+V_D$ and 0 respectively for A-wires and B-wires. Therefore, level shifting is employed. Level shifting circuits are known in the art.

It is understood that the functions of low-pass filtering, sample rate conversion and scaling need not be performed in the order shown in FIG. 14, and may be performed in any order without affecting the functionality of the apparatus. Furthermore, the components of FIG. 14 may be physically partitioned in different ways. For example, and without limitation, each of the LPF, SRC, quantizer and element selector may be implemented as an algorithm running on a general-purpose microprocessor or microcontroller or on a digital signal processor (DSP), or as a hard-wired electronic circuit. Any electronic circuits forming part of the processor 210 may or may not be integrated into one or more integrated circuits (ICs), and may be co-packaged with actuator array 100, with other system components, or implemented as a standalone component.

Figure 15A:
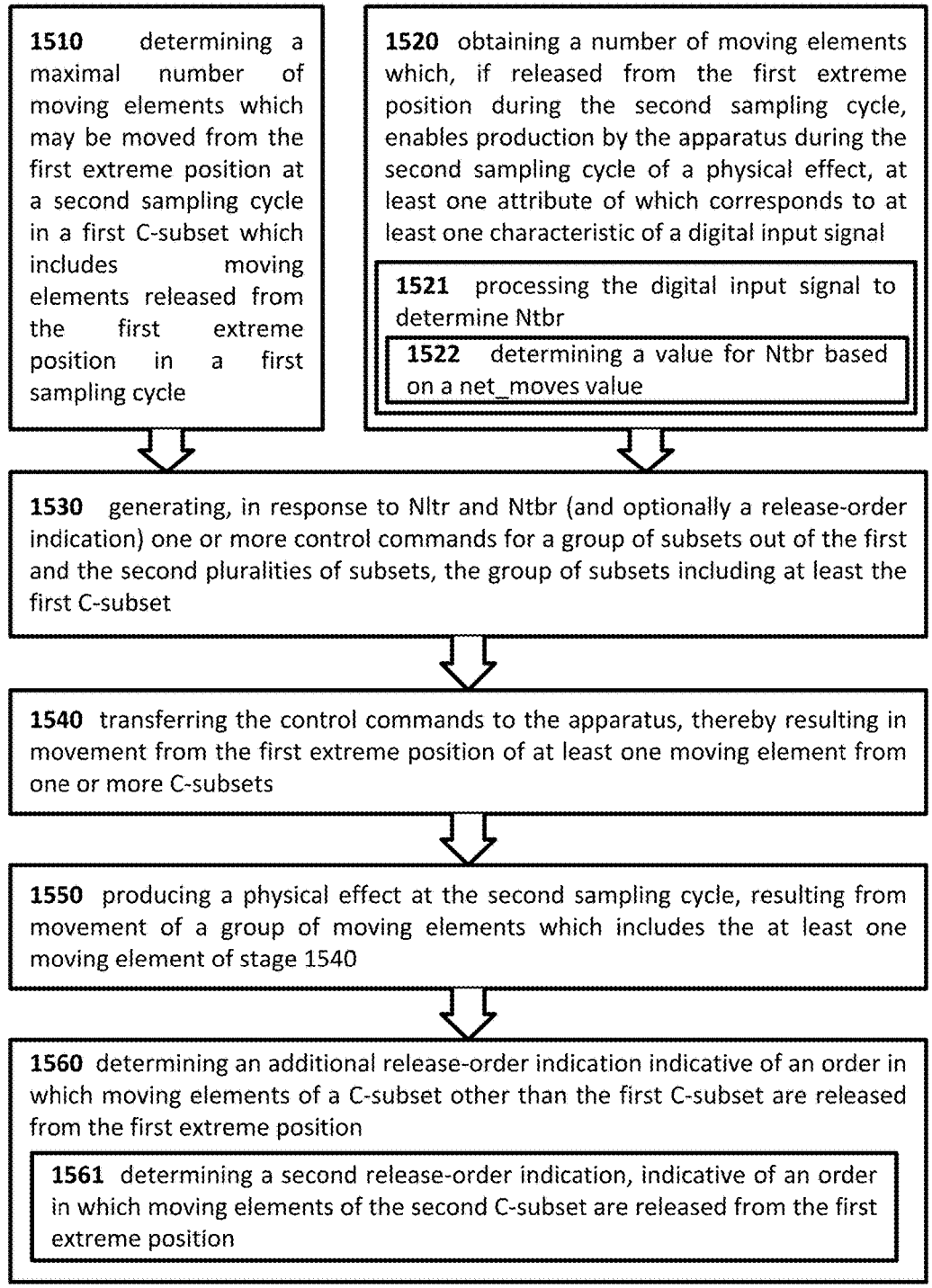
FIG. 15A is a flow chart a method for controlling an apparatus which includes a set of actuator elements, according to an embodiment of the invention.
Figure 22A:
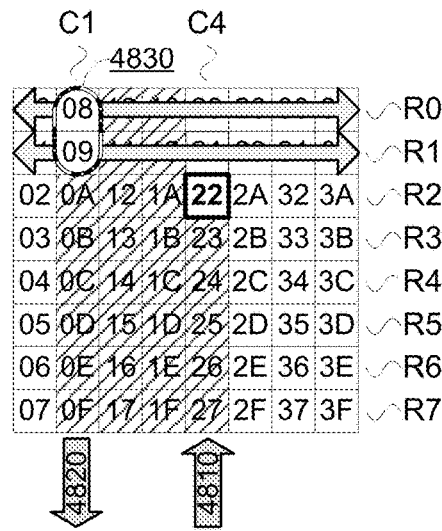
FIGS. 22A through 22D and 23A through 23D illustrate various scenarios in which releasing of moving elements in a previous sampling cycle prevents a releasing of moving elements of the apparatus, according to an embodiment of the invention.
Figure 22B:
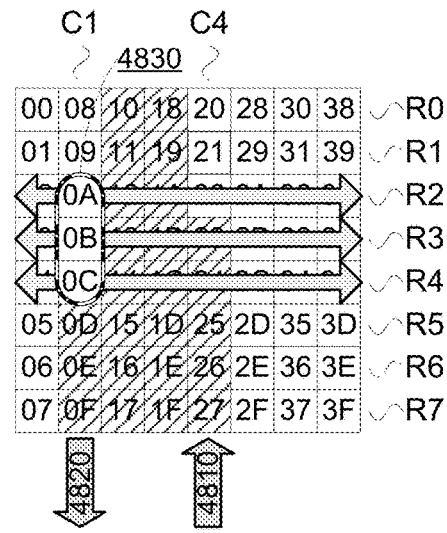
Figure 22C:
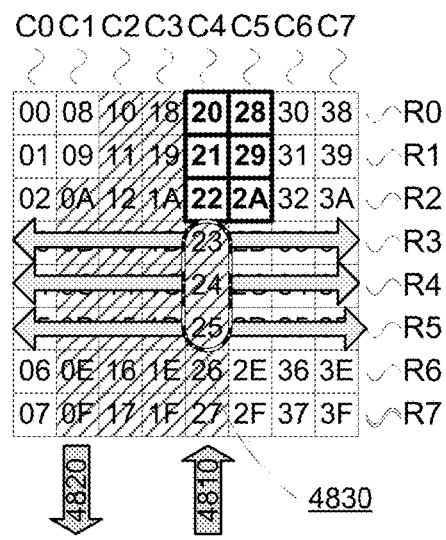
Figure 22D:
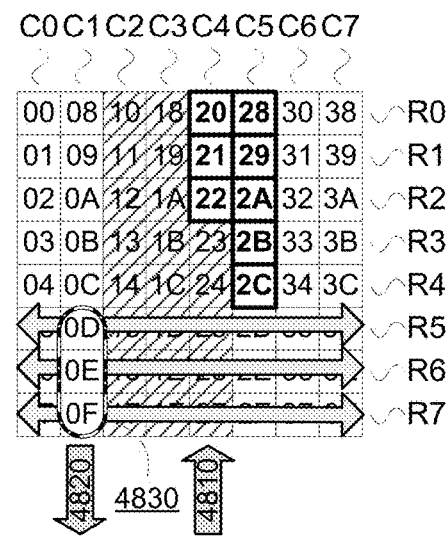
Figure 23A:
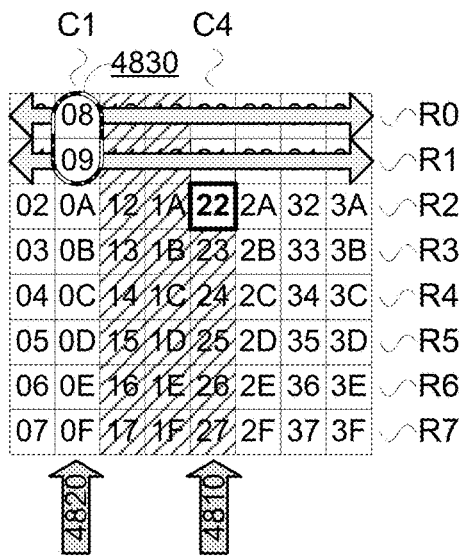
Figure 23B:
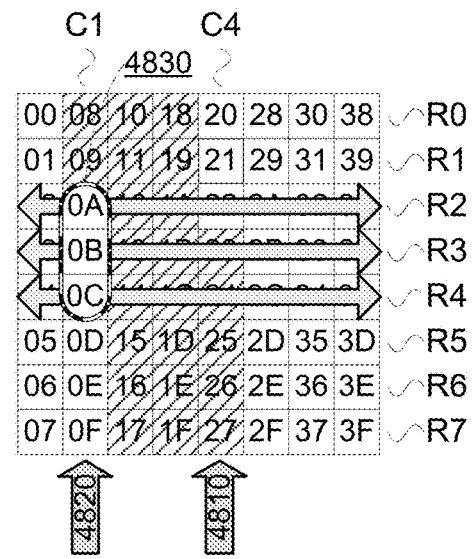
Figure 23C:
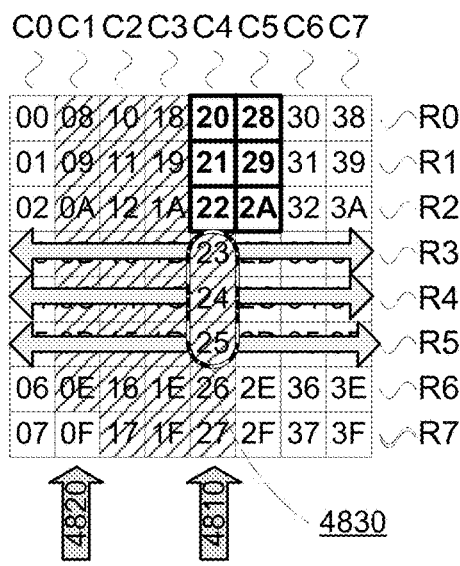
Figure 23D:
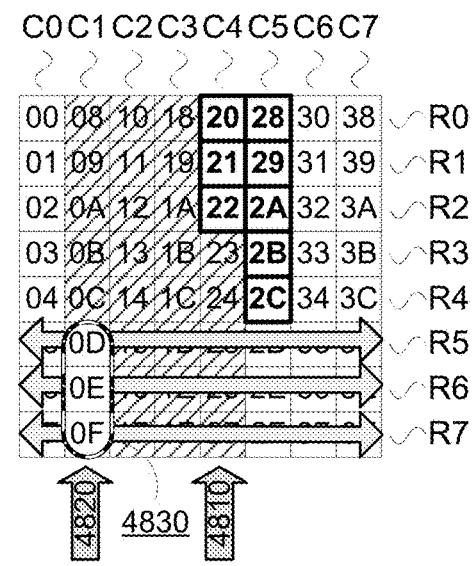

FIG. 15A is a flow chart of method 1500, according to an embodiment of the invention. Method 1500 is a method for controlling an apparatus which includes a set of actuator elements, each of the actuator elements including a moving element which moves between first and second extreme positions. For example, the set of actuator elements may be similar to any one of those illustrated in FIGS. 2 and 3. The multiplicity of actuator elements of the set of actuator elements which is controlled in method 1500 is partitioned in two separate ways:

A first partitioning divides the actuator elements of the set into Nr non-empty first subsets (R-subsets);

A second partitioning divides the actuator elements of the set into Nc non-empty second subsets (C-subsets).

Such partitioning of the multiplicity of actuator elements is exemplified in FIG. 16. It is noted that the terms R-subsets and C-subsets were selected for mnemonic considerations only, and refer to the illustration in which the first subsets are arranged in rows, and the second subsets are arranged in columns. However, in other implementations, the partitioning into first and/or second subsets may have other geometrical arrangement. One such implementation is exemplified in FIG. 3. Partitioning the multiplicity of actuator arrays so that the actuator arrays in each of the subsets would have some geometrical continuity (e.g. rows and columns or the arrangement of FIG. 3) may have implementation benefits in at least some of the variations of the invention (e.g. simplicity of construction and electrical connections), and were therefore selected as an illustrative example.

While variations may be adapted, it is assumed that the subsets in each of those two partitionings are mutually exclusive. That is, according to an embodiment of the invention, each actuator element of the set of actuator elements which is controlled in method 1500 is included in exactly one first subset out of the plurality of Nr first subsets and exactly one second subset out of the plurality of Nc second subsets.

The actuator elements in each of the subsets are connected (or otherwise arranged) in a way which enables a control command to affect all of the actuator elements of the respective subset together. For example, respective components in each of the actuator elements in each of the subsets (for example—all of the movable elements) may be electronically connected to each other, so that the same voltage may be applied to all of those parts (e.g. the movable elements) together.

It should however be noted that even though a single control command may be applied to all of the actuator elements of a subset (e.g. a predetermined potential may be applied to all of the second electrodes of the subset actuator elements), not necessarily all of those actuator elements would behave in the same way. For example, if different control commands may be sent to the moving element of each of those actuator elements and to its electrodes, even though a single voltage may be applied to all of the movable elements of a single subset of actuator array, the voltages applied to the second electrodes of those actuator elements may differ.

It is noted that method 1500 may be executed by a processor included in the apparatus itself, but this is not necessarily so; some or all of the stages of method 1500 may be executed by a processor external to the apparatus. In various implementations of the invention, such a processor may be connected to the apparatus directly (e.g. electrically), by an intermediary system (e.g. which translates commands issued by the processor to such interpretable by the apparatus), wirelessly, and so on and so forth.

The discussion of method 1500 focuses mainly on managing releasing of moving elements to move from the first extreme position to the second extreme position. Clearly, in a functional system, movement of moving elements in the other direction (from the second extreme position to the first), may also be required. While not necessarily so, the managing of the releasing of moving elements to move in that opposite direction (if implemented), may be implemented in a symmetrical way to that of method 1500.

It is noted that, if implemented, control commands inducing movement in that other direction may be issued over the same channels (e.g. over the same R-wires); but may also be issued over other channels (e.g. over B-wires to the B-side electrodes, while commands inducing movement in the generally discussed direction are transferred to R-subsets over A-wires). As will be discussed in more detail below, control commands required to manage the movement in one direction (e.g. from first to second extreme position) may cause constrains which ought to be accounted for when managing movement in the opposite direction, and vice versa.

While not necessarily so, some or all of the stages illustrated in FIG. 15A may be iterated every sampling cycle (e.g. every sampling cycle, given a sampling frequency). In other implementations, these stages may be reiterated in other frequencies or patterns of repetitions. The following discussion refers to a "second sampling cycle", in order to differentiate it from a preceding "first sampling cycle".

It is noted that the "first sampling cycle" may have any number of other sampling cycles preceding it; it is not necessarily a first in any series, but this term is rather used only to differentiate it from the sampling cycle referred to as "the second sampling cycle". These two sampling cycles may be two consecutive sampling cycles, but this is not necessarily so. Furthermore, the sampling cycles may correspond to clock cycles (which may be defined, for example, by a clock signal which is produced by a clock generator), but this is not necessarily so. It is noted that not every stage illustrated in FIG. 15A is necessarily executed in every sampling cycle. For example, stage 1510 may be executed only if the determined number is changed from a previous cycle.

Stage 1510 includes determining a maximal number of moving elements in a first C-subset which may be released from the first extreme position at the second sampling cycle. The first C-subset is a C-subset which includes moving elements released from the first extreme position in a first sampling cycle, which precedes the second clock cycle. Referring to the examples set forth with respect to the previous drawings, stage 1510 may be carried out by a processor such as processor 210.

Referring to the example of FIG. 16, the first C-subset is the C-subset denoted C4. In FIG. 16, each square of the array represents a single actuator element, wherein white squares represent actuator elements which are at the first extreme position, and diagonally patterned squares represent actuator elements which are at the second extreme position. It is noted that while in some embodiments some of the actuator elements of the set may be at transition between such two positions in a given moment, this is not the case in the state of the set of actuator elements which is illustrated in FIG. 16.

As stated above, the first C-subset (e.g. subset C4) includes moving elements released from the first extreme position in a previous sampling cycle. For example, these actuator elements could be actuator elements 23, 24, and 25. These elements could have been released in the immediately preceding sampling cycle, but this is not necessarily so.

Optionally, the first sampling cycle (during which the aforementioned released actuator elements were released) is the last sampling cycle before the second sampling cycle in which any moving element of the apparatus was released from the first extreme position. In another implementation, the first sampling cycle is the last sampling cycle before the second sampling cycle in which any moving element—which belongs to a predefined group—was released from the first extreme position. In yet another implementation, the first sampling cycle is the last sampling cycle before the second sampling cycle in which any moving element was released from the first extreme position in a release process which meets at least one additional condition.

The first alternative of the above paragraph may be implemented using one or more parameters referring only to the last instance of releasing actuator elements from the first extreme position (e.g. parameters "current C-subset", "last element released in C-subset", and "release order indication" in FIG. 16). The other alternatives mentioned in the previous paragraph may be implemented using parameters to refer to several instances of releasing actuator elements from the first extreme position. This may be implemented, for example, for managing several wraparound sequences (with or without changing assignments between control commands and corresponding C-subsets and/or R-subsets).

In such a case, multiple sets of parameters may be saved, each including some or all of the parameters indicated in FIG. 16 (or equivalents thereof), and each set pertaining to an independently managed sequence of releasing actuator elements from the first extreme position. Implementing several such sets of parameters for several managed sequences of releasing actuator elements from the first extreme position (and possibly several sets pertaining to release from the second extreme position) is also included within the scope of the invention. However, except for possibly somewhat different decision rules implemented (possibly corresponding to acts of released in multiple managed sets), each of the sets may be implemented similarly to the implementation using a single set of parameters from acts of release from the first extreme position, which is discussed in detail below.

If multiple such sets are managed, the first sampling cycle (during which the aforementioned released actuator elements were released) may be the last sampling cycle before the second sampling cycle in which any moving element of the apparatus was released from the first extreme position in the same managed set of releases.

It should be noted that if in the first sampling cycle the moving elements released from the first extreme position were the last to be released from a given C-subset, then (at least in some implementations), the first C-subset is not that given C-subset, but rather another C-subset selected according to a C-subset selection order indication (e.g. the next column to the right).

For reasons of brevity, the maximal number of moving elements in the first C-subset which may be released from the first extreme position at the second sampling cycle determined in stage 1510 is also denoted Nltr, where the acronym ltr stands for "left to raise", according to a possible method of notation in which moving elements which move from the first extreme position to the second extreme position are "raised", while moving elements moving in the other direction are "lowered").

The determining of Nltr for the second sampling cycle (and for the first C-subset) in stage 1510 is based on multiple parameters, which include at least a number of the moving elements of the first C-subset which were released from the first extreme position in the first sampling cycle. This number may be used directly for the determining of Nltr, or indirectly. That is, the number of the moving elements of the first C-subset which were released from the first extreme position in the first sampling cycle may be used for determining a value for another parameter, and the determining of Nltr may be based on the value of that parameter.

By way of example, method 1500 may include a stage of determining an identity of the last actuator element of the first C-subset whose moving element was released from the first extreme position in the first sampling cycle, based on the number of the moving elements of the first C-subset which were released from the first extreme position in the first sampling cycle. Equivalently, an identity of another actuator element may also be determined likewise—e.g. an identity of the next actuator element of the first C-subset to be released. It is noted that the terms "last" and "next" pertain to a release-order by which moving elements of the first C-subset are released, and not necessarily to temporal conditions. Following that stage, the determining of Nltr may depend directly on the determining actuator element identity.

Example to a way in which Nltr may be determined is offered below, assuming a constant number of moving elements in each C-subset (either in the entire array, or at least in part of it). Referring to the example of FIG. 16, in the actuator elements are numbered sequentially within each C-subset, and following between different C-subsets. It is assumed that the moving elements in each of the C-subsets of FIG. 16 are released either according to their numbering, or in the reverse order.

The process for determining Nltr may include:
Determining a value for a variable (Apos) which indicates which is the next element to be released from first extreme position. The value of Apos may be between 0 and [number of elements in C-subset]−1. The value may be determined in each cycle so:
Apos=(last Apos+number of moving elements released from first extreme position in the respective cycle) modulo (number of elements in array)
Determining Nltr=[number of R-subsets−(Apos modulo number of R-subsets)] modulo number of R-subsets. It is noted that if Nltr=0, the Nltr for the next C-subset may be determined to be equal to number of R-subsets.

The implementing of modulo division ensures that numbers larger than the number of elements in the array wrap around to the beginning. It is noted that in another variation, Apos may be stored as two variables—present (or next) C-subset, and location within C-subset, in which case the determining of Nltr may only require the location within C-subset.

It is noted that in the example above, the determining of Nltr does not depend on knowledge of a release-order in which elements of the first C-subset are to be released. In other variations, the determining of Nltr may be based also on a release-order indication, which is indicative of an order in which moving elements of the first C-subset are released from the first extreme position.

In FIG. 16, a simple release-order is assumed (from actuator element 27 towards actuator element 20, corresponding to the order in which the actuator elements are geometrically arranged in the respective C-subset, and it correspond to a reverse order of the order in which these elements are numbered in the drawing). Therefore, the maximal number of moving elements which may be released from the first extreme position in the first C-subset (i.e. subset C4) is equal to three (namely, those of actuator elements 22, 21, and 20). This may be determined by the number of moving elements already released from the first extreme position in that C-subset (those indicated as being in the second extreme position, i.e. corresponding to the diagonally patterned elements 23 through 27).

Optionally, the determining of Nltr may be based on an indication of the number of moving elements of the first C-subset which were released from the first extreme position since any moving element of another C-subset was released from the first extreme position (at least in the same sequence-set, if multiple such sets are implemented, as suggested above). Possibly equivalently, the determining of Nltr may be based on an indication of the last element of the first C-subset to be released from the first extreme position (e.g. as exemplified in FIG. 16). Knowledge of the latter parameter (which, like the release-order indication, is not required in all implementations of method 1500) is equivalent to knowledge of the number of moving elements of the first C-subset which were released from the first extreme position since any moving element of another C-subset was released from the first extreme position. It is however noted that the number of the moving elements of the first C-subset which were released from the first extreme position in the first sampling cycle may be used in the computation of any of those two parameters.

It is worth noting that the number of the moving elements of the first C-subset which were released from the first extreme position in the first sampling cycle is not necessarily equal to the total number of all moving elements released in the first sampling cycle from the first extreme position. Especially, moving elements of two or more consecutive C-subsets (consecutive with respect to a C-subsets selection order) may be released from the first extreme position in a single sampling cycle. This may occur, for example, in scenarios referred to below as "fold" or "over-hang".

Referring to the example of FIG. 16 (and assuming that no reassignment of C-subsets is implemented): if, by way of example, eight moving elements were released from the first extreme position in the first sampling cycle, three moving elements of C-subset C3 (i.e. elements 1D through 1F) would have moved in the same sampling cycle as the five moved elements of C-subset C4, but the number of the moving elements of the first C-subset (i.e. subset C4) which were released from the first extreme position in the first sampling cycle would have been equal to five.

It should be noted that throughout the discussion of method 1500 (and also of the other systems and methods described in this document), it is assumed that each actuator element includes exactly one moving element. However, implementations in which a single actuator element of the apparatus includes more than one moving element are also possible. Method 1500 (and likewise the other systems and methods described in this document) may also be implemented in such cases, mutatis mutandis.

The release-order indication discussed so far is indicative of an order in which moving elements of the first C-subset are released from the first extreme position. Since that release-order indication pertains to the first C-subset, it is also referred to as "first release-order indication", in order to differentiate it from release order indications pertaining to other C-subsets, or to the same C-subset in different times.

While the release-order indication is not necessarily required for stage 1510 of determining Nltr, it is nevertheless used in all the implementations of method 1500. For example, such release-order indication may be used for stage 1530 in which control commands are generated. Such implementations are discussed in greater detail below. Since the release-order indication may optionally be used in stage 1510, next some variations and possible implementations are discussed.

In different embodiments of the invention, different ways of implementing the release-order indication may be used. Such different variations are suitable for different ways in which the apparatus may be implemented, and for different ways in which the control of the apparatus is implemented. Significantly, different types of release-order indications may be more suitable to the following possible variations:

Implementations in which the only change possible in the order in which moving elements of a single C-subset are released is the direction (e.g. from R0 to R7 or from R7 to R0 in the example of FIG. 16);

Implementations in which the order in which moving elements of a single C-subset are released is managed solely by a processor implementing method 1500 and in which more than two possible orders are used for a single C-subset in various iterations (for example, the order [23, 25, 27, 26, 24, 20, 22, 21] for C-subset C4 may also lead to the state illustrated in FIG. 16);

Implementations in which an additional unit reassigns control commands issued by the control to the various subsets of the apparatus (e.g. reassignment of commands to R-wires of the apparatus may be managed by an intermediate scrambler connected between such aforementioned controller and the apparatus).

It should be noted that the term "release-order" does not necessarily suggest that different moving elements of a given C-subsets are released one after the other according to that order. In many implementations several moving elements are released substantially concurrently in a single sampling cycle. In some cases (assuming manufacturing differences between different actuator elements, for example), one moving element which comes later in the order may be released before moving elements preceding in the release-order However, in a single release cycle in which the moving elements of a given C-subset are released from the first extreme position (before continuing to release moving elements from another C-subset; or some of those moving elements, e.g. if others are defective), each released moving element is released from the first extreme position in a sampling cycle which is earlier than or equal to the sampling cycles in which all moving elements following in order are released.

According to an embodiment of the invention, the release-order indication includes a binary value which is indicative of an order in which moving elements of a respective C-subset are released from the first extreme position. For example, the release-order indication in FIG. 16 is "1", which corresponds to "from bottom to top of the drawing" (where the opposite direction, also referred to as "reverse" order, is represented by "0").

This does not entail that the order of release of the moving elements themselves is necessarily fixed to one of two options (e.g. if the aforementioned intermediary scrambler is implemented), but only that this parameter is sufficient in at least some implementations of method 1500 when release-order is considered (e.g. optionally in the determining of Nltr in stage 1510, optionally in the generating of stage 1530, etc.). The controller implementing the respective stage (e.g. 1510, 1530) in such implementations may store only this binary value, but may also store additional order-indicative parameters (which do not affect the determining of Nltr if at all affected by the release-order indication—e.g.

if the order cannot change during a single release cycle of moving elements of the C-subset).

In another implementation, the release-order indication may include permutational information, indicative of an order in which moving elements of at least one of the plurality of C-subsets are released from the first extreme position. For example, the order of released moving element [23, 25, 27, 26, 24, 20, 22, 21] may be indicated by any of the following equivalent possible release-order indications: [4, 6, 8, 7, 5, 1, 3, 2] and [R3, R5, R7, R6, R4, R0, R2, R1].

The determining of the maximal number of moving elements in the first C-subset which may be released from the first extreme position at the second sampling cycle may be equivalent to subtracting the number of moving elements in the first C-subset already released in this release cycle from the total number of releasable moving elements in the first C-subset (e.g. this would lead in the example of FIG. 16 to Nltr=3, because 8 (total number of elements in subset C4) minus 5 (number of elements which already moved to the second extreme position) equals 3).

It should however be noted that, as discussed below in greater detail, this is not necessarily so, because in some implementations some moving elements may be restricted from moving in a given sampling cycle (depending on release history of other moving elements in the apparatus, possibly in both directions—from first to second extreme position and vice versa).

It is noted that stage 1510 is not necessarily executed in the same sampling cycle as the following stages (e.g. in the second sampling cycle). In case no elements were released in the previous cycle (in the first C-subset, possibly also requiring no movement in other C-subsets), Nltr may be determined in a previous sampling cycle.

Stage 1520 of method 1500 (which may be executed before, after, or at least partly concurrently with the execution of stage 1520) includes obtaining a number of moving elements which, if released from the first extreme position during the second sampling cycle, enables production by the apparatus during the second sampling cycle of a physical effect, at least one attribute of which corresponds to at least one characteristic of a digital input signal. For reasons of brevity, the number obtained in stage 1520 is also denoted Ntbr, where the acronym tbr stands for "to be raised", according to the aforementioned possible notation in which moving elements which move from the first extreme position to the second extreme position are "raised", while moving elements moving in the other direction are "lowered".

It is noted that the characteristics of the physical effect which may be generated are not necessarily exactly identical to that of the digital input signal (for example, the resulting frequency-spectrum of the generated physical effect may be a little different from that defined by the digital input signal).

This may follow from various reasons, some of which were previously discussed. For example, quantization noise may result from the fact that in some implementations of the apparatus, the number of actuator elements in the actuator array is smaller than the number of possible values that the digital input signal can assume. Another example is mismatch noise, which may result from differences in the magnitude of the physical effect (e.g. pressure wave, reflection) produced by each actuator element, such that the physical effect (e.g. sound, lighting) produced by the apparatus as a whole may suffer from some fluctuations as a result. However, the number Ntbr obtained in stage 1520 is such that, if Ntbr moving elements are released from the first extreme position during the second sampling cycle, then the apparatus as a whole would produce a physical effect whose attributes sufficiently closely correspond to the characteristics of the digital input signal for purposes of a given application. For example, the requirement for audio accuracy for a speaker of a cellular phone is different from that of a high fidelity stereo system. It is assumed that the number, quality, and geometrical arrangement of the actuator elements of the apparatus is designed and manufactured to meet this requirement.

It is noted that possibly, multiple numbers of moving elements may be selected, so that if a corresponding number of moving elements would be released from the first extreme position during the second sampling cycle, such a physical effect may be generated. If, using the notation offered above, such number m1 is selected (i.e. Ntbr is defined Ntbr=m1) so that in the second sampling cycle m1 moving elements would be released from the first extreme position, and there exists a number m2 so that if m2 moving elements are released from the second extreme position during the second sampling cycle, then the physical effect would be produced during the second sampling cycle.

That is, for a single value of net_moves (determination of which—or equivalents thereof, such as number of moving elements to be in the second extreme position—may suffice in some implementations for sufficiently accurate production of the physical effect), more than a single pair of m1 and m2 may possibly exist to fulfill m2−m1=net_moves. Therefore, in some situations more than a single value may be selected for Ntbr, and different decision criteria may be implemented in such cases to select the appropriate pair of (m1, m2). Considerations for selection of the appropriate pair may be, for example—energetic efficiency, computational simplicity, moving elements release complexity, mismatch noise reduction, etc. While not necessarily so, at each sampling cycle, the total number of moving elements released from both extreme positions may be minimized by releasing zero elements from at least one of the extreme positions.

Optionally, method 1500 may include stage 1521 of processing the digital input signal to determine Ntbr. This may be implementing by applying various signal kinds of processing techniques and/or by a set of decision rules which were determined for the specific apparatus (e.g. taking account the physical effect which may be generated by each actuator element). Referring to the examples set forth with respect to the previous drawings, stage 1521 may be carried out by a processor such as processor 210.

Optionally, method 1500 may include stage 1522 of determining a value for Ntbr based on net_moves value which fulfils the condition that if m1 moving elements would be released from the first extreme position, and m2 moving elements would be released from the second extreme position during the second sampling cycle, then the apparatus as a whole would produce a physical effect whose attributes sufficiently closely correspond to the characteristics of the digital input signal for purposes of a given application. The net_moves value used in optional stage 1522 may be determined as part of method 1500 (e.g. as part of stage 1521), but this is not necessarily so (e.g. it may be obtained from an external unit). Referring to the examples set forth with respect to the previous drawings, stage 1522 may be carried out by a processor such as processor 210. It is noted that Ntbr is not necessarily determined in stage 1520, and may be received from an external system or unit, or otherwise obtained.

While not necessarily so, stage 1520 may include obtaining (possibly determining) multiple possible Ntbr, wherein the actual selection between them is conducted later on (e.g. in a stage of determining how many moving elements will be released in the second sampling cycle from the first extreme position).

It is noted that it may be decided in stage 1520 that Ntbr=0. In such a case, the following stages of method 1530 may or may not be executed, depending on the specific implementation. For example, in case an electric potential should be applied to the various pluralities of wires of the apparatus (e.g. in order to keep some or all of the moving elements latched), control commands may still be required to be issued in the second sampling cycle.

Method 1500 includes stage 1530 of generating, in response to Nltr and Ntbr, one or more control commands for a group of subsets out of the first and the second pluralities of subsets, the group of subsets including at least the first C-subset. While not necessarily so, the group of subsets may also include at least one R-subset. Referring to the examples set forth with respect to the previous drawings, stage 1530 may be carried out by a processor such as processor 210.

According to an embodiment of the invention stage 1530 may include generating the control commands further based on first release-order indication which is indicative of an order in which moving elements of the first C-subset are released from the first extreme position. Various implementations and possible utilization of such a release-order were discussed with reference to stage 1510.

While ideally, transferring of the generated control commands to the apparatus would resulting in movement of one or more moving elements between the two extreme positions, thereby resulting in generation of a physical effect whose attributes from the first extreme position most closely resemble the respective attributes of the input digital signal. However, this is not always enabled. Especially, it is not always possible to release exactly Ntbr elements from the first extreme position during the second sampling cycle.

It is noted that the control command may be implemented in various ways, some of which are discussed below. for example, the control commands may consist of electrical signals sampled at the sampling frequency (e.g. the actuation clock frequency), which indicate which voltages (out of 2 or more possible ones) should be applied to each electrode of the apparatus (e.g. to each R-wire, A-wire and B-wire). It is noted that these control signal commands exist at every clock cycle, even if their value does not change from the previous cycle.

Before discussing stage 1530 in greater detail, it is noted that stage 1540 of method 1500, which follows stage 1530, includes transferring the control commands to the apparatus, thereby resulting in movement from the first extreme position of at least one moving element from one or more C-subsets. Especially, the transmitting of stage 1540 results in movement from the first extreme position of at least one moving element which is included in the first C-subset. Referring to the examples set forth with respect to the previous drawings, stage 1540 may be carried out by an interface such as interface 290.

It should be noted that if the control commands generated in stage 1530 do not require release of any moving elements from the first extreme position during the second sampling cycle, stage 1530 may alternatively be followed by a stage of transferring the control commands to the apparatus, thereby resulting in prevention of movement from the first extreme position of at least one moving element from one or more C-subsets (possibly of all of the moving elements which are positioned in the first extreme position).

It is noted that in other implementations, if no moving element is to be released from the first extreme position in the second sampling cycle, the controller may refrain from generating any commands in stage 1530. In some implementations of the apparatus, control commands (e.g. electric potentials) arriving from the controller ought to be applied to the actuator elements of the apparatus at all times, and are therefore issued by the controller in every sampling cycle.

It is noted that while not necessarily so, method 1500 may also include a stage of moving at least one moving element from the first extreme position during the second sampling cycle, a stage which results from the execution of stage 1540.

Optionally, method 1500 may include stage 1550 of producing a physical effect at the second sampling cycle, resulting from movement of a group of moving elements which includes the at least one moving element of stage 1540 (and possibly of additional one or more moving elements, e.g. released from the second extreme position, and/or released in previous sampling cycles). Referring to the examples set forth with respect to the previous drawings, stage 1550 may be carried out by an apparatus (e.g. actuator array) such as actuator array 100.

Referring to method 1500 as a whole, and specifically to stage 1540 and 1500, it is noted that the physical effect may be sound. The characteristics of the sound wave generated during the second sampling cycle by the apparatus are affected by various parameters—some of them controllable (e.g. the number of released moving elements) while others are usually not controllable (e.g. the shapes of the moving elements). Some other important factors which affect the attributes of the generated sound waves are the speed at which the moving elements move, the medium in which the apparatus operates, tendency of the apparatus to mechanical vibrations, etc.

Reverting to stage 1530, the generating of the control commands (which may be considered to include the equivalent of determining which moving elements would be released from the first extreme position in the second sampling cycle, and possibly also from the second extreme position) based on Ntbr and Nltr (and possibly on additional parameters as well) depends on decision rules, which should be determined to suit the characteristics of the apparatus.

Referring to FIGS. 8 and 11, it is clear that different sets of decision rules may be tailored to different drive schemes, and would enable closer resemblance of the physical effect to the ideally produced physical effect. For example, naïve implementation of decision rules designed for a single-phase apparatus (such as those discussed with respect to FIG. 8) may lead to an undesired result if implemented unchanged for a two-phase apparatus (such as those discussed with respect to FIG. 11). While in a two-phase drive scheme (or indeed in k-phase drive scheme, k>1) released moving elements may require catching in subsequent sampling cycles, this is not required (nor usually accounted for) in single-phase drive schemes. It is noted that while electrostatic drive-schemes are exemplified in FIGS. 8 and 11, the control of apparatuses which are controlled differently (e.g. magnetically) may also be managed by drive schemes.

The drive scheme also defines the types of control commands which may be issued. For example, in drive schemes 8, 9 and 10 each of the C-subsets and the R-subsets may be controlled by one of two possible voltages, while in drive schemes 6 and 7 a greater number of voltages may be implemented.

Balancing between the relative simplicity of a single-phase drive scheme to the relative complexity of multi-phase drive schemes, most of the exemplification below would pertain to two-phase drive schemes. Likewise, most of the exemplification would use the relatively simple example of implementing two types of commands (for each type of the subsets). However, it will be clear to a person who is skilled in the art that implementing method 1500 for different types of drive schemes (e.g. single-phase, other multi-phased, drive schemes with a larger number of possible commands, etc.) may also be implemented.

The control commands generated during stage 1530 may result, when applied to corresponding subsets of the apparatus's actuator elements, movement from the first extreme position of moving elements which are included in more than one column. For example, referring to the example of FIG. 16, moving elements may be released in the second sampling cycle from the first C-subset (C4) as well as from another C-subset (e.g. C-subset C5). Releasing moving elements of two (or more) C-subsets enables inducing movement from the first extreme position of a number of moving elements which is larger than Nltr.

Referring to FIG. 15B, in which various possible implementations of stage 1530 according to an embodiment of the invention, are illustrated.

While the generation of the control commands may be implemented as a single concurrent process, for the sake of explanation it will be assumed that generation of control commands to different subsets of actuator elements is executed in different stages. These stages may indeed be implemented as different stages (e.g. using a different computational process), but this is not necessarily so.

Referring to drive schemes 6 through 10, it is noted that inducing movement of a given moving element from the first extreme position in a given sampling cycle requires fulfillment of the following conditions:

The given moving element is located (e.g. latched, though not necessarily) in the first extreme position during a release time of the given sampling cycle;

A control command inducing movement from the first extreme position is issued to the C-subset in which the given moving element is included (e.g. "Vcr" in the example of FIG. 11); and A control command inducing movement from the first extreme position is issued to the R-subset in which the given moving element is included (e.g. "Vrs" in the example of FIG. 11).

In the following discussion of sub-stages of stage 1500, generation of a control command to a given subset may be interpreted as generation of control commands inducing movement from the first extreme position. However, the invention (and specifically method 1500) is not limited to such interpretations. Furthermore, in the following discussion, a similar interpretation is assumed for reasons of clarity of explanation, according to which releasing of a moving element from an extreme position requires issuing of movement inducing control commands to the respective C-subset and R-subset in which this moving element is included. However it should be noted that in some implementations, a movement inducing state may be applied to a subset if a previous command was not canceled (e.g. if a previously applied electric potential was not commanded to be changed). In such an embodiment, there is no need to actually generate and transfer the command—even if movement inducing—if it does not change a previously issued command. Such variations are included in the scope of the invention.

According to such a convention, stage 1530 includes stage 1531 of generating a control command to the first C-subset, so that transfer of that control command to the apparatus (in stage 1540) results in movement from the first extreme position of at least one moving element included in the first C-subset. The moving elements of the first C-subset which would move from the first extreme position also depend on a state of one or more of the R-subsets (and possibly on control commands issued to one or more of the R-sub sets during the second sampling cycle).

Referring to the aforementioned option of releasing from the first extreme position moving elements of more than one C-subset, stage 1530 may also include stage 1532 of generating a control command to a second C-subset (which is not the first C-subset), so that transfer of that control command to the apparatus (in stage 1540) results in movement from the first extreme position of at least one moving element included in the second C-subset. The moving elements of the second C-subset which would move from the first extreme position also depends on a state of one or more of the R-subsets (and possibly on control commands issued to one or more of the R-subsets during the second sampling cycle).

It is noted that according to an embodiment of the invention, the execution of stage 1532 depends on the fulfillment of a criterion (which may be checked by implementing a corresponding decision rule. According to an embodiment of the invention, the generating of stage 1532 includes generating the control command for the second C-subset if a first criterion which is based on relationships between Nltr and Ntbr is met.

According to such an embodiment of the invention, when the control commands generated in stage 1530 (including that of stage 1532) are applied to the subgroup of subsets (e.g. including at least: the at least one R-subset mentioned with respect to stage 1530, the first C-subset and the second C-subset) this results in movement from the first extreme position of at least one moving element of the first C-subset and at least one moving element of the second C-subset.

The number of moving elements actually released from these subsets depends on the control commands issued, but is also limited by the way in which the apparatus itself is implemented. For example, in drive schemes 8, 9, and 10 illustrated in FIG. 11, there are only two types of control states which may be applied to each of the subsets. Therefore, if movement inducing commands are issued to a given R-subset (such command denoted as "Vrs: phase 1"), then any moving element in the extreme position which belongs to a C-subset to which a movement inducing command is issued (denoted "Vcr: phase 1") would be released from that extreme position.

According to an embodiment of the invention, transferring (in stage 1540) the control commands generated in stage 1530 (including that of stage 1532) results in movement from the first extreme position of Nltr movable elements which are included in the first C-subset and of a positive number N(C2) of movable elements which are included in the second C-subset.

Furthermore, according to an embodiment of the invention, the generating of control commands in method 1500 (and especially in stage 1530) is executed according to rules which prevent a condition in which a positive number of moving elements which are included in any C-subset other than the first C-subset are released from the first extreme position if the number of elements released from the first C-subset is smaller than Nltr.

According to an embodiment of the invention, the generating of control commands in method 1500 (and especially in stage 1530) is executed according to rules which prevent a condition in which a positive number of moving elements which are included in any C-subset other than the first C-subset are released from the first extreme position if the number of elements released from the first C-subset is smaller than the difference between the total number of releasable moving elements in the first C-subset and the number of moving elements in the first C-subset already released in a current release cycle.

FIGS. 17 through 21 illustrate states of the apparatus of FIG. 16, after different sets of control commands have been issued. When discussing each of these figures, it is assumed that Nltr is equal to 3 (i.e. no historical movement management issues prevent release of any of the moving elements of subset C4 which are located in the first extreme position). For simplicity of explanation, it is also assumed that the release-order for the first C-subset (C4) is equal from R7 to R0.

Referring to the releasing from the first extreme position moving elements of one or more C-subset (e.g. as discussed with reference to FIGS. 17 through 21), it is noted that stage 1530 may also include stage 1533 of generating a control command to each out of a group of one or more R-subsets, so that transfer of the one or more control commands to the apparatus (in stage 1540) results in movement from the first extreme position of at least one moving element included in each of that group of R-subsets. The determining of the number of R-subsets to which a movement inducing command is issued affects the total number of moving elements that will be released from the first extreme position in the second sampling cycle, e.g. as discussed below with reference to FIGS. 17 through 21.

In FIG. 17, Ntbr is equal to 2. According to an embodiment of the invention, if Ntbr is smaller than or equal to Nltr, then control commands are generated so that transferring to the apparatus results in releasing from the first extreme position of Ntbr moving elements of the first C-subset, but not of any moving element of any other C-subset.

Figures 20, 21:
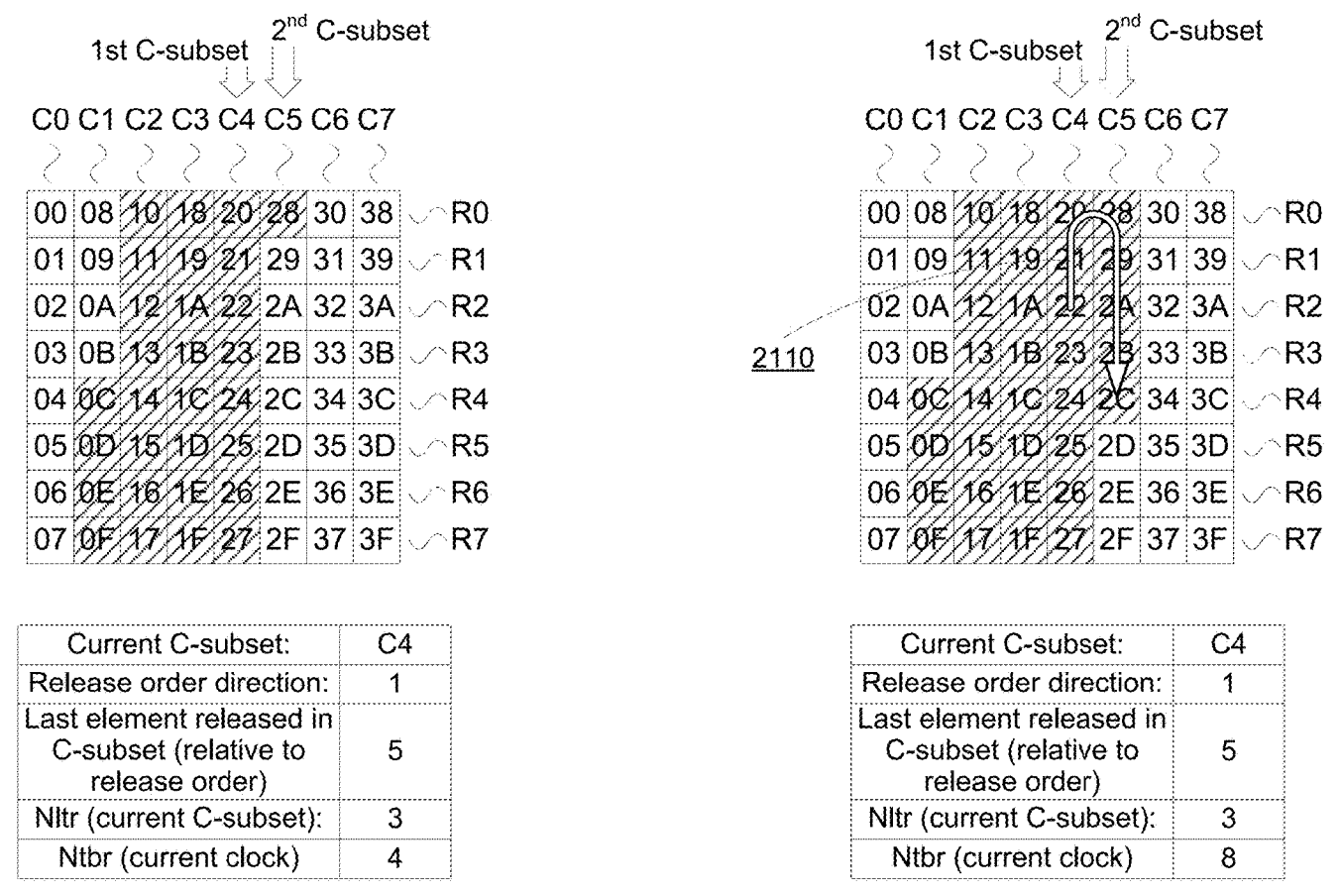

In FIGS. 18, 19, and 20, Ntbr is larger than Nltr, but not than 2*Nltr (in FIGS. 18 and 19 Ntbr is equal to 4, and to 5 in FIG. 20). The control commands issued in such a condition depend on the way in which the apparatus is implemented (e.g. on a drive scheme thereof).

FIG. 18 illustrates a state in which Ntbr is larger than the maximal number of moving elements in the first C-subset which may be released from the first extreme position at the second sampling cycle (i.e., Ntbr>Nltr). In the illustrated example, Ntbr=4.

As aforementioned, optionally the generating of control commands in method 1500 is executed according to rules which prevent a condition in which a positive number of moving elements which are included in any C-subset other than the first C-subset are released from the first extreme position if the number of elements released from the first C-subset is smaller than Nltr.

Therefore, in some possible implementations (e.g. implementing a more complex drive scheme with multiple different latching potentials), the generating of stage 1530 includes generating control command whose transferring to the apparatus (in stage 1540) results in releasing from the first extreme position Nltr moving elements of the first C-subset, and (Ntbr−Nltr), when Nltr<Ntbr.

According to an embodiment of the invention, the one or more release-order indications implemented in method 1500 includes a binary value, indicative of an order in which moving elements of a respective C-subset are released from the first extreme position.

The binary value may be considered as a variable indicating direction, over an order of release. Taking for example the previously mentioned possible release order [R3, R5, R7, R6, R4, R0, R2, R1]. In the example of FIG. 16, the binary value is denoted "Release order direction".

If the binary value is a first value out of the possible two (e.g., if it is equal to "0"), then the moving elements of a given C-subset would be released from the first extreme position according to that order (going "forward"). That is, in the provided example, the moving element which belongs to R-subset R5 would not be released from the first extreme position in an earlier sampling cycle than that in which the moving element which belongs to R-subset R3 is released from the first extreme position.

If the binary value is a second value out of the possible two (e.g., if it is equal to "1"), then the moving elements of a given C-subset would be released from the first extreme position according to the opposite order (going "backwards"). That is, in the provided example, the moving element which belongs to R-subset R3 would not be released from the first extreme position in an earlier sampling cycle than that in which the moving element which belongs to R-subset R5 is released from the first extreme position.

As mentioned before, the generating of the control commands, which cause movement of the moving elements from the first to the second extreme position (and possibly also in the other direction), depends on an order in which moving elements of the first C-subset are released from the first extreme position.

The order in which moving elements are released from the first extreme position with a C-subset may change from one sampling cycle to another. For example, changing assignments of R-subsets which are in a similar state by changing the assignment of their R-wires was discussed above. This way, for example, referring to the example of FIG. 16, it may be possible to switch the assignments of any two or more R-subsets of the group (R0, R1, R2), and of any two or more R-subsets of the group (R4, R5, R6, R7), depending on the history of movement (assuming as before that none of the moving elements of the array is in motion started in a previous sampling cycle).

However, different release orders may also be implemented in method 1500 within a single sampling cycle.

According to an embodiment of the invention, method 1500 includes stage 1561 of determining a second release-order indication, indicative of an order in which moving elements of the second C-subset are released from the first extreme position. Furthermore, optionally stage 1561 may be carried out concurrently to stage 1530, and affect the generating of the control command in stage 1530. Referring to the examples set forth with respect to the previous drawings, stage 1561 may be carried out by a processor such as processor 210. It should be noted that the second release-order may replace the first release-order in a memory module, and may also be stored elsewhere in such a memory module. It is noted that the second release-order indication may be used as a first release-order indication in a following sampling cycle, in which the second C-subset will serve as a first C-subset, in the context of the disclosed stages of method 1500.

According to an embodiment of the invention, stage 1561 includes determining the second release-order indication to be indicative of a different order than the order in which the moving elements of the first C-subset are released from the first extreme position.

Optionally, the determining of the second release-order indication may be executed according to rules which prevent determining the same release-order for all the C-subsets from which moving elements are released from the first extreme position in a single sampling cycle, in sampling cycles in which moving elements are released from more than one C-subset.

Optionally, the determining of the second release-order indication may be executed according to rules which prevent (in sampling cycles in which moving elements are released from more than one C-subset) determining the same release-order for any two C-subsets from which moving elements are released from the first extreme position in a single sampling cycle if those two C-subsets follow each other in a C-subset selection order which is used for the selection of at least one of those C-subsets for releasing of moving elements from the first extreme position.

Optionally, the determining of the second release-order indication may be executed according to rules which require the first and the second release-order indications to indicate orders which are opposite to one another. This may be implemented, for example, by switching the value of the aforementioned binary value (included in the respective release-order indications).

Referring to examples in which no scrambling of the assignment of control commands to R-subsets are implemented (e.g. referring to the state of the apparatus illustrated in FIG. 21), the switching of the binary value between two adjacent C-subsets (referring to a given C-subsets selection order) is equivalent to changing the release direction. This is illustrated by arrow 2110 in FIG. 21.

It is noted that determining for the second C-subset an opposite release-order with respect to that of the first C-subset (e.g. by changing only the binary value when determining the second release-order indication) enables implementing a simpler moving elements release scheme (which is achieved by method 1500) than would otherwise be possible. For example, it may enable using only the parameters denoted above (with respect to FIG. 16) as "current C-subset", "last element released in C-subset", and "release order indication", and not requiring a larger number of parameters for determining which moving elements were released from the first extreme position.

The two aforementioned possible requirements may be combined. Put in simple words, the following conditions may be applied in a single implementation of the apparatus:
reversing the order between two consecutive C-subsets; and
if an R-subset was selected for releasing of a moving element of the second C-subset, the moving element in that R-subset which belongs to the first C-subset will also be released, if located in the first extreme position.

FIG. 19 illustrates a state of the apparatus of FIG. 16, after issuing control commands (in stage 1530) whose transfer (in stage 1540) to the apparatus results in releasing from the first extreme position of N=2*Nltr moving elements, half of which belong to the first C-subset and half of which belong to the second C-subset. As aforementioned, in some implementations, the number of moving elements released in the second C-subset from the first extreme position cannot be smaller than the number of moving elements released from the first C-subset in this sampling cycle.

According to an embodiment of the invention, the number of movable elements released in the second sampling cycle from the first extreme position which are included in the second C-subset (denoted N(C2)) is equal or greater than Nltr.

This may be implemented by generating the control commands (in stage 1530) which include N(C2) movement-inducing control commands which are issued to N(C2) different R-subsets, thereby causing the number of movable elements moving from the first extreme position to be N(C2). According to an embodiment of the invention, the generating includes generating, if a first criterion which is based on relationships between Nltr and Ntbr is met, a control command for a second C-subset other than the first C-subset, wherein transferring of generated control commands results in movement from the first extreme position of Nltr movable elements which are included in the first C-subset and of a number N(C2) of movable elements which are comprised in the second C-subset. The first criterion may be that Ntbr is larger than 1.5*Nltr. (if Nltr<Ntbr<1.5*Nltr, the error may still be lower if it is prevented to release N moving elements so that Nltr<N<2*Nltr). In the illustrated example, Ntbr=5.

According to such an embodiment of the invention, stage 1561 may include determining a second release-order indication, indicative of an order in which moving elements of the second C-subset are released from the first extreme position, wherein the second release-order indication is indicative of a different order than the order in which the moving elements of the first C-subset are released from the first extreme position.

Optionally, the generating is executed according to rules which require that if a group of induced-subsets to which movement-inducing control commands are generated at any sampling cycle includes more than one C-subset, then it also includes a number of different R-subsets which is equal to or larger than a corresponding maximal number of moving elements which may be released from the first extreme position at the corresponding sampling cycle in a corresponding C-subset. The corresponding C-subset may be a C-subset which includes moving elements recently released from the first extreme position in a first sampling cycle. it may have the same relationship to the sampling cycle in the process as the first C-subset has to the second sampling cycle.

In FIG. 20, Ntbr is equal to 4. Since Nltr is equal to 3, Nltr<Ntbr<1.5*Nltr. Optionally, the generating is executed according to rules which prevent generating movement-inducing commands to any C-subset other than the first C-subset if Ntbr is larger than Nltr, if a second criterion which is based on relationships between Nltr and Ntbr is met. For example, the second criteria may be Ntbr<1.5*Nltr.

As aforementioned, in some drive schemes if movement inducing commands are issued to a given R-subset, any moving element in the extreme position which belongs to a C-subset to which a movement inducing command is issued would be released from that extreme position.

Therefore, in some implementations of the invention it may be prevented to release N moving elements so that Nltr<N<2*Nltr.

Especially, it may be prevented to release from the first extreme position in the second sampling cycle N(C2) moving element of the second C-subset so that 0<N(C2)<N(C1), where N(C1) is the number of moving elements released in the second sampling cycle from the first extreme position.

Furthermore, it may be prevented to release from the first extreme position in the second sampling cycle N(C2) moving element of the second C-subset so that 0<N(C2)<Nltr, if it is forbidden to release any element from any C-subset apart from the first C-subset, if the number of moving elements released from the C-subset is smaller than Nltr.

Referring to stage 1561, it is noted that stage 1561 may be a part of stage 1560 which includes determining an additional release-order indication indicative of an order in which moving elements of a C-subset other than the first C-subset are released from the first extreme position. While stage 1560 may include determining such release-order indication for the second C-subset from which moving elements are also released in the second sampling cycle, it may also include determining a release-order indication for a C-subset from which no moving elements are released in the second sampling cycle. This may be useful, for example, when releasing from the first C-subset a number which is equal to Nltr (which means that no additional moving elements may be released from that C-subset at the moment, and another C-subset has to be selected).

When determining a release-order for such another C-subset, the logical options which may possibly be implemented are: keeping the order identical to that of the first C-subset, determining a reverse order, or determining yet another release order. According to an embodiment of the invention, if the generating includes generating movement-inducing control commands to more than one C-subset then the order may be changed (optionally—only reversed), while if generating movement inducing command to only a single C-subset, then the release-order for another C-subset is kept identical to that of that single subset.

Stage 1560 may include determining the additional release-order indication which includes a binary value indicative of an order in which moving elements of a corresponding C-subset are released from the first extreme position, if the generating of the control commands (in stage 1530) includes generating control commands whose transfer to the apparatus results in movement from the first extreme position of Nltr moving elements which are included in the first C-subset. According to an embodiment of the invention, the determining of the additional release-order indication in such an event includes (optionally compulsory) setting the binary value to a corresponding binary value included in the first release-order indication.

Optionally, method 1500 is executed by implementing decision rules according to which if the generating of stage 1530 includes generating control commands whose transfer to the apparatus results in movement from the first extreme position of Nltr moving elements which are included in the first C-subset, it further determines an additional release-order indication which includes a corresponding binary value indicative of an order in which moving elements of a corresponding C-subset are released from the first extreme position, and to set the binary value to a corresponding binary value included in the first release-order indication.

It is noted that such a limitation may enable more efficient utilization of the apparatus if the latter implements a multiphase drive scheme.

In FIG. 21, Ntbr is equal to 8 (i.e. 2*Nltr<Ntbr). The generating in such cases may include generating the control commands so that transferring of the generated control commands to the apparatus results in releasing from the first extreme position in the second sampling cycle more moving elements of the second C-subset than of the first C-subset. The number of moving elements released from the first extreme position in the second C-subset may be between Nltr+1 and the total number of moving elements in the second C-subset, but may also be otherwise restricted (e.g. by release action executed in a previous sampling cycle).

Reverting to stage 1530, in different implementations of the invention the generating of stage 1530 may be responsive to historical information indicative of movement of elements from at least one of the extreme positions in one or more sampling cycles preceding the second sampling cycle. For example, when controlling a multiphase drive scheme apparatus in which moving elements released in one sampling cycle have to be latched in another (later) cycle, the generating of the control commands should be executed according to rules which secure the latching of such moving elements released in previous sampling cycles.

Significantly, in some implementations (e.g. in some drive schemes), such historical information which is taken into account in the generating of control commands for the releasing of moving elements from the first extreme position may also pertain to previous releases of moving elements from the second extreme position (which have to be latched in the first extreme position).

Referring to multi phase drive schemes, it is noted that optionally, movement from the first extreme position to the second extreme position (or in the other direction) of each moving element of the set is completed within k sampling cycles, where k is a positive integer. K may be equal to two (e.g. in the examples of drive schemes 6 through 10), and may also be larger than two.

Stage 1530 may in such a case include:
applying a first set of decision criteria for generating the control commands if no moving element of the set moved from the first extreme position in the preceding k−1 sampling cycle,
applying at least one other set of decision criteria otherwise.

FIGS. 22A through 22D and 23A through 23D illustrate various scenarios in which releasing of moving elements in a previous sampling cycle prevents a releasing of moving elements from the first and/or second C-subsets which would have been permitted if no such release would have been executed in the previous k−1 cycles.

In FIGS. 22A through 22D and 23A thorough 23D, the release-order from the first extreme position (in the first C-subset, subset C4) is indicated by arrow 4810, and the release-order from the second extreme position (in subset C1) is indicated by arrow 4820.

In FIGS. 22A through 22D, these directions are opposite to each other.

In FIGS. 23A through 23D, these directions are the same.

The elements encircled in dotted line 4830 are elements released from the respective extreme position in one of the k−1 previous cycles (from the first extreme position in subset C4, and from the second extreme position in subset C1).

The double headed arrows which pass through the R-subsets which include an element included in group 4830 represent that no moving elements of those R-subsets may be released from one of the extreme positions in the present sampling cycle.

The elements bolded out (e.g. element 22 in FIG. 22A, elements 20-22 and 28-2C in FIG. 22D) are all of the elements which may be permitted to be released in the present sampling cycle, according to a possible management scheme implemented (e.g. assuming one of the drive schemes of FIG. 11, and requiring reversing of the release-order between two C-subsets released in the same sampling cycle).

Various decision rules which restrict the combination of control commands which may be issued in response to actions taken in previous sampling cycles may be implemented. The number of such rules is infinite (assuming for example that the number of phases of the drive scheme may be any integer, and that the number of types of control commands—e.g. the number of possible electric potential—is theoretically unlimited). By way of example, one such restriction is exemplified below.

Optionally, the generating of stage 1530 may include generating control commands whose transfer to the apparatus results in movement from the first extreme position of moving elements which are included in the first C-subset in a number N(C1) which is smaller than a number of moving elements in the first C-subset which are positioned in the first extreme position if Ntbr is larger than N(C1), if a third criterion which is based on the historical information is fulfilled.

As mentioned above referring to method 1500, and to various implementations of the apparatus (e.g. the actuator array of FIGS. 2 and 3), the assignment of control commands to the subsets of actuator elements to which those commands are ultimately issued may be implemented as part of method 1500 (e.g. by processor 210), and/or by an external unit.

According to an embodiment of the invention, method 1500 further includes storing in a memory module permutational information indicative of an order in which moving elements of at least one of the plurality of C-subset are released from the first extreme position, wherein the transferring of stage 1540 includes transferring at least one of the generated control commands to at least one corresponding R-subset which is selected based on the permutational information. It is noted that in such an embodiment, the generating of the control command does not necessarily depend on such permutational information, and in some implementations is completely irrespective thereof. For example, the permutational information may be used by an external scrambler, connected between processor 210 and apparatus 101. Such a scrambler may change for example the assignment of R-signals to R-wires, A-signals to A-wires and/or B-signals to B-wires based on such permutational information.

According to an embodiment of the invention, method 1500 may include a stage of periodically generating (e.g. once in every sampling cycle, once every N sampling cycles, based on a state of the apparatus, etc.) swapping information indicative of at least one subgroup of swappable R-subsets such that for every individual C-subset of the plurality of C-subsets, all of the moving elements in each of that subgroup of R-subsets which are also included in the individual C-subset are in the same position, and (if in movement) moving in the same direction. Method 1500 also include, according to such an implementation, periodically amending the permutational information based on the swapping information.

Optionally, such amendments in the permutational information shape the frequency spectrum of a mismatch noise resulting from differences in the magnitude of the physical effect produced by each actuator element, such that the at least one attribute of the physical effect produced by the apparatus as a whole more closely corresponds to the at least one characteristic of the digital input signal.

Optionally, the shaping of the frequency spectrum of said mismatch noise includes reducing the magnitude of peaks in said frequency spectrum of said mismatch noise.

As was stated above, method 1500 may be implemented (mutatis mutandis) for the various variations of actuator arrays discussed in this document. For example, referring to method 1500 as a whole (and to the various discussed possible implementations thereof), method 1500 may be implemented so that each of the set of actuator elements is an electrostatic actuator elements including the moving element which is operative to move between the first extreme position and the second extreme position, which is farther from a first electrode of said actuator element than the first extreme position, responsive to potentials applied to the first electrode and to the moving element based on control commands issued by the processor for the R-subset and the C-subset in which said moving element is included.

Optionally, the apparatus includes a first plurality of [Nr] electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset; and a second plurality of [Nc] electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset.

Optionally, electric potentials applied to each of the R-wires and to each of the A-wires in response to the generated control commands result in movements of the moving elements which together produce an outcome physical effect, at least one attribute of which corresponds to at least one characteristic of a digital input signal.

According to an embodiment of the invention, intersections of any individual one of said first subsets of actuator elements and any individual one of said second subsets of actuator elements all include a uniform number of actuator elements. While this number may be one, this is not necessarily so.

As aforementioned, the stages discussed so far with respect to method 1500 may be repeated (in equal intermissions or otherwise). For example, according to an embodiment of the invention method 1500 may include executing in each of a series of sampling cycles:

obtaining a number (Ntbr(m)) of moving elements which, if released from the first extreme position during an m'th sampling cycle, enables production by the apparatus during the m'th sampling cycle of a physical effect, at least one attribute of which corresponds to at least one characteristic of a digital input signal; and generating control commands for at least one subset of the set of movable elements, in response to Ntbr(m), to a number of the moving elements of a p'th C-subset which were released from the first extreme position in respective preceding sampling cycle, and to a p'th release-order indication, indicative of an order in which moving elements of the p'th C-subset are released from the first extreme position at the m'th cycle.

Some or all of the other stages of method 1500 (e.g. 1540, 1550, 1560, 1570 and 1580, and any combination thereof) may also be executed in each of the series of sampling cycles.

While the discussion of method 1500 focused mainly on generating and transmitting control commands which result in releasing of moving elements from the first extreme position, it may also include transmitting control commands which result in releasing of moving elements from the second extreme position. These commands may be transferred over the same channels, or over at least partly different channels (e.g. B wires vs. A wires). While not necessarily so, the generating of control commands whose transferring to the apparatus results in releasing of moving elements from the second extreme position may be carried out in an identical manner to any of the proposed variations of method 1500.

It should be noted that in some implementations, interrelation between control commands which are issued for releasing moving elements from the first extreme position to those issued for releasing moving elements from the second extreme position should be considered.

Some such examples were discussed with respect to FIGS. 22A through 22D and 23A through 23D. However, such interrelations may also occur in other (e.g. single-phase) implementations.

For example, applying to a given R-subset a release electric potential (e.g. "Vrs" as denoted in FIG. 8) for releasing moving elements from the first extreme position in a certain C-subset may result in releasing of moving elements from the second extreme position in another C-subset, if a release electric potential (e.g. "Vcr" as denoted in FIG. 8) is applied to that other C-subset.

A simple way to overcome this is to prevent release from both extreme positions in a single sampling cycle. However, the invention is not restricted to such implementations, and managing concurrent release of moving elements of different C-subsets from different extreme positions is also included within the scope of the invention.

It is noted that method 1500 includes generating and transferring of control commands in a manner which does not necessitate knowledge of the actual moving elements which move as a result of issuing of the control command (e.g. if scrambling of the control commands before issuance to the respective electrodes is implemented). Nevertheless, method 1500 may still be considered as an element selection method; whether selection of actual elements (e.g. if no scrambling is implemented) or selection of element signifiers (whose relation to the actual elements of the apparatus is subject to a reassignment scheme).

The input of method 1500 is a digital input signal sampled in accordance with a sampling clock. The signal which is the input of method 1500 may for example be the output of a quantizer such as signal 640 in FIG. 14.

Assuming that the apparatus includes Nr R-subsets and Nc C-subsets, so that each R-subset contains Nc moving elements and each C-subset contains Nr moving elements, a possible output of method 1500 may be Nr+2×Nc single-bit array drive signals (each such signal being a control command): Nr R-signals, numbered r0 to r(Nr−1) indicating the voltage to be applied to each R-wire of the apparatus; Nc A-signals, numbered a0 to a(Nc−1) indicating the voltage to be applied to each A-wire; and Nc B-signals, numbered b0 to b(Nc−1) indicating the voltage to be applied to each A-wire. These may, for example be fed to a high-voltage driver as shown in FIG. 14. It is assumed that each of these signals controls the respective R-wire, A-wire and B-wire with the same number. When a signal is "on", the voltage applied to the respective wire is 0V; when it is "off", that voltage is −VD (for R-wires) or +VD (for A-wires and B-wires).

It is possible to generate the control commands so that the number of elements in the A-position at each actuation cycle in an apparatus controlled according to method 1500 closely approximates the method's input signal if the slew rate of the digital input signal is under a threshold which is defined per sample cycle.

Method 1500 may be implemented to execute only a small number of steps during each sampling cycle, and to employ only a small amount of memory. Its stored data includes the variables:

Current C-subset to for releasing moving elements from the first extreme position;

Release-order indication for releasing of moving elements from the first extreme position;

Indication of last element released in the current (or previous, if applicable) C-subset;

Ntbr; and

Optionally, some or all of those parameters defined for releasing of moving elements from the second extreme position.

While these parameters may suffice, method 1500 may also include utilizing previous values of its own outputs, i.e. previously issued control commands. Method 1500 does not necessitate keeping track of the position of each moving element individually, since this information is implied by the variables.

It is appreciated that method 1500 may be implemented in variants matching to a wide range of other drive schemes. The complexity of such variants depends on the number of types of control commands (e.g. different voltages), and of the number of phases (k) used in the drive scheme.

Variants designed for use with higher-speed drive schemes, e.g. a four-phase drive scheme such as for example the aforementioned four-phase drive scheme 18, typically execute more steps per actuation clock cycle than in the two-phase variations discussed in more detail. This is because under higher-speed drive schemes, the release of any moving elements during one cycle creates a requirement to latch the released moving elements in the opposite extreme position three cycles later, requiring specific voltages on certain R-wires, A-wires and B-wires and thereby reducing the degrees of freedom available to the processor.

FIGS. 24 through 26 illustrate a scrambling (also referred to as "reassignment") process, according to an embodiment of the invention.

FIG. 24 is a simplified representation of an actuator array in accordance with certain embodiments of the invention, including 64 actuator elements partitioned into eight R-subsets and eight C-subsets, analogously to the actuator arrays shown in FIGS. 2 and 4. R-wires are labeled R0 to R7, A-wires A0 to A7 and B-wires B0 to B7. Each square represents one actuator element. In FIG. 24, the actuator elements are numbered according to the formula:

$$\text{element number} = Nr \times C\text{-subset number} + R\text{-subset number}$$

and labeled in FIG. 24 in hexadecimal notation. Twenty-two moving elements, shaded in FIG. 24 and numbered 16 to 2B, are in the A-position and the remaining moving elements, not shaded in FIG. 24, are in the B-position.

It can be seen in FIG. 24 that the numbers of the set of moving elements in the A-position (referred to hereinafter as the "A-set") form a continuous sequence, running from 16 to 2B (in hexadecimal notation as per FIG. 24). Likewise, the numbers of the set of moving elements in the B-position (referred to hereinafter as the "B-set") also form a continuous sequence, running from 2C to 15, wrapping around from 3F (the highest-numbered moving element) back to 00.

In some variations of method 1500, both the A-set and the B-set always form such continuous sequences which may or may not wrap around from the highest-numbered moving element to the lowest-numbered one (referred to hereinafter as a "continuous wraparound sequence"), wherein the continuity of the sequence permits reversal of the marginal C-subsets in each of the A and B sets. In such implementations, method 1500 relies on this property to keep track of the positions of the moving elements without employing an Nr×Nc matrix data structure.

In the situation of FIG. 24, if the value of digital input signal increases, the next moving elements to be released from the B-position are 2C, 2D, 2E etc., in ascending order according to their numbering (and based on the release-order). Likewise, if the value of the input decreases, the next moving elements to be released from the A-position are 16, 17, 18 etc., in descending order according to their numbering (and based on the respective release order).

In certain applications, it may be undesirable for the element selection method to always release moving elements in the same order. One reason for this is mismatch noise resulting from mismatch errors, i.e. differences in the magnitude of the physical effect produced by each moving element, which may result, for example, from manufacturing tolerances, or from moving elements being mechanically damaged at some time after their manufacture. If moving elements are always released in the same order, the spectrum of such mismatch noise (depending on the input signal) may be such that mismatch noise energy is concentrated at certain frequencies not contained in the input signal.

This phenomenon is well known in sigma-delta digital-to-analog converters, and may cause audible sound reproduced by such digital-to-analog converters to contain audible tones not present in the input signal. Various methods are known in the art for shaping the frequency spectrum of mismatch noise to, for example, make mismatch noise less audible or even inaudible in audio applications. One such method, commonly referred to as "data-weighted averaging" (DWA), distributes mismatch noise energy approximately evenly across the frequency spectrum, i.e. "whitens" it.

Method 1500 may be implemented to counter this problem. For example, method 1500 may implement DWA by releasing 2×net_moves moving elements from the A-position and net_moves moving elements from the B-position in actuation clock cycles where net_moves is positive, and releasing 2×net_moves moving elements from the B-position and net_moves moving elements from the A-position in actuation clock cycles where net_moves is positive.

Methods for "whitening" the frequency spectrum of mismatch noise, which can be used directly with method 1500 are now described. Instead of simply implementing a control scheme in which each of the R-signals r0 to r(Nr−1), A-signals a0 to a(Nc−1) and B-signals b0 to b(Nc−1) controls the respective R-wire, A-wire or B-wire of the actuator array. These assignments may be altered such that, for example, R-signal r4 controls an R-wire other than R4, or A-signal a0 and B-signal b0 control an A-wire other than A0 and a B-wire other than B0 respectively. In this way, the order in which the transferred control commands causes release of moving elements is changed. By repeatedly (for example, once per sampling cycle) making such changes to the assignment of control commands to the respective subsets of actuator elements (e.g. to the assignment of array drive signals to R-wires, A-wires and B-wires), the order in which moving elements are released becomes pseudo-random, thus distributing mismatch noise energy more evenly across the frequency spectrum.

The following examples use the electrical controller actuator array to exemplify this. In the following examples, R'(i) denotes the R-wire currently controlled by R-signal r(i), A' (i) denotes the A-wire currently controlled by A-signal a(i), and B'(i) denotes the B-wire currently controlled by B-signal b(i). In the situation depicted in FIG. 24, R-signals r4 and r5 may be swapped, such that r4 controls R'5 (which in this case, is R5) and r5 controls R'4 (in this case, R4), without affecting the position of any moving element in the actuator array. After swapping r4 and r5, the next moving element to be released from the B-position is 2D, whereas before the swap, it was 2C. Likewise, r6 and r7 may be swapped such that r6 controls R'7 and r7 controls R'6, resulting in moving element 17, rather than 16, becoming the next moving element to be released from the A-position. Any two of R-signals r0 to r3 may also be swapped without affecting the position of any moving element in the actuator array.

Overall, in the situation depicted in FIG. 24 there are three sets of R-signals within which any member can be swapped with any other: $\{r0,r1,r2,r3\}$, $\{r4,r5\}$, and $\{r6,r7\}$. However, swapping any R-signal from one of these sets with any R-signal from another set may disrupt the operation of the presenting discussed element selection method, resulting in the apparatus no longer producing the desired physical effect. A-signals and B-signals may be swapped analogously. For example, in the situation depicted in FIG. 24, A-signals a6 and a1 may be swapped by changing output assignments such that a6 controls A1 (which in this case, is A1), and a1 controls A'6 (in this case, A6). Whenever two A-signals are swapped, the respective B-signals are also swapped, e.g. in the case described above, output assignments are changed such that b6 controls B'1 (in this case, B1), and b1 controls B'6 (in this case, B6). After this swap, the next element to be released from the B-position in a future actuation clock cycle, after C-subset 5 becomes full, is moving element 08 in C-subset 1, rather than moving element 30 in C-subset 6. A-signals are not swapped with B-signals, i.e. A-signals always control A-wires and B-signals always control B-wires. In the situation depicted in FIG. 24, there are two sets of A-signals whose members may be swapped with each other without disrupting the operation of the element selection method: $\{a0, a1, a6, a7\}$ and $\{a3, a4\}$; and likewise for B-signals. Neither of a2, a5, b2 or b5 can be swapped with any other C-subset without disrupting the operation of the element selection method.

For sets of more than two R-signals that may be swapped, such as the set $\{r0, r1, r2, r3\}$ in the example above, a controller according to certain embodiments of the present invention may select a pair of R-signals to be swapped, for example, using a pseudo-random number generator. Alternatively, the assignment of r0, r1, r2 and r3 to R'0, R'1, R'2, and R'3 may be scrambled by any other method such that each of r0, r1, r2 and r3 controls exactly one of the R-wires R'0, R'1, R'2, and R'3H. Likewise, in the example above, the controller may select any pair of A-signals within the set $\{a0, a1, a6, a7\}$ and the respective pair of B-signals for swapping, or it may change output assignments such that each of a0, a1, a6 a6 and a7 controls exactly one of the A-wires A'0, A'1, A'6 and A'7, and each respective B-output controls the respective B-wire.

According to an embodiment of the invention, any two R-signals r(i) and r(j) may be swapped if, for all m where $0 \leq m < Nc$, the moving element at the intersection of the R-subset of R-wire R'(i) and C-subset m is in the same position and moving in the same direction (if in movement) as the moving element at the intersection of the R-subset of R'(j) and C-subset m.

According to an embodiment of the invention, any two A-signals a(i) and a(j) and respective B-signals b(i) and b(j) may be swapped if, for all m where $0 \leq m < Nr$, the moving element at the intersection of R-subset m and the C-subset of A-wire A' (i) and B-wire B'(i) is in the same position and moving in the same direction (if in movement) as the moving element at the intersection of R-subset m and the C-subset of A'(j) and B'(j).

It is appreciated that situations may also occur where addressing errors are not due to limitations of a particular element selection method, but rather are inevitable regardless of the element selection method used. For example, in the actuator array of FIG. 24, if all moving elements are in the A-position, it is not possible to release exactly eleven moving elements during a single actuation clock cycle; generally, if the actuator array has Nr R-subsets and Nc C-subsets, it is not possible to release exactly P moving elements if P is a prime number larger than both Nr and Nc.

FIG. 25 shows the actuator array of FIG. 24, after the following array drive signals have been swapped e.g. as described with reference to FIG. 24:

R-signals r4 and r5
R-signals r6 and r7
A-signals a1 and a6
B-signals b1 and b6

Whereas in FIG. 24, R'(i) is R(i) for all i where 0≤i<Nr, and A'(j) is A(j) and B'(j) is B(j) for all j where 0≤j<Nc, this is no longer the case in FIG. 25. When array drive signals are swapped periodically, the assignment of array drive signals to R-wires, A-wires and B-wires may be implemented to be pseudo-random.

FIG. 26 shows the actuator array of FIG. 24, with many moving elements in a different position compared to FIG. 24. Unlike in FIG. 24, the number in each square of FIG. 26 is the virtual element number of each moving element, defined in terms of the array drive signals currently controlling it:

$$\text{virtual element number} = Nr \times A\text{-signal number} + R\text{-signal number}$$

Referring to system 200 and to method 1500, It will also be understood that the system according to the invention may be a suitably programmed computer. Likewise, the invention contemplates a computer program being readable by a computer for executing method 1500. The invention further contemplates a machine-readable memory tangibly embodying a program of instructions executable by the machine for executing the method of the invention.

Reverting to the discussion of system 200, it is noted that system 200 is a system which controls an apparatus that includes a set of actuator elements, each including a moving element which moves between first and second extreme positions. For example, such an apparatus may be an actuator array (or other apparatus) 100. Each actuator element of the set is included in: (a) exactly one first subset out of a plurality of non-empty first subsets (R-subsets) of the set of actuator elements; and (b) exactly one second subset out of a plurality of non-empty second subsets (C-subsets) of the set of actuator elements.

System 200 includes at least processor 210 and interface 290.

Processor 210 is configured to determine a maximal number (Nltr) of moving elements which may be released from the first extreme position at a second sampling cycle in a first C-subset which includes moving elements released from the first extreme position in a first sampling cycle, based at least on a number of the moving elements of the first C-subset which were released from the first extreme position in the first sampling cycle. Referring to the discussion of method 1500, it is noted that processor 210 may be configured to determine Nltr by executing stage 1510. Optionally, processor 210 may be configured to determining Nltr further based on a release-order indication, indicative of an order in which moving elements of the first C-subset are released from the first extreme position (referred to as "first release-order indication").

Processor 210 is further configured to obtain a number (Ntbr) of moving elements which, if released from the first extreme position during the second sampling cycle, enables production by the apparatus during the second sampling cycle of a physical effect, at least one attribute of which corresponds to at least one characteristic of a digital input signal. Processor 210 may compute Ntbr itself, or receive it from an external entity. Referring to the discussion of method 1500, it is noted that processor 210 may be configured to obtain Ntbr by executing stage 1520.

Processor 210 is also configured to generate in response to Nltr and Ntbr one or more control commands for a group of subsets out of the first and the second pluralities of subsets, the group of subsets including the first C-subset (and possibly also at least one of the plurality of R-subsets). Referring to the discussion of method 1500, it is noted that processor 210 may be configured to generate the one or more control commands by executing stage 1530. Optionally, controller 210 is configured to generate the control commands based on a release-order indication, indicative of an order in which moving elements of the first C-subset are released from the first extreme position (i.e. the aforementioned "first release-order indication").

Interface 290 is used for transferring the control commands to the apparatus, thereby resulting in movement of at least one moving element which is included in the first C-subset from the first extreme position. For example, interface 200 may include wires 400, 410, and/or 420, high-voltage driver 560, etc. Referring to the discussion of method 1500, it is noted that interface 290 may execute stage 1540.

According to an embodiment of the invention, the first sampling cycle is the last sampling cycle before the second sampling cycle in which any moving element of the apparatus was released from the first extreme position.

According to an embodiment of the invention, the physical effect is sound. Discussion on possible relations between the attributes of the sound to the characteristics of the digital input signal is offered above.

As aforementioned, system 200 may also include the apparatus itself.

According to an embodiment of the invention, each of the set of actuator elements is an electrostatic actuator element including a moving element which is operative to move between the first extreme position and the second extreme position, which is farther from a first electrode of said actuator element than the first extreme position, responsive to potentials applied to the first electrode and to the moving element based on control commands issued by the processor for the R-subset and the C-subset in which said moving element is included.

According to an embodiment of the invention, the apparatus includes a first plurality of electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset; and a second plurality of electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset; and electric potentials applied to each of the R-wires and to each of the A-wires in response to control commands issued by the processor result in movements of the moving elements which together produce an outcome physical effect, at least one attribute of which corresponds to at least one characteristic of a digital input signal.

According to an embodiment of the invention, if a first criterion which is based on relationships between Nltr and Ntbr is met, the subgroup of subsets to which the processor generates control commands includes a second C-subset other than the first C-subset, wherein the interface is configured to transfer the control commands to the apparatus, thereby resulting in movement from the first extreme position of Nltr movable elements which are included in the first C-subset and of a number N(C2) of movable elements which are included in the second C-subset. According to such an embodiment of the invention, the processor may further be configured to determine a second release-order indication, indicative of an order in which moving elements of the second C-subset are released from the first extreme position, wherein the second release-order indication is indicative of a different order than the order in which the moving elements of the first C-subset are released from the first extreme position.

Referring to the above, it is noted that optionally, each of the first and the second release-order indications includes a binary value indicative of an order in which moving elements of a respective C-subset are released from the first extreme position.

Furthermore, system may further include a memory module 250 that is configured to store permutational information indicative of an order in which moving elements of at least one of the plurality of C-subset are released from the first extreme position, wherein a control command issued by the processor for one of the at least one R-subsets is transferred to a corresponding R-subset which is selected based on the permutational information.

System 200 may also include an order manager 260 (which may be a part of processor 210, but not necessarily so). Order manager 260 is configured to periodically generate swapping information indicative of at least one subgroup of swappable R-subsets such that for every individual C-subset of the plurality of C-subsets, all of the moving elements in each of that subgroup of R-subsets which are also included in the individual C-subset are in the same position, and if in movement moving in the same direction, and to periodically amend the permutational information based on the swapping information.

Optionally, these amendments in the permutational information shape the frequency spectrum of a mismatch noise resulting from differences in the magnitude of the physical effect produced by each actuator element, such that the at least one attribute of the physical effect produced by the apparatus as a whole more closely corresponds to the at least one characteristic of the digital input signal. It is noted that the shaping of the frequency spectrum of said mismatch noise includes reducing the magnitude of peaks in said frequency spectrum of said mismatch noise.

As mentioned with respect to method 1500, different decision rules may be implemented to govern the process of determining which control commands to generate. In order to avoid needlessly cumbersome discussion, and given the lengthier discussion of method 1500, only a few will be offered herein explicitly.

For example, in some implementations, in at least some cases in which N(C2) is equal or greater than Nltr, processor 210 is configured to generate the control commands including N(C2) movement-inducing control commands which are issued to N(C2) different R-subsets, thereby causing the number of movable elements moving from the first extreme position to be N(C2). The processor may be further configured so that when issuing movement-inducing control commands at any sampling cycle to more than one C-subset, to issue movement-inducing control commands to a number of different R-subsets which is equal to or larger than a corresponding maximal number of moving elements which may be released from the first extreme position at the corresponding sampling cycle in a corresponding C-subset.

Another example is that processor 210 may be configured to refrain from generating movement-inducing commands to any C-subset other than the first C-subset if Ntbr is larger than Nltr, if a second criterion which is based on relationships between Nltr and Ntbr is met.

Processor 210 may also be configured so that, if generating control commands whose transfer to the apparatus results in movement from the first extreme position of Nltr moving elements which are included in the first C-subset, it further determines an additional release-order indication which includes a corresponding binary value indicative of an order in which moving elements of a corresponding C-subset are released from the first extreme position, and to set the binary value to a corresponding binary value included in the first release-order indication.

As mentioned with respect to method 1500, the generation of the control commands may depend on historical information pertaining to previous changes in the state of the moving elements of the apparatus. Processor 210 may be configured to generate the control commands in response to historical information indicative of movement of elements from at least one of the extreme positions in one or more sampling cycles preceding the second sampling cycle.

As aforementioned, movement from the first extreme position to the second extreme position of each moving element of the set is completed in some embodiments of the invention within k sampling cycles, where k is a positive integer. Processor 210 may be configured to apply a first set of decision criteria for generating the control commands if no moving element of the set moved from the first extreme position in the preceding k−1 sampling cycle, and to otherwise apply at least one other set of decision criteria.

Processor 210 may be configured to generate control commands whose transfer to the apparatus results in movement from the first extreme position of moving elements in which are included in the first C-subset in a number Nc1 which is smaller than a number of moving elements in the first C-subset which are positioned in the first extreme position if Ntbr is larger than Nc1, if a third criterion which is based on the historical information is fulfilled.

Processor 210 may be configured to execute, in each of a series of sampling cycles:
  obtain a number (Ntbr(m)) of moving elements which, if released from the first extreme position during an m'th sampling cycle, enables production by the apparatus during the m'th sampling cycle of a physical effect, at least one attribute of which corresponds to at least one characteristic of a digital input signal; and
  generate control commands for at least one subset of the set of movable elements, in response to Ntbr(m), to a number of the moving elements of a p'th C-subset which were released from the first extreme position in a respective preceding sampling cycle, and to a p'th release-order indication, indicative of an order in which moving elements of the p'th C-subset are released from the first extreme position at the m'th cycle.

In some embodiments it is further configured to repeat every sampling cycle additional acts discussed above such as determining Nltr for that sampling cycle.

As mentioned above, optionally, intersections of any individual one of said first subsets of actuator elements and any individual one of said second subsets of actuator elements all include a uniform number of actuator elements.

Regardless of the type of such received information which is utilized by the controller, it is noted that processor 210 may receive it from an external unit, and may also generate it itself.

For example, system 200 may include a memory module (not illustrated, e.g. a non-volatile memory module) which is configured to store digital data. Processor 210 in such an implementation may be configured to read data from the non-volatile memory module and to process the read data for determining such information which indicates a state of moving elements (or of a change in such state) which, if put into effect during the intended cycle would enable production by the group of actuator arrays of a physical effect, at least one attribute of which corresponds to at least one characteristic of a digital input signal. For example, processor 210 may be configured to read from non-volatile memory module a digital sound file (or another digital data), and to process it in order to determine a number of moving elements which, if released from the first extreme position during the intended cycle, enables production by the group of actuator arrays of a physical effect, at least one attribute of which corresponds to at least one characteristic of a digital input signal. Processor 210 may receive (and later process) such source data not only from a non-volatile memory, but also from other types of sources—e.g. a volatile memory, a real-time source such as a microphone or a real-time sound synthesizer.

Regarding to FIGS. 27, 28, and 29, it is noted that the various functionalities discussed in relation to any of them may be incorporated (mutatis mutandis) with respect to system 200. Especially (while not necessarily so)—functionalities discussed with respect to controller 50 and to element selector 550 may be incorporated into processor 210, even if not explicitly elaborated.

FIG. 27 is a simplified block diagram of an apparatus according to certain embodiments of the invention, including a controller 50 and actuator array 100. The controller 50 contains an element selector 550 and a high-voltage driver 560, whose function is described above with reference to FIG. 14. In the absence of addressing errors, the number of moving elements within actuator array 100 that are in the A-position equals the number represented by the input signal 601 of element selector 550. Element selector 550 is placed inside a noise shaping loop 60 which also includes a loop filter 553, two adders 541 and 552, and an inverter (i.e. a digital multiplication by −1) 551. The element selector 550 generates an additional signal 651 representing the number of moving elements which actually are in the A-position (as opposed to signal 601 which represents the number of moving elements that should be in the A-position to produce the desired physical effect). The adder 552 and inverter 551 subtract this signal from the input signal 601 of element selector 550, generating an error signal 653 which represents the addressing error introduced by element selector 550. The loop filter 553 filters the error signal 652 and the resulting filtered error signal 653 is added to the loop input signal 600 to generate the input signal 601 for the element selector 550.

Assuming that the addressing error is not correlated with the input signal 600, the signal transfer function (STF) of the loop is one, while its noise transfer function (NTF) is given by:

$$NTF = 1 - H_e[z]$$

where $H_e[z]$ is the impulse response of loop filter 61 in the z-domain. By designing a loop filter with a suitable $H_e[z]$, a NTF can be obtained which has a high gain in a frequency band of interest ("in-band gain") and a low gain outside this frequency band ("out-of-band gain"). As a result, the frequency spectrum of addressing noise (resulting from addressing errors) is shaped such that the physical effect produced by actuator array 100 contains less addressing noise in the frequency band of interest resulting than it would without the noise shaping loop 60.

Similar noise shaping loops are known in the art for shaping the frequency spectrum of quantization noise, e.g. in digital-to-analog converters (DACs) and analog-to-digital converters (ADCs), and are commonly referred to as "sigma-delta modulators" and "delta-sigma modulators". Methods for designing loop filters for conventional sigma-delta modulators are known in the art.

Design goals for loop filters, both in conventional sigma-delta modulators and in addressing-noise shaping loops according to certain embodiments of the present invention, typically include obtaining a desired NTF, and ensuring that the noise-shaping loop is either unconditionally stable (i.e. not producing oscillations not present in the input signal, which is generally undesirable), or stable under specific conditions. Conventional methods for predicting the NTF as a function of the loop filter's impulse response, or for finding a loop filter response to approximate a desired NTF, may also be used for addressing-noise shaping loops according to certain embodiments of the present invention.

However, conventional methods for predicting whether a conventional sigma-delta modulator is stable, or for choosing the loop filter's impulse response to ensure stability, are not necessarily suitable for addressing-noise shaping loops according to certain embodiments of the present invention. The stability of addressing-noise shaping loops according to certain embodiments of the present invention depends on the element selection method used. For example, the element selection method described previously enters a repetitive two-cycle pattern if the input signal has a high slew rate, producing oscillations at half the actuation clock frequency. Adding an addressing-noise shaping loop may cause such oscillations to persist longer than in a similar apparatus without a noise-shaping loop. As a result, addressing-noise shaping loops wherein the element selector uses such an element selection method may become unstable relatively easily. With other element selection methods, such as the variations on the element selection method described with reference to FIG. 24, the loop may remain stable for a wider range of input signals.

Furthermore, the stability of addressing-noise shaping loops according to the present invention may also depend on the degree of correlation between the addressing error and the input signal. As noted above, addressing-noise shaping loops according to certain embodiments of the present invention assume there is no such correlation. Likewise, conventional sigma-delta modulators rely on an assumption that quantization error is not correlated with the input signal. In fact, both types of errors typically exhibit a degree of correlation with the input signal. Both conventional sigma-delta modulators and addressing-noise shaping loops according to certain embodiments of the present invention assume the respective correlation to be low enough to be negligible. However, depending on the element selection method used, the degree of correlation between addressing error and input signal in an addressing-noise shaping loop according to certain embodiments of the present invention may be higher than the correlation between quantization noise and input signal in a conventional sigma-delta modulator.

Generally, the stability of addressing-noise shaping loops according to certain embodiments of the present invention depends on both the loop filter's impulse response and the element selection method used. For specific input signals, loop stability may be verified by simulating the entire noise-shaping loop, e.g. in a software package such as MATLAB. For a given element selection method, the loop is more likely to be stable if the loop filter 553 has a short, smooth impulse response. For example, if the loop filter 553 is a finite impulse response (FIR) filter with a transfer function given in the z-domain as $b0+b1\ z^{-1}+b2z^{-2}+b3z^{-3}+\ldots+b(n)z^{-n}$, the loop is more likely to be stable if n is low and $|b(i)-b(i+1)|$ is low for $0 \le i < n$. As an example, an addressing-noise shaping loop according to certain embodiments of the present invention may be stable for a specific input signal when using a loop filter with the impulse response $0.5z^{-1}+0.5z^{-2}$, and unstable for the same input signal when using a loop filter with the impulse response $z^{-1}+0z^{-2}$.

Various different topologies of noise shaping loops are known in the art. While the example of FIG. 27 shows a topology known as "error feedback", this is an example only and any other loop topology may be used. Noise shaping loop topologies known in the art include, without limitation: "single feedback", topologies using feed-forward instead of or in addition to feedback, cascaded and multi-stage topologies.

FIG. 27 assumes that the noise shaping loop 60 includes a delay of at least one actuation clock cycle. For example, if the error signal 653 does not already include a delay, and loop filter 553 is a finite impulse response (FIR) filter with a transfer function given in the z-domain as $b0+b1\ z^{-1}+b2\ z^{-2}+b3\ z^{-3}+\ldots+b(n)z^{-n}$, then b0 is typically zero. Alternatively, the delay may be a natural by-product of, or a deliberate addition to, some or all of element selector 550, inverter 551, and/or adder 552.

The loop filter and hence NTF may be of any order and may have any characteristic, such as lowpass, bandpass or highpass.

The signal transfer function (STF) may be one. Alternatively, depending on the application, a STF with non-flat frequency response may be desirable, and/or its effect may be cancelled by other system components with a non-flat frequency response. Noise shaping loop architectures with non-flat STFs are well known in the alt In all text referring to FIG. 27 onward, the word "A-position" may be replaced with "B-position" without fundamentally altering operation of the apparatus.

A controller according to certain embodiments of the present invention may include a noise-shaping loop as shown in FIG. 27 and subsequent Figures e.g. in conjunction with one or more of the low-pass filter, sample-rate converter, scaler and quantizer described with reference to FIG. 14.

FIG. 28 is a simplified block diagram of another embodiment of the invention, analogous to that of FIG. 27, but with noise shaping applied to quantization noise as well as addressing noise. The use of a quantizer within the present invention has been described previously with reference to FIG. 14. Quantization noise, or quantization error, refers to the difference between the quantizer's input and its output. In FIG. 28, error signal 658 represents the sum of quantization error and addressing error (whereas error signal 653 in FIG. 27 represents addressing error only), and therefore the noise transfer function (NTF) of noise shaping loop 60 is applied to quantization noise and addressing noise (as opposed to addressing noise only as in FIG. 27). As a result, input signal 70 can be reproduced more accurately and/or with a lower number of actuator elements than would be possible without quantization noise shaping.

FIG. 29 is a simplified block diagram of a further embodiment of the invention. As in FIGS. 27 and 28, the apparatus includes a controller 50 and actuator array 100, with the controller 50 featuring a noise shaping loop 60. Noise shaping is applied to quantization noise and addressing noise. However, in contrast to FIG. 28 where a single loop filter is used for both types of noise, in FIG. 29 the two types of noise are processed separately. The adder 542 and inverter 541 together subtract the quantized signal 640 from the quantizer's input signal 603, thereby producing signal 642 which represents quantization error. This is filtered by a first loop filter 543 to produce filtered quantization noise signal 643, which is added to input signal 600 by adder 535. Likewise, adder 552 and inverter 551 together subtract the actual number of moving elements in the A-position, represented by signal 651, from the desired number of moving elements in the A-position represented by the quantized signal 640, producing signal 652 which represents addressing error. This is filtered by a second loop filter 553 to produce a filtered addressing noise signal 653, which is added to the input signal 600 along with the filtered quantization noise signal 643.

The characteristics of addressing noise may differ from those of quantization noise in any or all of the following ways:

Addressing noise may have higher peak amplitudes than quantization noise, which is limited to a narrow range of values (e.g. +0.5 least significant bits if the quantizer does not use dithering, although the range may be wider with dither).

The spectra of the types of noise may differ. For example, quantization noise may be shaped in the quantizer, by using dither with a triangular probability function, as described with reference to FIG. 14. This results in quantization noise energy already being concentrated primarily at high frequencies in the signal prior to entering the noise-shaping loop. This technique well known in the art, e.g. in the field of delta-sigma data converters. Applying the same technique to addressing noise may make the addressing-noise shaping loop unstable as described with reference to FIG. 27, and may therefore be undesirable.

As described with reference to FIG. 27, addressing noise may exhibit a higher degree of correlation with the input signal 70 than quantization noise does, thus a loop filter with a short, smooth impulse response may be provided to maintain loop stability, as opposed to quantization noise where a longer, less smooth impulse response may be provided.

The use of two separate loop filters 543 and 553, for quantization noise and addressing noise respectively, makes it possible to combine aggressive quantization noise shaping, e.g. using a finite impulse response (FIR) filter with a relatively long impulse response for loop filter 543, with more conservative shaping of addressing noise, e.g. using a FIR with a shorter impulse response for loop filter 553. More generally, different NTFs can be implemented for each type of noise to suit the needs of the application.

The individual addressing methods and apparatus shown and described herein are particularly useful for arrays of double-sided electrostatic actuators. The noise reduction methods and apparatus shown and described herein are useful in a wide variety of arrays such as but not limited to the arrays shown and described herein. As aforementioned, processor 210 is configured to generate one or more control commands for the group of subsets out of the first and the second pluralities of subsets, in response to: Nltr, Ntbr, and the first release-order indication. Processor 210 may be configured to generate such control commands under the assumption that all actuator elements are fully functional.

Processor 210 may optionally include a defective actuator element counting module (not illustrated) which is configured to process the control command and to determine how many of the actuator elements which should be released in the next clock cycle based on these control commands are defective (thereby computing a "defective actuator elements error"). For example, the defective actuator element counting module may be configured to determine the defective actuator elements error based on information retrieved from a memory storage including information of defective actuator elements. Especially, this memory storage may be a relatively simple real-time memory storage. For example, this aforementioned memory storage based on which the defective actuator elements error may be determined may be implemented as an array of memory elements where each 1-bit memory element indicates whether or not one of the actuator elements is defective or not. The memory array may be OTP (one-time programmable) and programmed a single time after the actuator array has been tested on a production line, or it may be rewritable memory which is updated several times during the lifetime of the apparatus."

The defective actuator elements error may then be fed to a noise shaping loop (which may be implemented with another noise shaping loop such as loop 60, or as an independent noise shaping loop).

For example, any one of the two following options may be used:
1. Add the defective actuator elements error to the addressing error (signal 652) before it goes into loop filter A (item 553)
2. Add a third loop filter like 543 and 553, feed the defective actuator elements error into that new loop filter. Item 535 becomes a 4-input adder and the output from the new loop filter goes into its $4^{th}$ input.

This way, the difference between the number of moving elements which should have been released in this clock cycle to the actual number of moving elements moved may be compensated in a later clock cycle (e.g. together with the addressing error noise shaping loop).

Such an architecture provides a way of reducing the effect of malfunctioning actuator elements have on the produced physical effect (e.g. sound) using three relatively simple components—the original element selection module, the defective actuator element counting module and the noise shaping loop. Since the information from the defective actuator element counting module only serves at a later clock cycle, there is also more time for computations. When implemented in hardware, circuit complexity (as measured using "gate count") may be lower using the architecture described here, than when using a "smarter" element section module which takes defective pixels into account from the beginning.

Generally, the apparatus may suffer from defective-elements noise (which results from malfunctioning actuator elements) during one or more actuation clock cycles. This defective elements noise have a frequency spectrum. Processor 210 may include: (a) the aforementioned defective actuator element counting module which is configured to process the one or more control commands and to determine a defective actuator elements error based on the control commands, and (b) a noise shaping loop operative to shape the frequency spectrum of the defective elements noise based on the defective actuator elements error such that defective elements noise energy is reduced within a frequency band of interest and increased outside said band of interest. Referring to the examples set forth with respect to the previous drawings, the noise shaping loop may be the addressing noise shaping loop illustrated in FIGS. 27 and 29, but this is not necessarily so. in such an implementation, the defective actuator elements error may be fed to adder 552, either via an inverter or directly, or via another processing circuit.

Like other noise-shaping loop, the operation of the defective actuator element counting module and the respective noise shaping loop may be integrated into method 1500, mutatis mutandis.

Actuator elements may have different types of defects, such as, for example, the following types:
The moving element (e.g. membrane) is immobile, and it will not move under any of the operational voltages (used in the system, being applied to the electrodes and the moving element). For this type of defect, the technique described above is sufficient.
The moving element can be latched to one of the extreme positions (e.g. to the bottom electrode) but not to the other (e.g. top electrode). Reasons for this may be, for example, dust particles between (in this example) top electrode and moving element, preventing the moving element getting sufficiently close to the top electrode to be latched, or defects in the electrical insulation between (in this example) top electrode and moving, resulting in short circuits if the moving element comes close to the electrode. Optionally, the controlling process by which moving element are controllably moved may be implemented in order to actively prevent the moving element from moving. In the given example, the moving element may be controllably latched to the bottom during initialization procedure. After that, every time that the aforementioned element selection module (which does not take into account the fact that some actuator elements may have such defects) tries to release that particular moving element from the bottom, another module of the processor 210 which is coupled to the aforementioned defective actuator element counting module will cancel these instructions—i.e. it will change the array drive signals 650 such that no release occurs in that particular actuator element. Referring for example to the example of FIG. 29, this other module may be operationally located between element selector 550 and high-voltage driver 650.

It is noted that such override of the selection of the element selection module in order to prevent some defective elements from moving may be implemented also if another algorithm is used for the generation of the control commands.

For example, a system which controls such an apparatus (which includes a set of actuator elements, each including a moving element which moves between first and second extreme positions, such as apparatus 100) may include a processor which includes:

an element selection module, configured to: (a) obtain information pertaining to a number (or numbers) of moving elements which, if released from one or both of the extreme positions during a specified future sampling cycle (e.g. the next cycle), enables production by the apparatus during that specified future sampling cycle of a physical effect, at least one attribute of which corresponds to at least one characteristic of a digital input signal; and (b) to generate one or more control commands for groups of one or more actuator elements based on the obtained information; and an override module which is configured to obtain information pertaining to the functionality level of actuator elements of the apparatus (e.g. a list of defective actuator elements), and to selectively modify at least one of the control commands, thereby preventing a releasing of a latched defective moving element.

Referring to the examples on the figures discussed above, the override module may, for example, change the array drive signals 650. Such a system may also include an interface (such as interface 290, for example) for transferring the control commands—after the modification of which by the override module (in the case such modifications were made) to the apparatus, thereby resulting in movement of at least one moving element from a position in which it was latched. It is noted that all of the variations discussed with respect to the operation of system 200 (especially ones not relating directly to the algorithm by which the control commands are selected to move specific moving elements) may also be implemented in the presently described system, even if not explicitly elaborated.

If such an override module is implemented, it may transfer information to (a) an defective actuator element counting module (such as the one which is discussed above) which is configured to process the one or more control commands and to determine a defective actuator elements error based on the control commands, and/or to a (b) a noise shaping loop operative to shape the frequency spectrum of the defective elements noise based on the defective actuator elements error such that defective elements noise energy is reduced within a frequency band of interest and increased outside said band of interest.

It is noted that such an override module may be implemented in hardware, firmware, software, or any combination of the above. Likewise, the functionalities of the override module, of the defective actuator element counting module and/or that of the respective noise shaping loop may all be implemented in the aforementioned system, method, and computer readable code. Also, the functionalities of the override module, of the defective actuator element counting module and/or that of the respective noise shaping loop may all be implemented in similar systems, methods, and computer readable codes in which the element selection algorithm used for the generation of the control commands is different than the one discussed in the present disclosure.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order.

Any or all of computerized sensors, output devices or displays, processors, data storage and networks may be used as appropriate to implement any of the methods and apparatus shown and described herein.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product including a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A system comprising:
    an apparatus which comprises a set of actuator elements, each comprising a moving element which moves between first and second extreme positions, wherein each actuator element of the set is comprised in: (a) exactly one first subset out of a plurality of non-empty first subsets (R-subsets) of the set of actuator elements; and (b) exactly one second subset out of a plurality of non-empty second subsets (C-subsets) of the set of actuator elements;
    wherein each of the actuator elements of said set of actuator elements is an electrostatic actuator element comprising the moving element which is operative to move between the first extreme position and the second extreme position which is farther from a first electrode of said actuator element than the first extreme position, wherein the actuator element is responsive to potentials applied to the first electrode and to the moving element based on control commands issued by the processor for the R-subset and the C-subset in which said moving element is comprised, wherein said potentials comprise at least one of a hold voltage $V_H$, a latching voltage $V_L$, and a release voltage $V_R$,
    a processor, configured to:
        determine a maximal number (Nltr) of moving elements which may be released from the first extreme position at a second sampling cycle in a first C-subset which comprises moving elements released from the first extreme position in a first sampling cycle, based on: a number of the moving elements of the first C-subset which were released from the first extreme position in the first sampling cycle;
        obtain a number (Ntbr) of moving elements which, if released from the first extreme position during the second sampling cycle, enables production by the apparatus during the second sampling cycle of a sound, at least one attribute of which corresponds to at least one characteristic of a digital input signal; and
        generate one or more control commands for a group of subsets out of the first and the second pluralities of subsets, in response to: (a) Nltr, (b) Ntbr, and (c) a first release-order indication, indicative of an order in which moving elements of the first C-subset are released from the first extreme position; wherein the group of subsets comprising the first C-subset, wherein if Ntbr is smaller than Nltr, control commands are generated for releasing from the first extreme position Ntbr moving elements of the first C-subset but not of any moving element of any other C-subset; and
    an interface for transferring the control commands to the apparatus, thereby resulting in movement of at least one moving element which is comprised in the first C-subset from the first extreme position, wherein said control commands cause application of at least one of said hold voltage $V_H$, said latching voltage $V_L$, and said release voltage $V_R$.

2. The system according to claim 1, wherein each of the actuator elements comprises a second electrode, wherein the apparatus comprises:
    a first plurality of electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset;
    a second plurality of electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset, and a third plurality of electrical connections (B-wires) interconnecting the second electrodes of actuator elements in each C-subset, such that the second electrode of any actuator element in each individual C-subset is electrically connected to the second electrode of all other actuator elements in the individual C-subset, and electrically isolated from all actuator elements not in the individual C-subset, wherein electric potentials applied to at least one of the R-wires, A-wires and B-wires in response to control commands issued by the processor result in movements of the moving elements which together produce an outcome sound, at least one attribute of which corresponds to at least one characteristic of a digital input signal.

3. The system according to claim 2, configured to apply:
a first voltage $V_{RS}$ to a R-wire connected to a selected moving element,
a second voltage $V_{RU}$ to all other R-wires,
a third voltage $V_{CR}$ to a A-wire or a B-wire connected to an electrode from which the selected moving element is to be released,
a fourth voltage $V_{CL}$ to a A-wire or a B-wire connected to an electrode to which the selected moving element is to be latched, and
a fifth voltage $V_{CU}$ to all other A-wires and all other B-wires.

4. The system of claim 3, wherein $|V_{RS}-V_{CR}| \leq V_R$.

5. The system of claim 3, wherein $|V_{RS}-V_{CR}|=0$.

6. The system of claim 3, wherein $|V_{RS}-V_{CL}| \geq V_L$.

7. The system of claim 3, wherein $|V_{RS}-V_{CU}| \geq V_H$.

8. The system of claim 3, wherein $|V_{RU}-V_{CR}| \geq V_H$.

9. The system of claim 3, wherein $|V_{RU}-V_{CL}| \geq V_H$.

10. The system of claim 3, wherein $|V_{RU}-V_{CU}| \geq V_H$.

11. The system of claim 3, wherein $V_{RS}=V_{CR} \geq V_H$, $V_{RU}=0$, $V_{CL} \geq V_L+V_{RS}$ and $V_{CU} \geq 2 \times V_{RS}$.

12. The system of claim 3, wherein $V_{RS}=V_{CR} \geq V_H$, $V_{RU}=0$, $V_{CL}=V_{CU} \geq V_L+V_{RS}$.

13. The system of claim 3, wherein $V_{RS}=V_{CR}=0$, $V_{RU} \leq -V_H$, $V_{CL}=V_{CU} \geq V_L$.

14. The system of claim 3, wherein $V_{RS}=V_{CR} \leq -V_H$, $V_{RU}=0$, $V_{CL}=V_{CU} \leq -(V_L+V_{RS})$.

15. The system of claim 3, wherein $V_{RS}=V_{CR}=0$, $V_{RU} \geq V_H$, $V_{CL}=V_{CU} \leq -V_L$.

16. The system of claim 3, wherein $|V_{RS}-V_{CR}| \leq V_R$ during and shortly after release of the selected moving element, and wherein $|V_{RS}-V_{CL}| \geq V_L$ during and shortly before latching of the selected moving element.

17. The system of claim 3, wherein at least one of conditions (i) to (iv) is met:
(i) $V_{RS}=0$ in a first phase and $-V_D$ in a last phase;
(ii) $V_{RU}=-V_D$, wherein $V_D=\max(V_L/2, V_H)$;
(iii) $V_{CR}=0$ in a first phase and $V_{CL}=+V_D$ in a last phase, wherein $V_D=\max(V_L/2, V_H)$; and
(iv) $V_{CU}=+V_D$, wherein $V_D=\max(V_L/2, V_H)$.

18. The system of claim 3, configured to apply at least one of drive schemes (i) to (xiii):
(i) $V_{RS}=0$ in a first phase and $V_{RS}=V_{RU}$ in a second phase, $V_{RU} \leq -V_H$ in said first and second phases, $V_{CR}=0$ in said first and second phases, $V_{CL}=V_{CU} \geq \max(V_L, -2 \times V_{RU})+V_{RU}$ in said first and second phases;
(ii) $V_{RS}=0$ in a first phase and $V_{RS}=-V_D$ in a second phase, $V_{RU}=-V_D$ in said first and second phases, $V_{CR}=0$ in said first and second phases, $V_{CL}=V_{CU}=+V_D$ in said first and second phases, wherein $V_D=\max(V_L/2, V_H)$;
(iii) $V_{RS}=V_D$ in a first phase and $V_{RS}=0$ in a second phase, $V_{RU}=0$ in said first and second phases, $V_{CR}=V_D$ in said first and second phases and $V_{CL}=V_{CU}=2 \times V_D$ in said first and second phases, wherein $V_D=\max(V_L/2, V_H)$;
(iv) $V_{RS}=0$ in a first phase and $V_{RS}=-V_D$ in a second phase, $V_{RU}=-V_D$ in said first and second phases, $V_{CR}=0V$ in the first phase and $V_{CR}=+V_D$ in the second phase, $V_{CL}=V_{CU}=+V_D$ in said first and second phases, wherein VD $=\max(V_L/2, VH)$;
(v) $V_{RS}=0$ in a first phase and $V_{RS}=-V_D$ in a second phase, $V_{RU}=-V_D$ in said first and second phases, $V_{CR}=0V$ in the first phase and $V_{CR}=0$ or $+V_D$ in the second phase, $V_{CL}=V_{CU}=+V_D$ in said first and second phases, wherein $V_D=\max(V_L/2, V_H)$;
(vi) $V_{RS}=0$ in a first phase and $V_{RS}=-V_D$ in a second phase, $V_{RU}=-V_D$ in said first and second phases, $V_{CR}=0V$ in the first and second phases, $V_{CL}=0$ in the first phase and $V_{CL}=+V_D$ in the second phase, $V_{CU}=+V_D$ in said first and second phases, wherein $V_D=\max(V_L/2, V_H)$;
(vii) $V_{RS}=0$ in a first phase and $V_{RS}=-V_D$ in a second phase, $V_{RU}=-V_D$ in said first and second phases, $V_{CR}=0V$ in the first phase and $V_{CR}=+V_D$ in the second phase, $V_{CL}=0$ in the first phase and $V_{CL}=+V_D$ in the second phase, $V_{CU}=+V_D$ in said first and second phases, wherein $V_D=\max(V_L/2, V_H)$;
(viii) $V_{RS}=0$ in a first phase and $V_{RS}=-V_D$ in a second phase, $V_{RU}=-V_D$ in said first and second phases, $V_{CR}=0V$ in the first phase and $V_{CR}=0$ or $+V_D$ in the second phase, $V_{CL}=0$ in the first phase and $V_{CL}=+V_D$ in the second phase, $V_{CU}=+V_D$ in said first and second phases, wherein $V_D=\max(V_L/2, V_H)$;
(ix) $V_{RS}=0$ in a first phase and $V_{RS}=-V_D$ in a second phase, $V_{RU}=-V_D$ in said first and second phases, $V_{CR}=0V$ in the first and second phases, $V_{CL}=0$ or $+V_D$ in the first phase and $V_{CL}=+V_D$ in the second phase, $V_{CU}=+V_D$ in said first and second phases, wherein $V_D=\max(V_L/2, V_H)$;
(x) $V_{RS=0}$ in a first phase and $V_{RS}=-V_D$ in a second phase, $V_{RU}=-V_D$ in said first and second phases, $V_{CR}=0V$ in the first phase and $V_{CR}=+V_D$ in the second phase, $V_{CL}=0$ or $+V_D$ in the first phase and $V_{CL}=+V_D$ in the second phase, $V_{CU}=+V_D$ in said first and second phases, wherein $V_D=\max(V_L/2, V_H)$; and
(xi) $V_{RS}=0$ in a first phase and $V_{RS}=-V_D$ in a second phase, $V_{RU}=-V_D$ in said first and second phases, $V_{CR}=0V$ in the first phase and $V_{CR}=0$ or $+V_D$ in the second phase, $V_{CL}=0$ or $+V_D$ in the first phase and $V_{CL}=+V_D$ in the second phase, $V_{CU}=+V_D$ in said first and second phases, wherein $V_D=\max(V_L/2, V_H)$;
(xii) $V_{RS}=0$ in a first phase and in a second phase, $V_{RS}=-V_D$ in a third phase and in a fourth phase, $V_{RU}=-V_D$ from said first phase to said fourth phase, $V_{CR}=0$ from said first phase to said third phase, and $V_{CR}=0$ or $+V_D$ in said fourth phase, $V_{CR}=0$ from said first phase to said third phase, $V_{CR}=0$ or $+V_D$ in said fourth phase, $V_{CL}=0$ or $+V_D$ in the first phase, and $V_{CR}=+V_D$ in the fourth phase, $V_{CU}=+V_D$ from said first phase to said fourth phase, wherein $V_D=\max(V_L/2, V_H)$.

19. A method for controlling an apparatus which comprises a set of actuator elements, each comprising a moving element which moves between first and second extreme positions, wherein each actuator element of the set is comprised in: (a) exactly one first subset out of a plurality of non-empty first subsets (R-subsets) of the set of actuator elements; and (b) exactly one second subset out of a plurality of non-empty second subsets (C-subsets) of the set of actuator elements;

wherein each of the actuator elements of said set of actuator elements is an electrostatic actuator element comprising the moving element which is operative to move between the first extreme position and the second extreme position which is farther from a first electrode of said actuator element than the first extreme position, wherein the actuator element is responsive to potentials applied to the first electrode and to the moving element based on control commands issued by the processor for the R-subset and the C-subset in which said moving element is comprised, wherein said potentials comprise at least one of a hold voltage, a latching voltage, and a release voltage, the method comprising:

determining, by a processor, a maximal number (Nltr) of moving elements which may be released from the first extreme position at a second sampling cycle in a first C-subset which comprises moving elements released from the first extreme position in a first sampling cycle, the determining based on a number of the moving elements of the first C-subset which were released from the first extreme position in the first sampling cycle;

obtaining a number (Ntbr) of moving elements which, if released from the first extreme position during the second sampling cycle, enables production by the apparatus during the second sampling cycle of a sound, at least one attribute of which corresponds to at least one characteristic of a digital input signal, wherein if Ntbr is smaller than Nltr, control commands are generated for releasing from the first extreme position Ntbr moving elements of the first C-subset but not of any moving element of any other C-subset;

generating one or more control commands for a group of subsets out of the first and the second pluralities of subsets in response to Nltr, Ntbr, and a first release-order indication, indicative of an order in which moving elements of the first C-subset are released from the first extreme position; wherein the group of subsets comprising the first C-subset; and transferring the control commands to the apparatus, thereby resulting in movement of at least one moving element which is comprised in the first C-subset from the first extreme position, wherein said control commands cause application of at least one of said hold voltage, latching voltage, and release voltage.

20. A program storage device readable by machine, tangibly embodying a program of instructions executable by the machine to perform method for controlling an apparatus which comprises a set of actuator elements, each comprising a moving element which moves between first and second extreme positions, wherein each actuator element of the set is comprised in: (a) exactly one first subset out of a plurality of non-empty first subsets (R-subsets) of the set of actuator elements; and (b) exactly one second subset out of a plurality of non-empty second subsets (C-subsets) of the set of actuator elements, wherein each of the actuator elements of said set of actuator elements is an electrostatic actuator element comprising the moving element which is operative to move between the first extreme position and the second extreme position which is farther from a first electrode of said actuator element than the first extreme position, wherein the actuator element is responsive to potentials applied to the first electrode and to the moving element based on control commands issued by the processor for the R-subset and the C-subset in which said moving element is comprised, wherein said potentials comprise at least one of a hold voltage, a latching voltage, and a release voltage, the method comprising:

determining a maximal number (Nltr) of moving elements which may be released from the first extreme position at a second sampling cycle in a first C-subset which comprises moving elements released from the first extreme position in a first sampling cycle, the determining based on a number of the moving elements of the first C-subset which were released from the first extreme position in the first sampling cycle;

obtaining a number (Ntbr) of moving elements which, if released from the first extreme position during the second sampling cycle, enables production by the apparatus during the second sampling cycle of a sound, at least one attribute of which corresponds to at least one characteristic of a digital input signal, wherein if Ntbr is smaller than Nltr, control commands are generated for releasing from the first extreme position Ntbr moving elements of the first C-subset but not of any moving element of any other C-subset;

generating one or more control commands for a group of subsets out of the first and the second pluralities of subsets in response to Nltr, Ntbr, and a first release-order indication, indicative of an order in which moving elements of the first C-subset are released from the first extreme position; wherein the group of subsets comprising the first C-subset; and transferring the control commands to the apparatus, thereby resulting in movement of at least one moving element which is comprised in the first C-subset from the first extreme position, wherein said control commands cause application of at least one of said hold voltage, latching voltage, and release voltage.

* * * * *